United States Patent
Ho

(10) Patent No.: US 8,943,305 B2
(45) Date of Patent: Jan. 27, 2015

(54) FRAME STRUCTURE FOR MEDIUM ACCESS IN BODY AREA NETWORKS (BAN)

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 896 days.

(21) Appl. No.: 12/697,110

(22) Filed: Jan. 29, 2010

(65) Prior Publication Data

US 2010/0202354 A1 Aug. 12, 2010

Related U.S. Application Data

(60) Provisional application No. 61/148,597, filed on Jan. 30, 2009.

(51) Int. Cl.
*H04L 29/06* (2006.01)
*H04B 13/00* (2006.01)
*G06Q 10/06* (2012.01)
*G06Q 50/32* (2012.01)

(52) U.S. Cl.
CPC .............. *H04B 13/005* (2013.01); *G06Q 10/06* (2013.01); *G06Q 50/32* (2013.01)
USPC .......................................... 713/151

(58) Field of Classification Search
USPC .......................................... 713/151; 709/236
See application file for complete search history.

(56) References Cited

U.S. PATENT DOCUMENTS

| | | | | |
|---|---|---|---|---|
| 5,371,734 | A * | 12/1994 | Fischer ......................... | 370/311 |
| 7,564,812 | B1 * | 7/2009 | Elliott ......................... | 370/329 |
| 2008/0095075 | A1 * | 4/2008 | Monier ......................... | 370/257 |

OTHER PUBLICATIONS

Iino et al. Wireless LAN Control Protocol (WiCoP) draft-iino-capwap-wicop-02.txt, 2005, Retrieved from the Internet <URL: tools.ietf.org/html/draft-iino-capwap-wicop-02, pp. 1-57.*
802.11, Part 11 : Wireless LAN Medium Access Control (MAC) and Physical Layer (PHY) specifications, 1997, IEEE, Retrieved from the Internet <URL: ieeexplore.ieee.org/xpls/abs_all.jsp?arnumber=4248378&tag=1>, p. 1-459 as printed.*
(no stated author); 802.11 Pocket Reference Guide; Sep. 2014; SANS Institute; Retrieved from the Internet <URL: willhackforsushi.com/papers/80211_Pocket_Reference_Guide.pdf>; pp. 1-3 as printed.*
Davenport, MedWiN MAC and Security Proposal—Documentation, IEEE P802.15, May 4, 2009.

* cited by examiner

*Primary Examiner* — Michael Chao
(74) *Attorney, Agent, or Firm* — Alan A. R. Cooper; Frederick J. Telecky, Jr.

(57) ABSTRACT

A system and method for providing a variety of medium access and power management methods are disclosed. A defined frame structure allows a hub and a node to use said methods for secured or unsecured communications with each other. Contended access is available during a random access phase. The node uses an alternate doubling of a backoff counter to reduce interference and resolve collisions with other nodes attempting to communicate with the hub in the random access phase. Non-contended access is also available, and the hub may schedule reoccurring or one-time allocation intervals for the node. The hub and the node may also establish polled and posted allocation intervals on an as needed basis. The node manages power usage by being at active mode at times during the beacon period when the node is expected to transmit or receive frames.

18 Claims, 27 Drawing Sheets

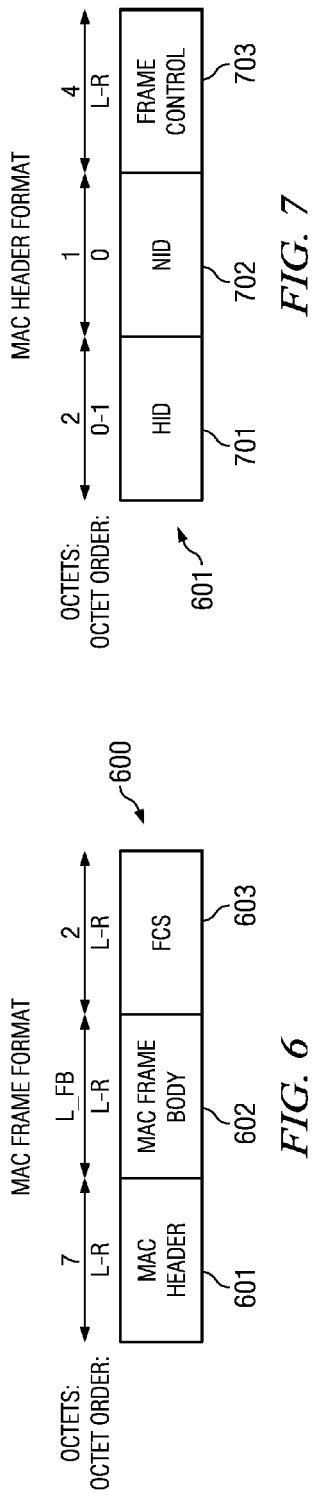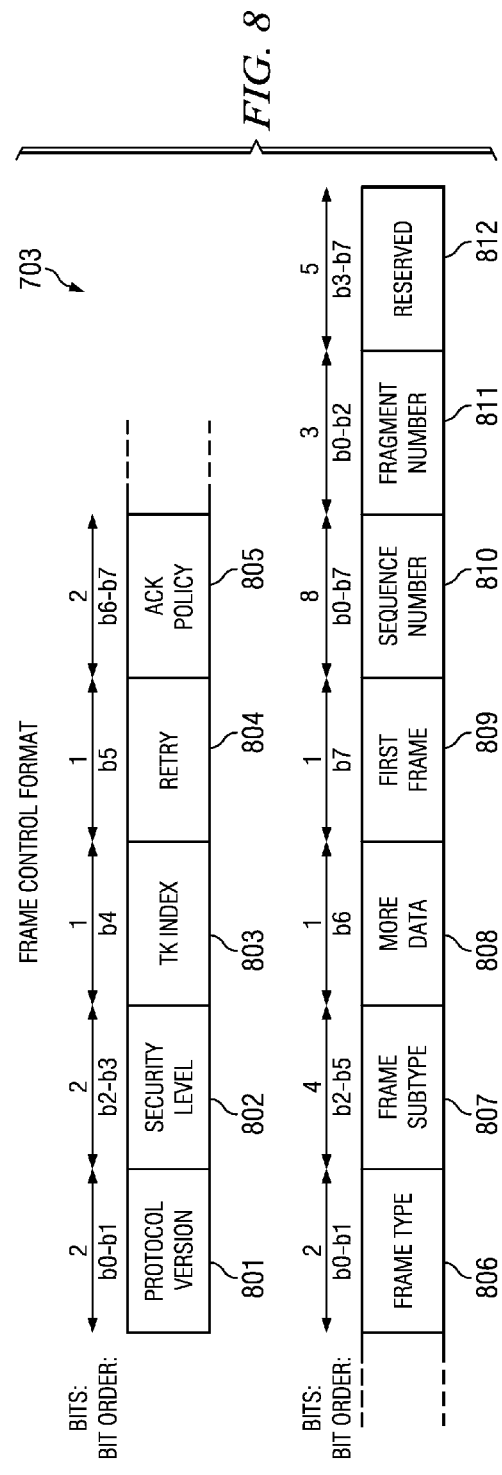

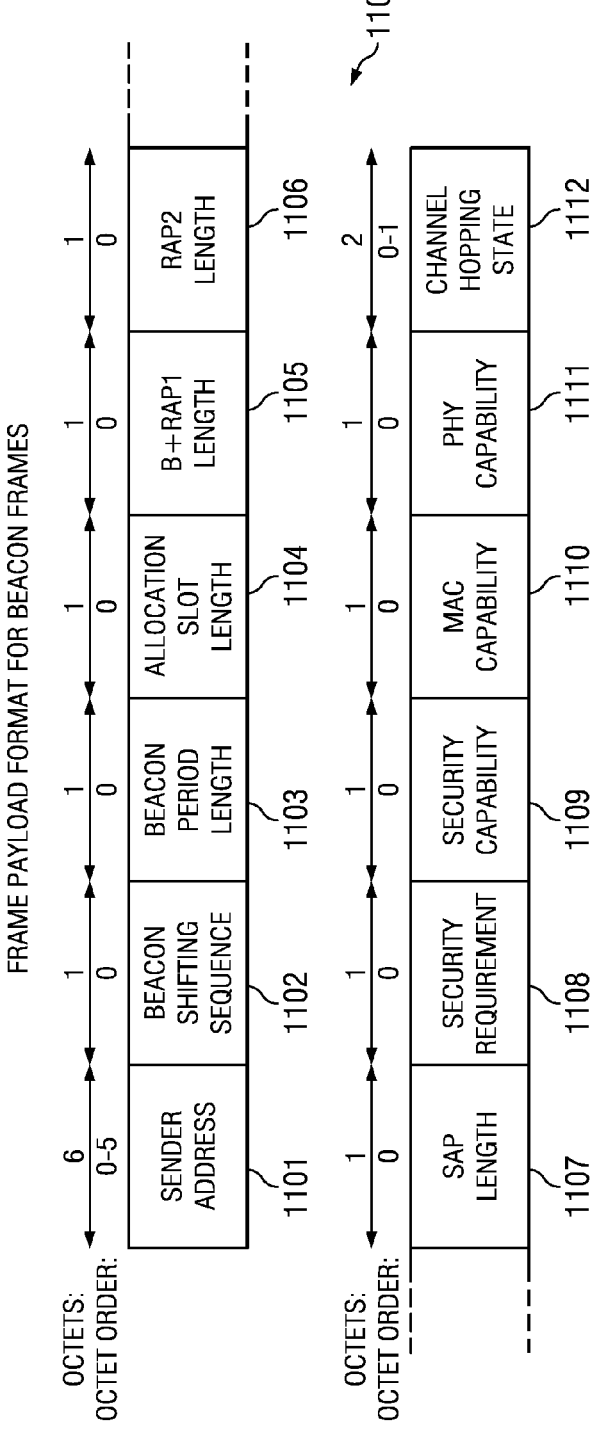
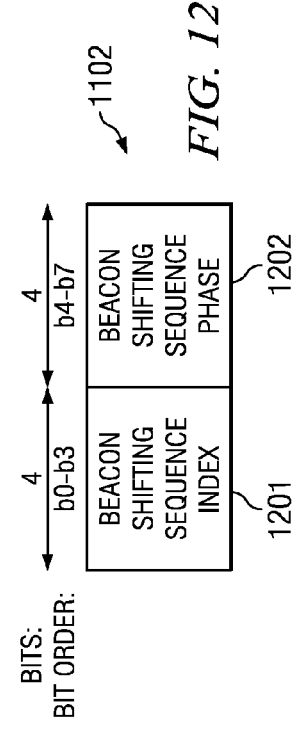

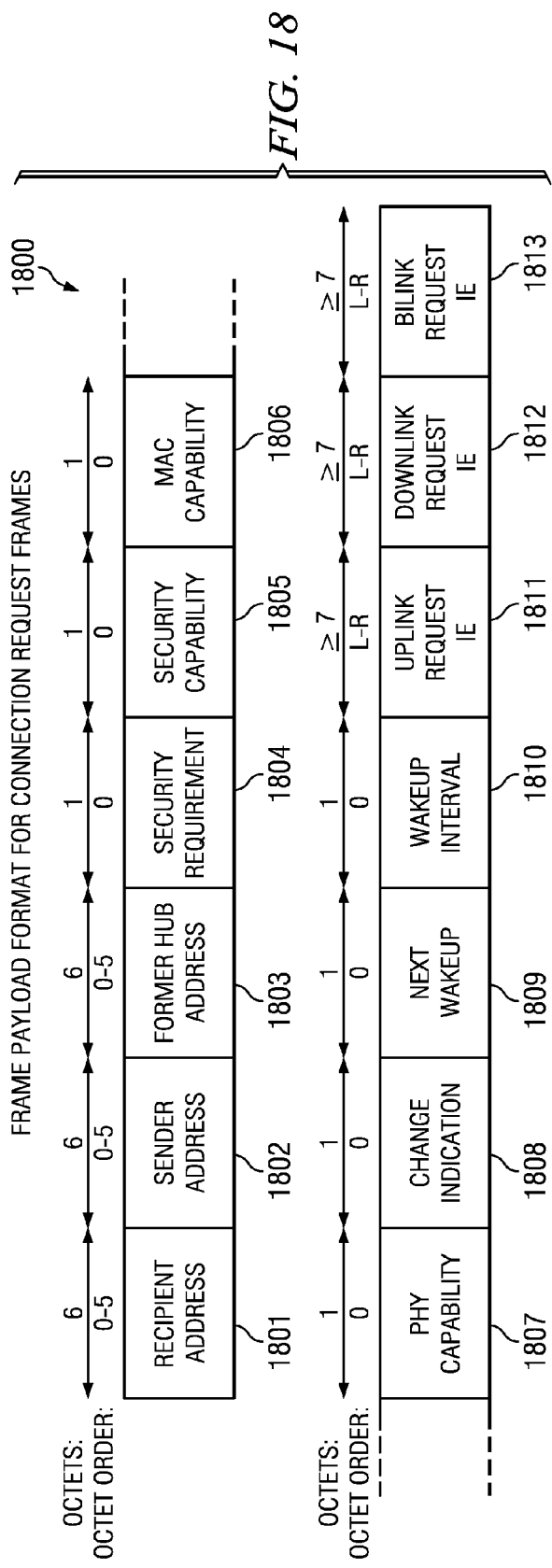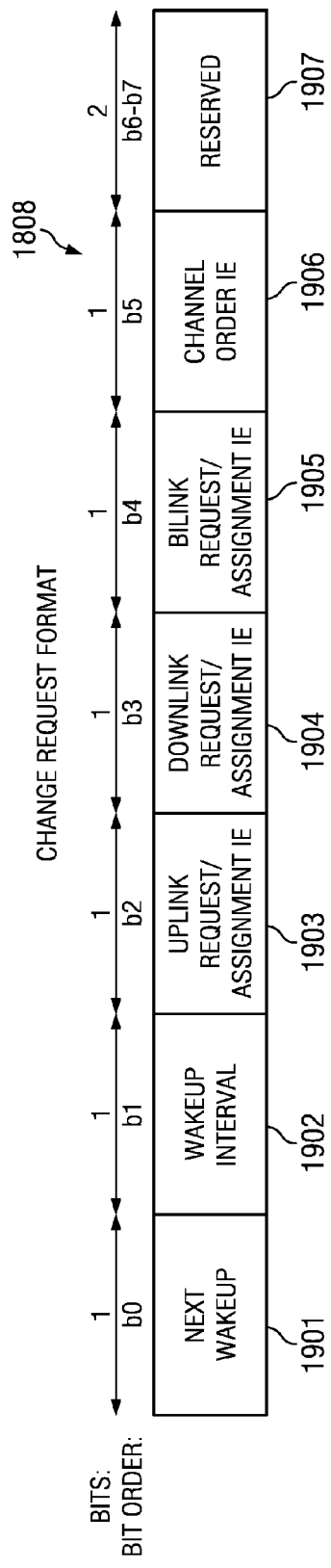
FIG. 18
FIG. 19

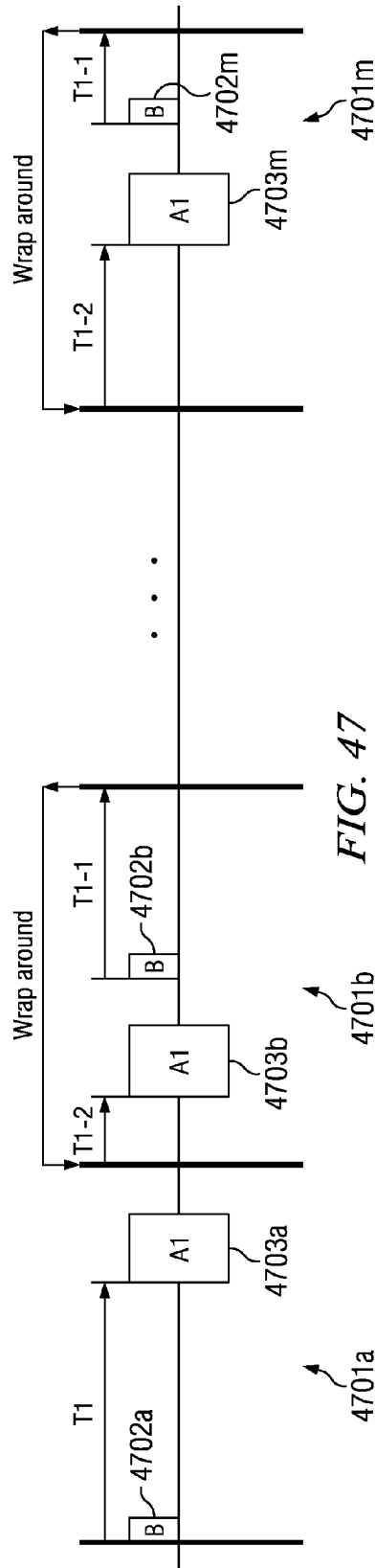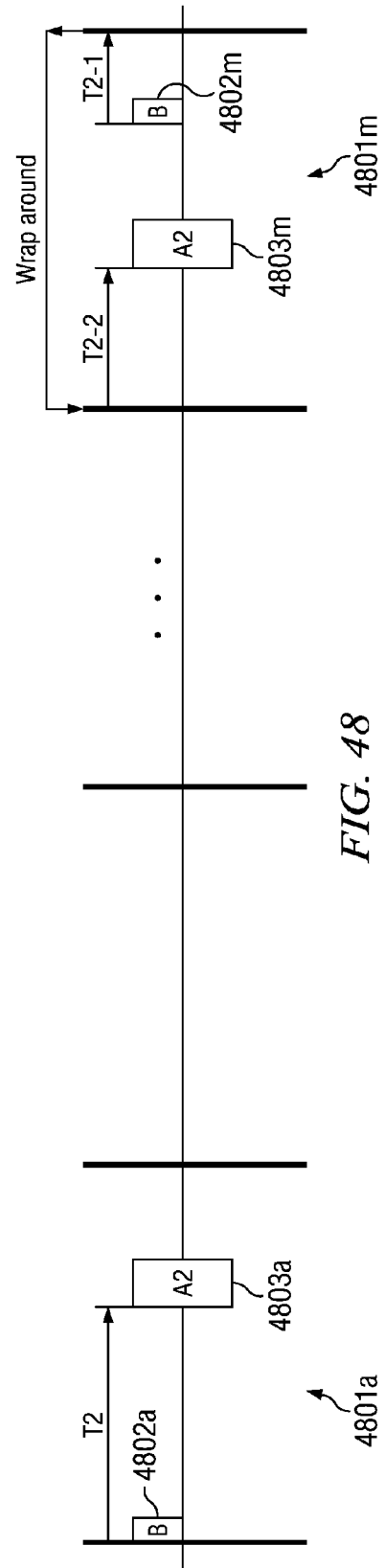

FRAME STRUCTURE FOR MEDIUM ACCESS IN BODY AREA NETWORKS (BAN)

CROSS-REFERENCE TO RELATED APPLICATIONS

The present application claims the benefit of the filing date of U.S. Provisional Patent Application No. 61/148,597, which is titled "Frame Structure for Medium Access in BAN" and was filed Jan. 30, 2009, the disclosure of which is hereby incorporated by reference herein in its entirety.

TECHNICAL FIELD

Embodiments of the invention are directed, in general, to access methods and power management and, more specifically, to efficient and effective frame encoding to obtain desired medium access and power management.

BACKGROUND

In low-power wireless networks, such as a body area network, a plurality of nodes form a subnet with a hub, which may also be referred to as a cluster controller. The nodes may form secured or unsecured connections with their desired hub. The amount and frequency of information exchanged between each node and the hub varies by time and by node. The nodes and hub designate allocation intervals in which the devices can communicate over a shared channel. There is a need for the nodes and hub to have the capability to use a variety of access methods in order to support reoccurring and one-time communications.

The nodes and hub must also accurately time their transmissions to avoid collisions or overlapping allocation intervals on the shared channel. Accordingly, there is a need for the nodes and hubs to account for clock drift and to synchronize clocks at certain times.

The nodes may operate on battery power and may need to manage power usage to maximize battery life. Transmission and reception of frames over the shared channel are a drain on the power source or battery. Accordingly, there is a further need to manage a node's capability to access the communications medium, such as air, within the power constraints of the nodes.

SUMMARY OF THE INVENTION

Embodiments of the invention provide an access framework with selectable access methods for scalable access allocations to wireless devices, including scheduled allocations, persistent or transient allocations, polled and posted allocations, and contended allocations. The procedures described herein provide a balance between power management and medium access. A frame structure is also defined for various frames and information elements that are used to support the desired medium access and power management methods.

Groups of wireless devices or nodes are organized into subnets. Each subnet is coordinated by a hub. Node access to a common channel is coordinated by the hub within the subnet, but access is not coordinated between subnets, which can result in inter-subnet interference. A beacon is transmitted by the hub in each beacon period when permitted. A beacon period is also known as a superframe to those skilled in the art. Each beacon contains timing, access, and capability information. The beacon transmission time, relative to the start of a beacon period, shifts from one beacon period to next according to a pseudo-random sequence. Different pseudo-random sequences are used by neighboring subnet hubs. Repeated collisions between inter-hub beacons and other transmissions are circumvented when neighboring subnet hubs use different beacon shift sequences. The current shift sequence index and the phase of the shift sequence are encoded in the beacon frame, which allows each node in the subnet to readily determine the next beacon time.

The hub transmits a beacon frame including a beacon shift sequence index and beacon shift sequence phase. The beacon shift sequence index identifies the pseudo-random shift sequence governing the beacon transmission pattern currently in use. In one embodiment, nine predetermined beacon shift sequences are defined and associated with specific indices, including a sequence providing no beacon offset in each beacon period. The beacon shift sequence phase is set to the current phase or position of the chosen beacon shift sequence in the current beacon period.

Embodiments of the invention minimize or prevent inter-subnet interference by rotating the beacon transmission times from one beacon period to next. As a result of shifting beacon transmission times, the allocated intervals for each node in the subnet are shifted from one beacon period to next as well. Beacon transmission times are encoded in a beacon frame by the transmitting hub, which allows nodes in the hub's subnet to identify their respective allocation intervals. Hubs may independently choose their own beacon shifting patters without exchanging time sharing messages between them.

A contended allocation is a time interval having a constrained length outside of scheduled allocations. The contended allocation is obtained by a device using carrier sense multiple access with collision avoidance (CSMA/CA), for example, for its random access. A contended allocation is typically used for unpredictable or on-demand uplink traffic, such as traffic caused by data rate variations and/or channel impairments. A contended allocation is typically used as an uplink and serves transmissions initiated by a device and corresponding acknowledgments, if any, returned by a subnet hub or cluster coordinator.

A device uses a backoff counter to determine the start time of a contended allocation. The device sets the backoff counter to some value and then decrements the counter upon detection of certain events. A contended allocation starts when the backoff counter decrements to zero. However, collisions between devices that attempt to obtain access in the same contended access phases must be resolved without excessive backoffs which would otherwise lead to wasted bandwidth and increased latency.

Embodiments of the invention provide locking and unlocking states for a backoff counter, so that the CSMA-based contention access works seamlessly with non-contention access methods. The present invention avoids conflicts between contended and non-contended access intervals. It also provides for alternative doubling of the backoff counter or contention window to efficiently resolve an inferred collision rather than using successive doubling of the counter.

In the present invention, the backoff counter is locked and is not decremented or reset at certain times. Locking backoff counter occurs: when the backoff counter is reset upon decrementing to zero, when the channel is busy, when the current time is outside any random access phase (RAP), or when the current time is at the start of a contention slot inside a RAP but the time between the end of the contention slot and the end of the RAP is not long enough for completing a frame transaction plus a guard time. Once locked, the backoff counter is unlocked in the following situations: when the channel has been idle for a turnaround inter-frame space (TIFS), and when the current time is at the start of a contention slot inside a RAP and the time between the end of the contention slot and the end of the RAP is long enough for completing a frame transaction plus a guard time.

In the present invention, the backoff counter is set when it is at zero value and the device has traffic to send. The backoff counter is set to a sample of an integer random variable uniformly distributed over the interval [1, CW], where CW is a contention window value selected based upon the priority of the traffic to be transmitted. Initially, CW is set to a minimum value (CWmin) for the user priority to be transmitted. After successful transmission, if additional transmissions remain and contend allocations are need, the CW is reset to CWmin. A successful transmission occurs when the device either receives an expected acknowledgment correctly, or transmits a frame that does not require an acknowledgement.

If the device receives no acknowledgement or an incorrect acknowledgment, then the transmission is considered to have failed. After a failed transmission, CW is set by alternately doubling the CW value, but not to exceed CWmax for the user priority. Accordingly, following a failed transmission, CW is unchanged, if it was doubled in the last setting; and CW is doubled, if it was kept unchanged in the last setting. Alternate doubling is performed on consecutive failed transmissions. Often, redrawing the backoff counter value within the same CW interval is good enough to resolve a collision inferred from a failed transmission. An inferred collision may be due to a marginal link instead of an actual collision. After random redrawing, the contending devices might have different backoff counter values, thereby avoiding a subsequent collision. Whereas, simply increasing the CW value (instead of redrawing a backoff value within the same CW range) might just waste additional channel time while increasing latency.

A contention slot starts following the TIFS duration after the end of a busy period and outside a scheduled allocation or beacon transmission. New contention slots start at the end of current contention slots. The contention slot length is the sum of a busy/clear channel assessment time (i.e., the time required by a physical layer abbreviated as PHY to detect a transmission and indicate the detection to a medium access control sublayer abbreviated as MAC), plus a MAC processing time (i.e., the time required by the MAC to prepare a frame and transfer it to PHY), plus a PHY processing time (i.e., the time required by PHY to process a frame and transfer it to air).

Embodiments of the invention also provide flexible and simple time allocations to devices with different power management attributes. A unified framework of non-contention access methods, including scheduled, polled and posted access, enables different levels of tradeoffs between power consumption and medium access. Long-run and short-run power management can be controlled by selecting the medium access method used by a device.

A device may use scheduled access for a persistent allocation on a communication medium. The scheduled access may be a 1-periodic allocation in which an allocation interval reoccurs in every beacon period. The 1-periodic allocation is suitable for high-duty or quasi-periodic traffic. The scheduled access may also be a multi-periodic (m-periodic) allocation that reoccurs over a longer interval, such as every $m^{th}$ beacon period (where m>1). The m-periodic allocation is suitable for low duty cycle periodic or quasi-periodic traffic. The 1-periodic and m-periodic allocations may be used for both uplink and downlink traffic. The 1-periodic and m-periodic allocation intervals are defined as starting some time T1 after the start of the beacon frame time within a beacon period. The beacon frame may shift position within each of the beacon periods. If insufficient time remains in the beacon frame after the start of the beacon frame, then the start time of the scheduled allocation wraps around the beacon period and beings before the beacon frame.

The device may also use a transient allocation that designates one or more time intervals that occur only in the next beacon period. The transient allocation may be designated in a beacon frame and identifies the allocation interval in the next beacon period. The transient allocation is suitable for aperiodic traffic having a low duty cycle.

The device may use polled access by indicating its ability to receive polled allocations. The hub sends the device a polled allocation that designates an interval other than a scheduled allocation or beacon frame. The hub may designate through a poll frame an immediate polled allocation that begins a turnaround inter-frame space (TIFS) time later or a future poll that may provide a polled allocation following the latter poll. Once a polled allocation starts, the node uploads frames that are received and acknowledged by the hub.

The hub may send a post, i.e., a frame to designate a posted allocation interval in which it sends frames to the node. The frame designating the posted allocation may indicate an immediate posted allocation interval that starts TIFS after the frame, or a future posted allocation that begins at a later time. The hub downloads frames to the node during the posted allocation, which receives and acknowledges the frames.

The node may employ a hibernation mode or a sleep mode. The hibernation mode enables long-run or macroscopic power management. In the hibernation mode, the node is asleep for one or more entire beacon periods during which it does not transmit or receive frames. The sleep mode enables short-run or microscopic power management. In the sleep mode, the node is asleep for some portions of a beacon period, but is awake for other portions of the beacon frame to service scheduled, polled, posted, and contended allocations. By selecting the sleep or hibernation mode used by the node, and selecting the access method used to transfer frames to or from the node, a node may optimize the amount of sleep or hibernation time it uses and thereby conserve power.

Embodiments of the invention use a frame structure adapted to support the functions and operations described above. The frames have a basic format comprising a frame header, a frame body, and a frame check sequence. The header includes address information for a hub and a node that are involved in sending and receiving the frame. The header further includes a frame control block that specifies a security level used in the frame, a pairwise temporal key (PTK) used, a frame type and subtype, a frame sequence number and a frame fragment number. The frame body includes a security sequence number block, a frame payload block, and a message integrity code (MIC) block. The content and format of the frame payload is selected based upon the frame type. A beacon frame payload includes beacon parameter data such as beacon shifting sequence index, beacon shifting sequence phase, and beacon period length fields. The beacon frame also includes hub requirement and capability data in security requirement, security capability, MAC capability, and PHY capability fields. Specialized payload formats are also specified for association, disassociation, connection request, connection assignment, disconnection, and acknowledgement frames.

BRIEF DESCRIPTION OF THE DRAWINGS

Figure 1:
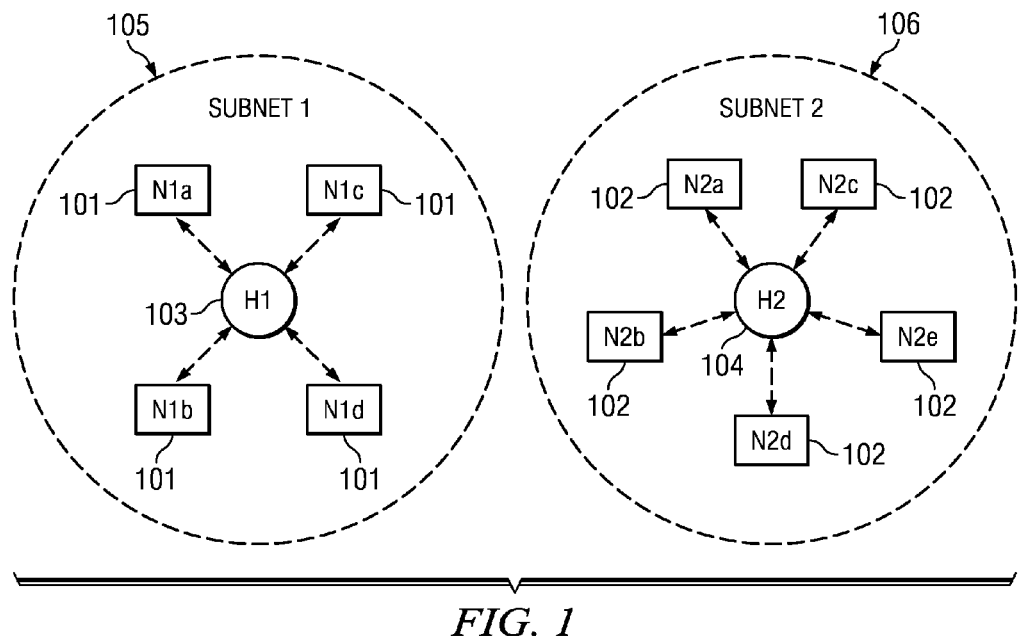
Figure 2:
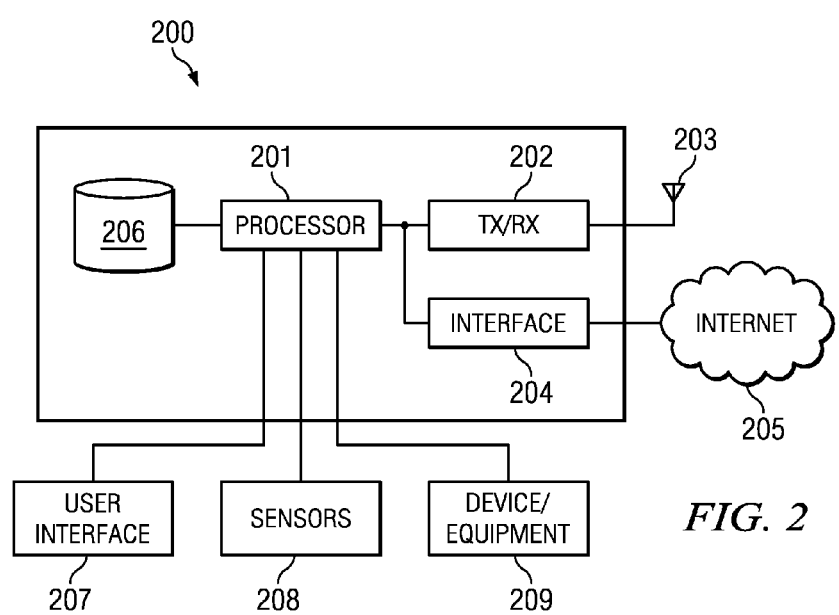
Figure 3:
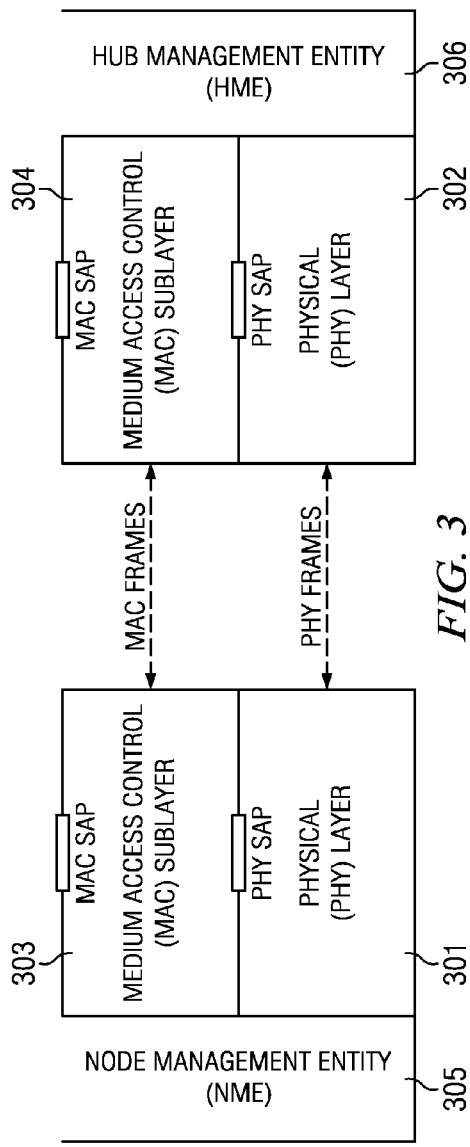
Figure 5:
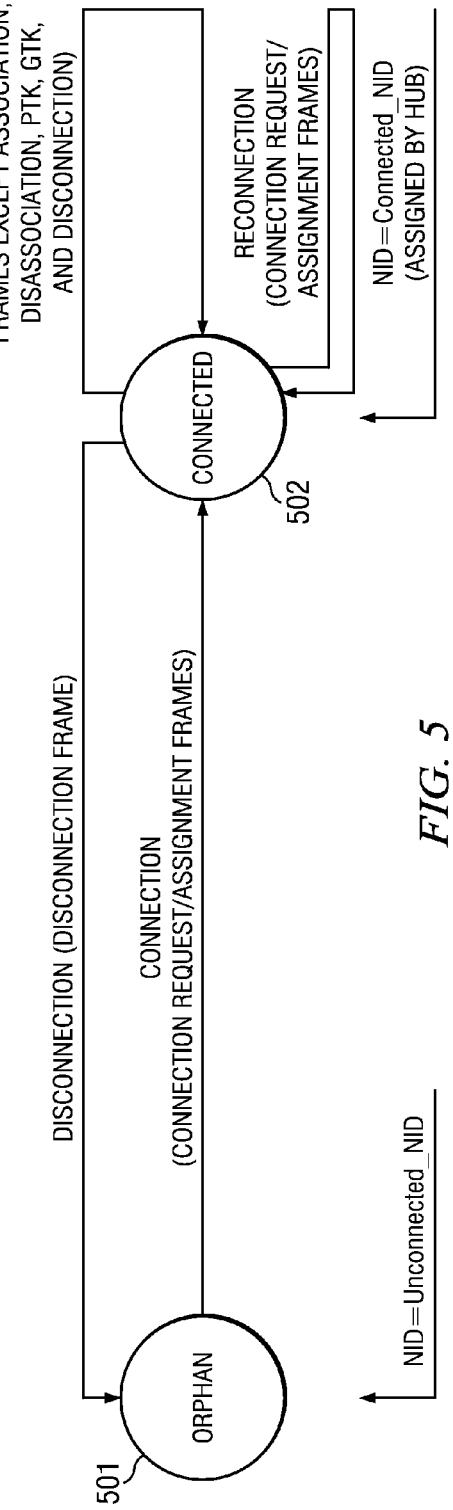
Figure 4:
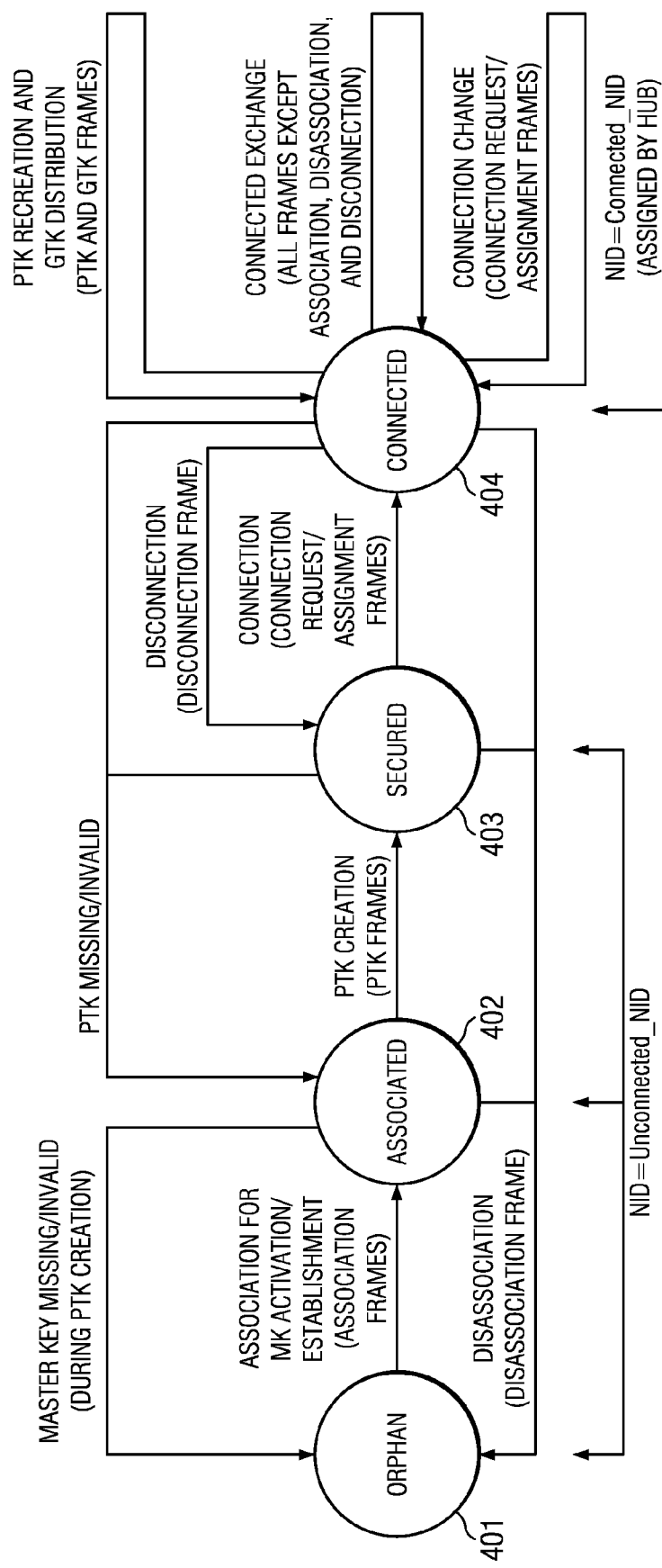
Figure 9:
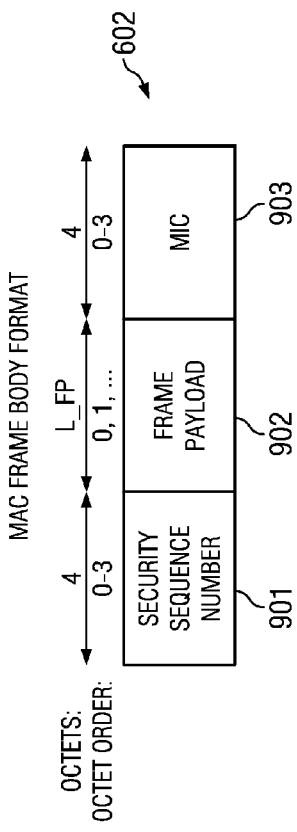
Figure 10:
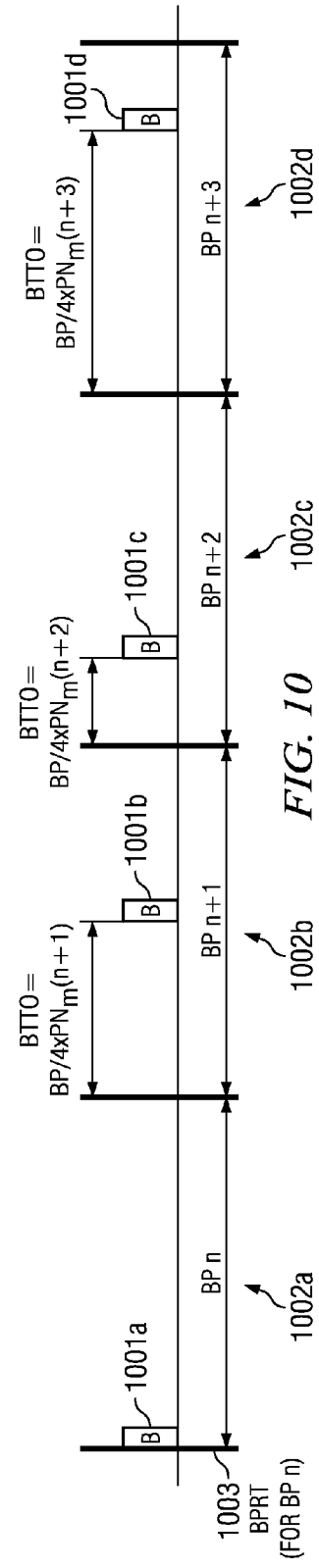
Figure 13:
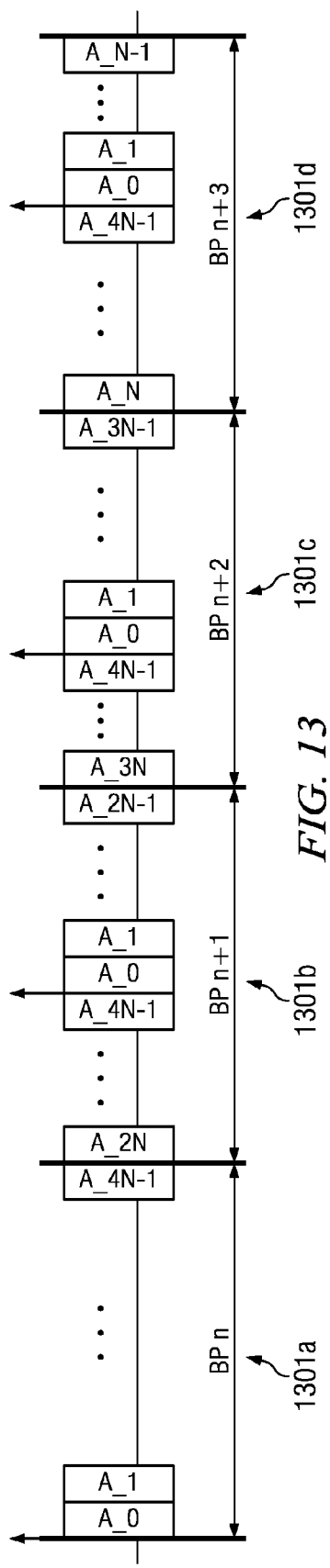
Figure 14:
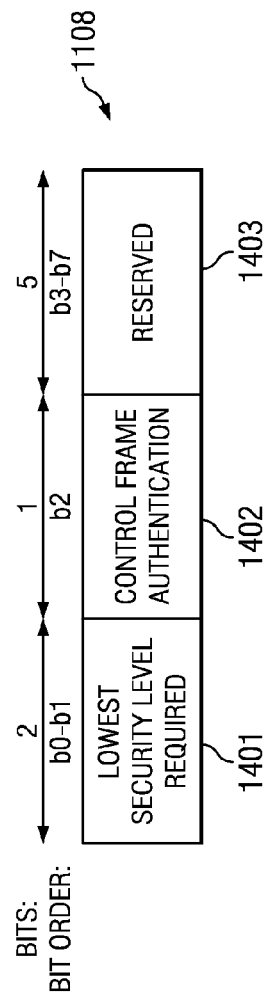
Figure 15:
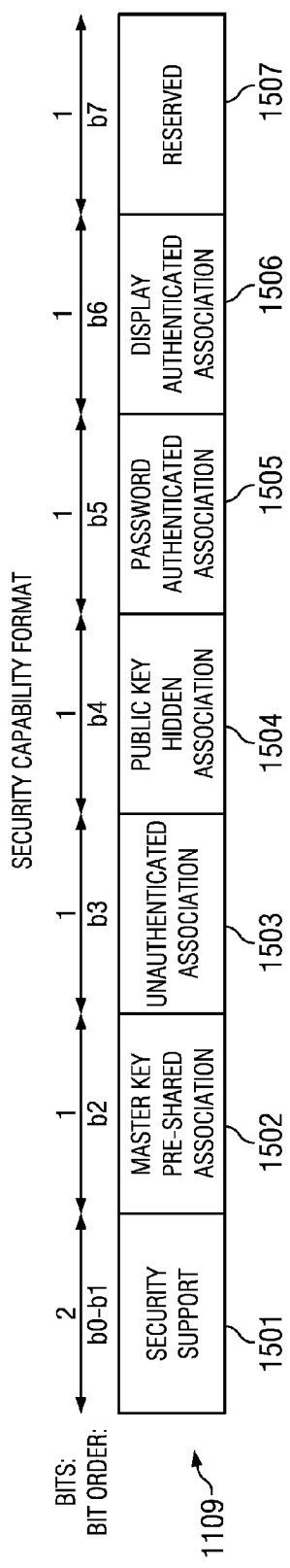
Figure 16:
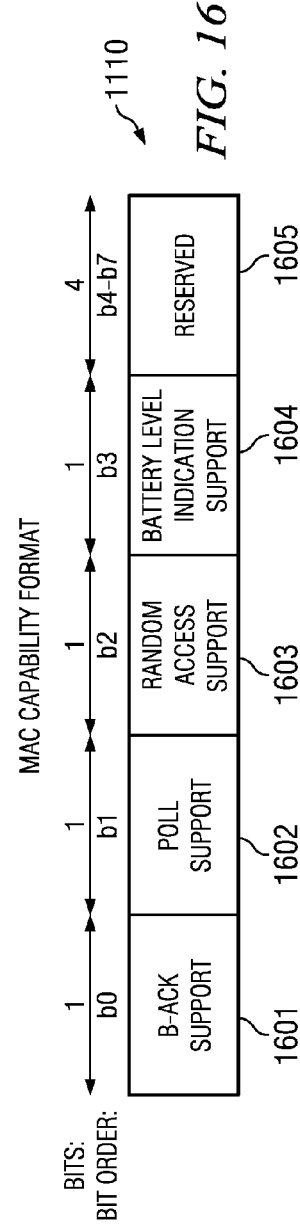
Figure 17:
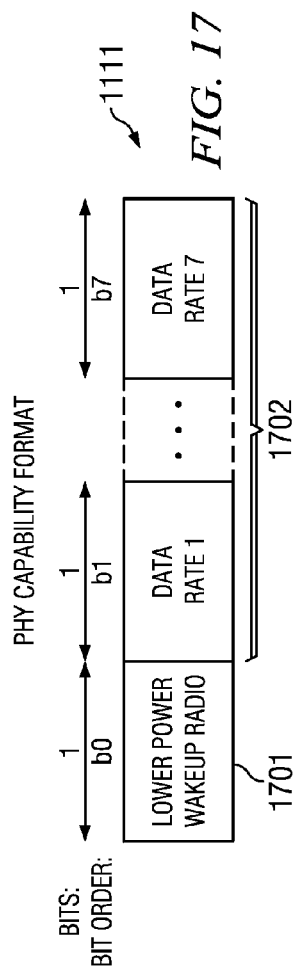
Figure 20:
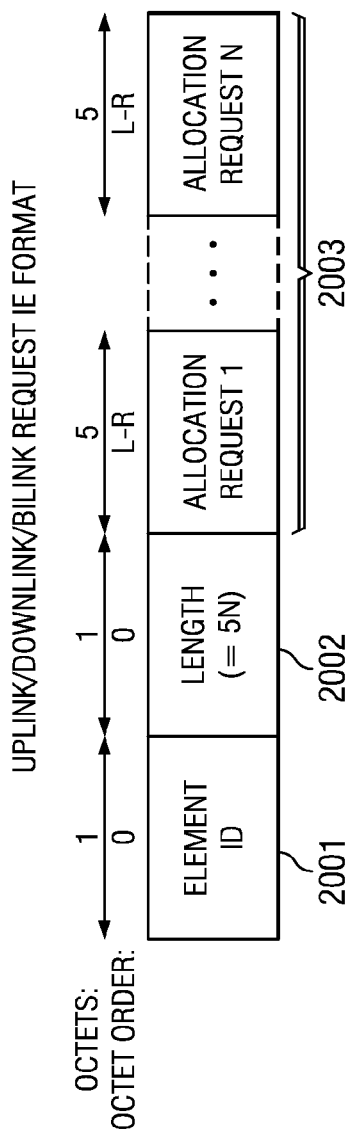
Figure 21:
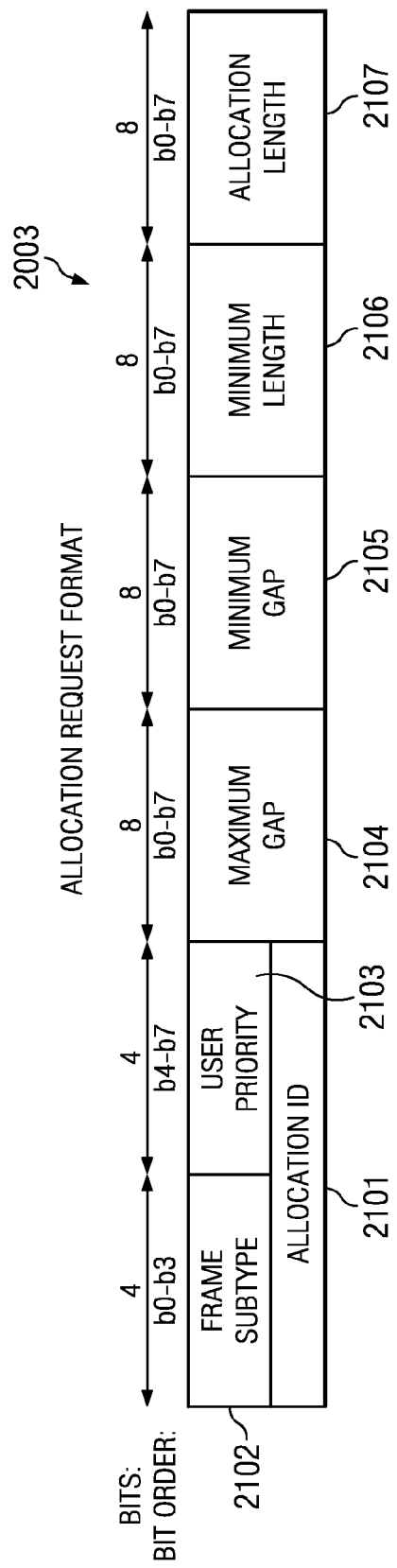
Figure 22:
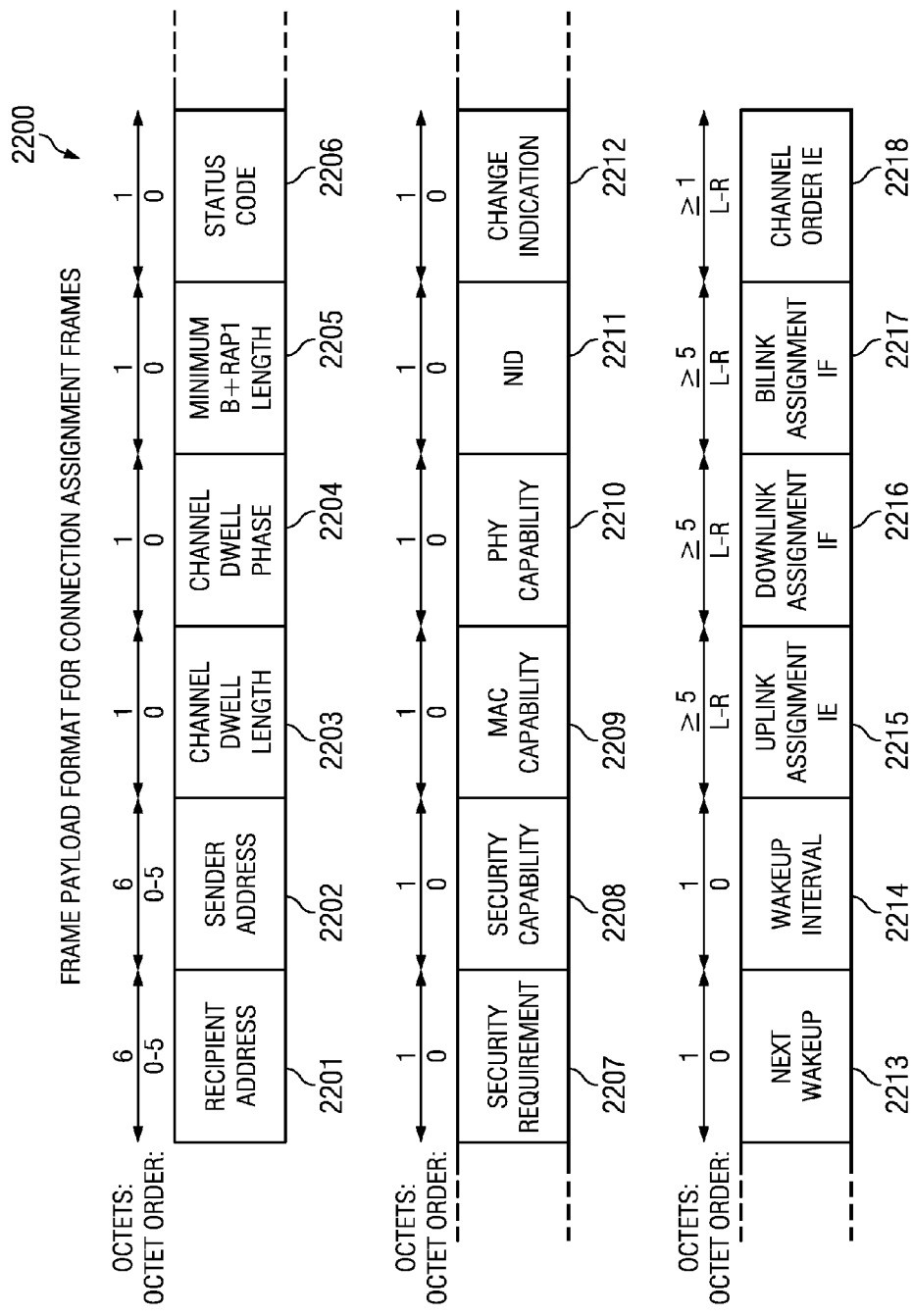
Figure 23:
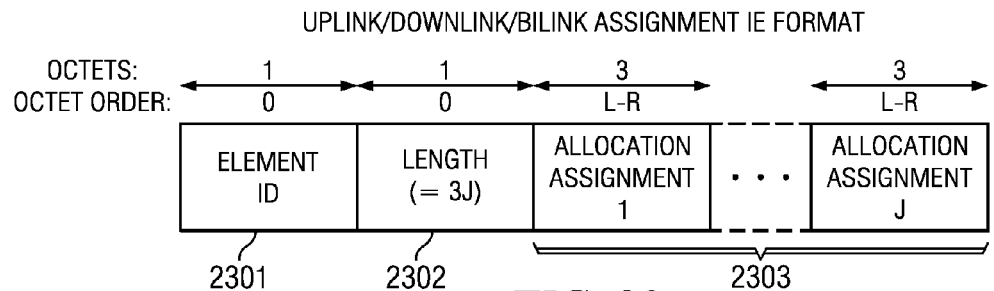
Figure 24:
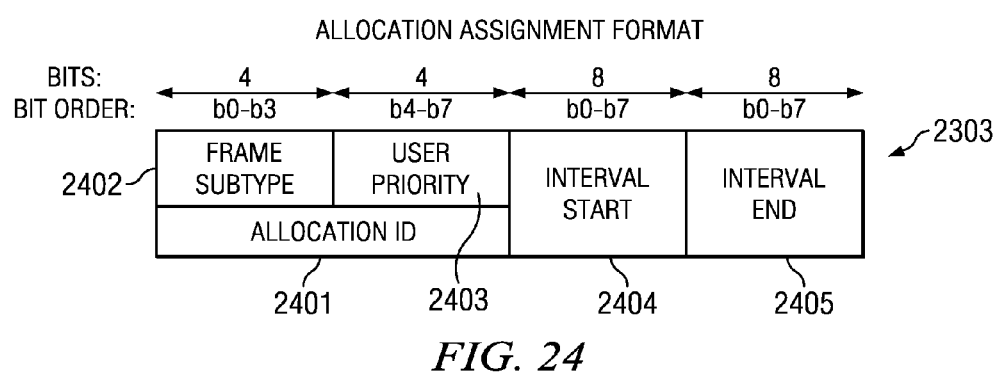
Figure 25:
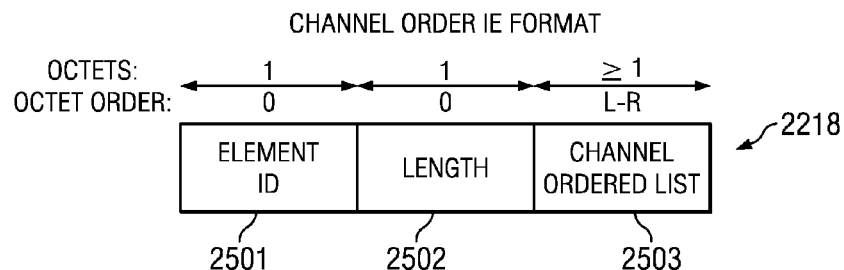
Figure 26:
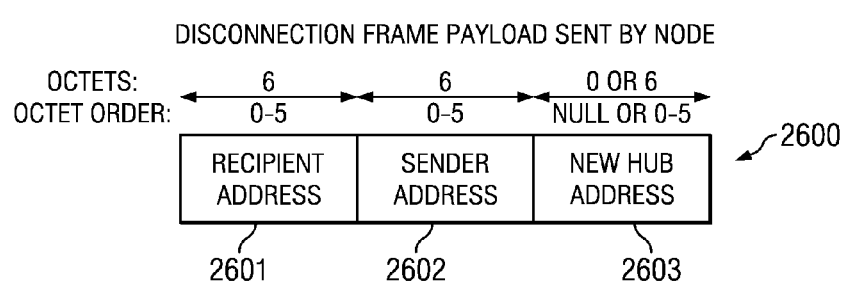
Figure 27:
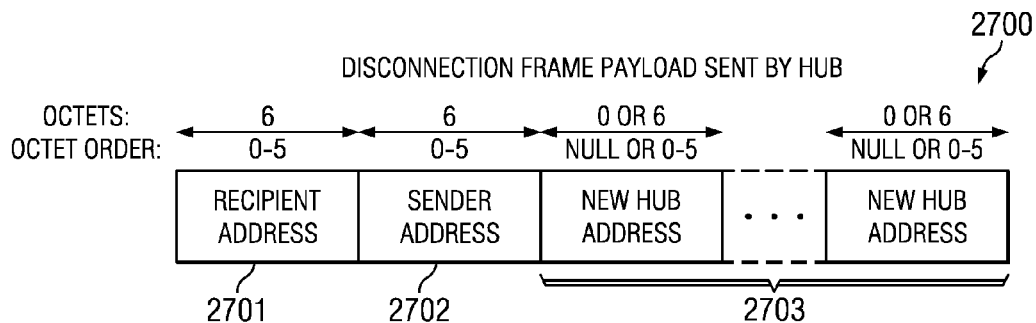
Figure 28:
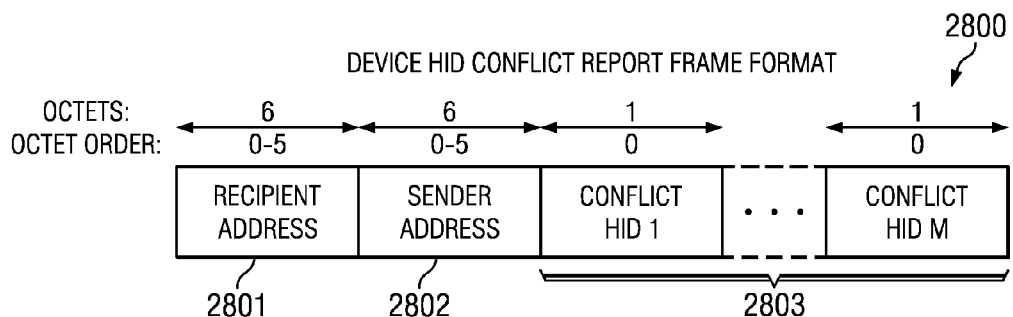
Figure 29:
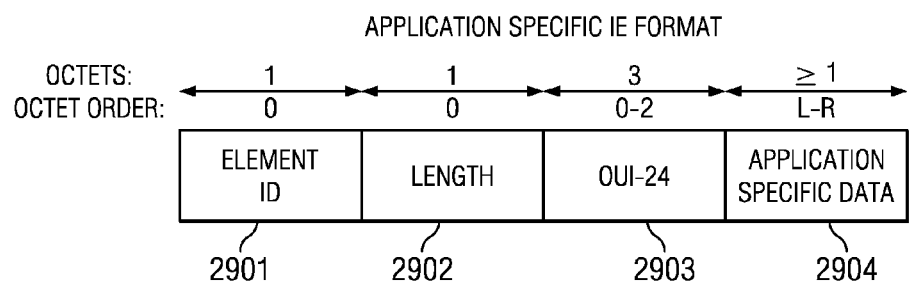
Figure 30:
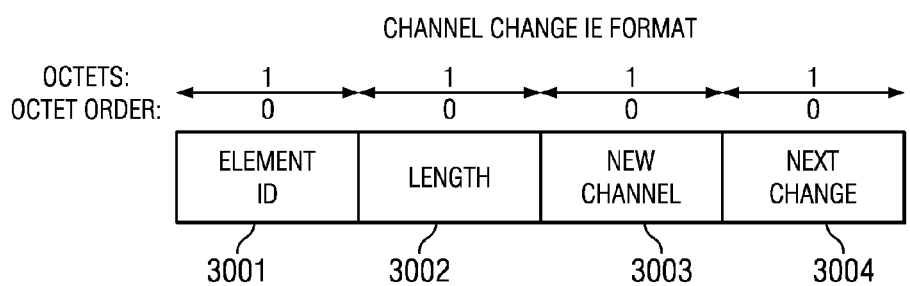
Figure 31:
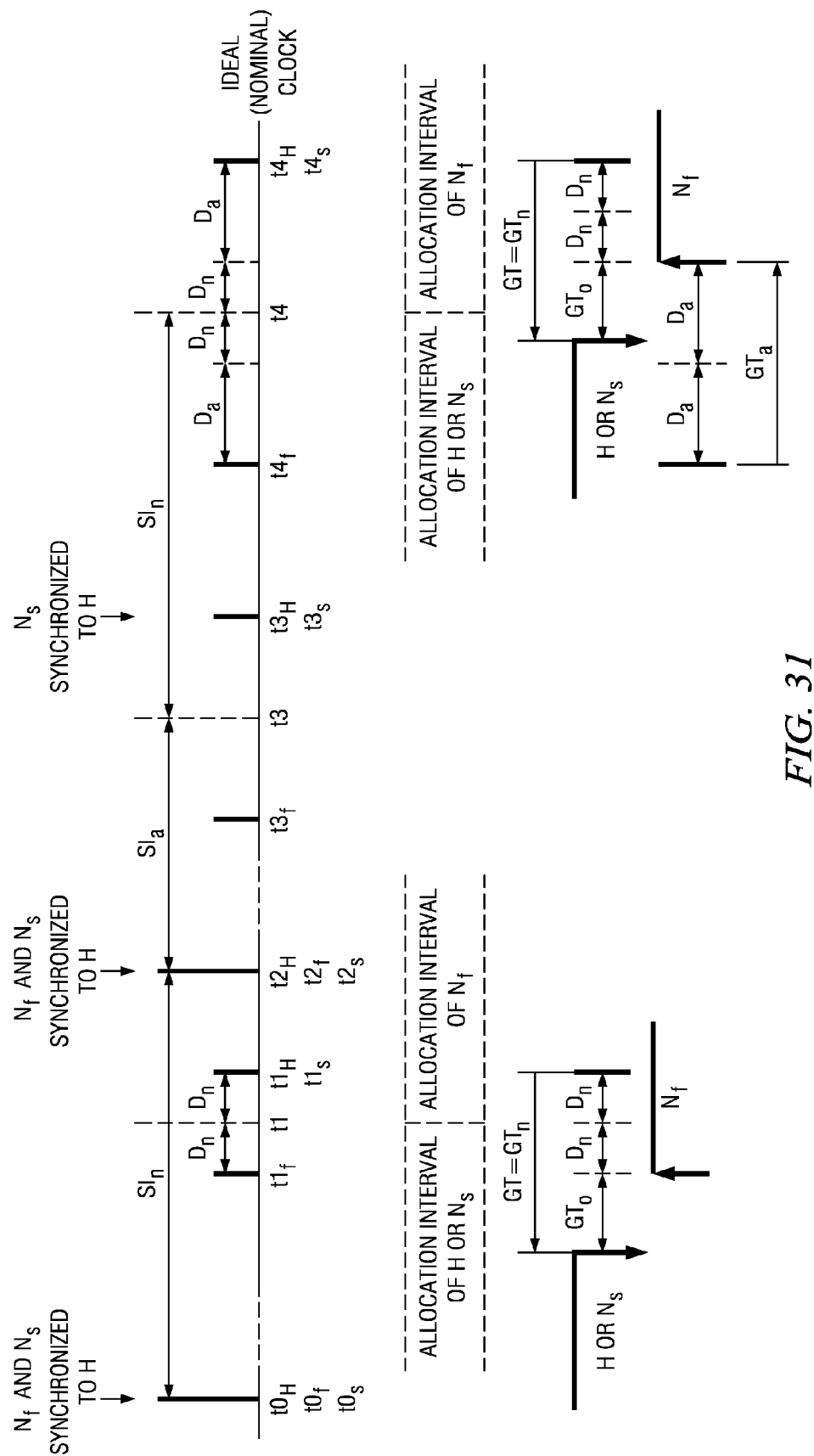
Figure 32:
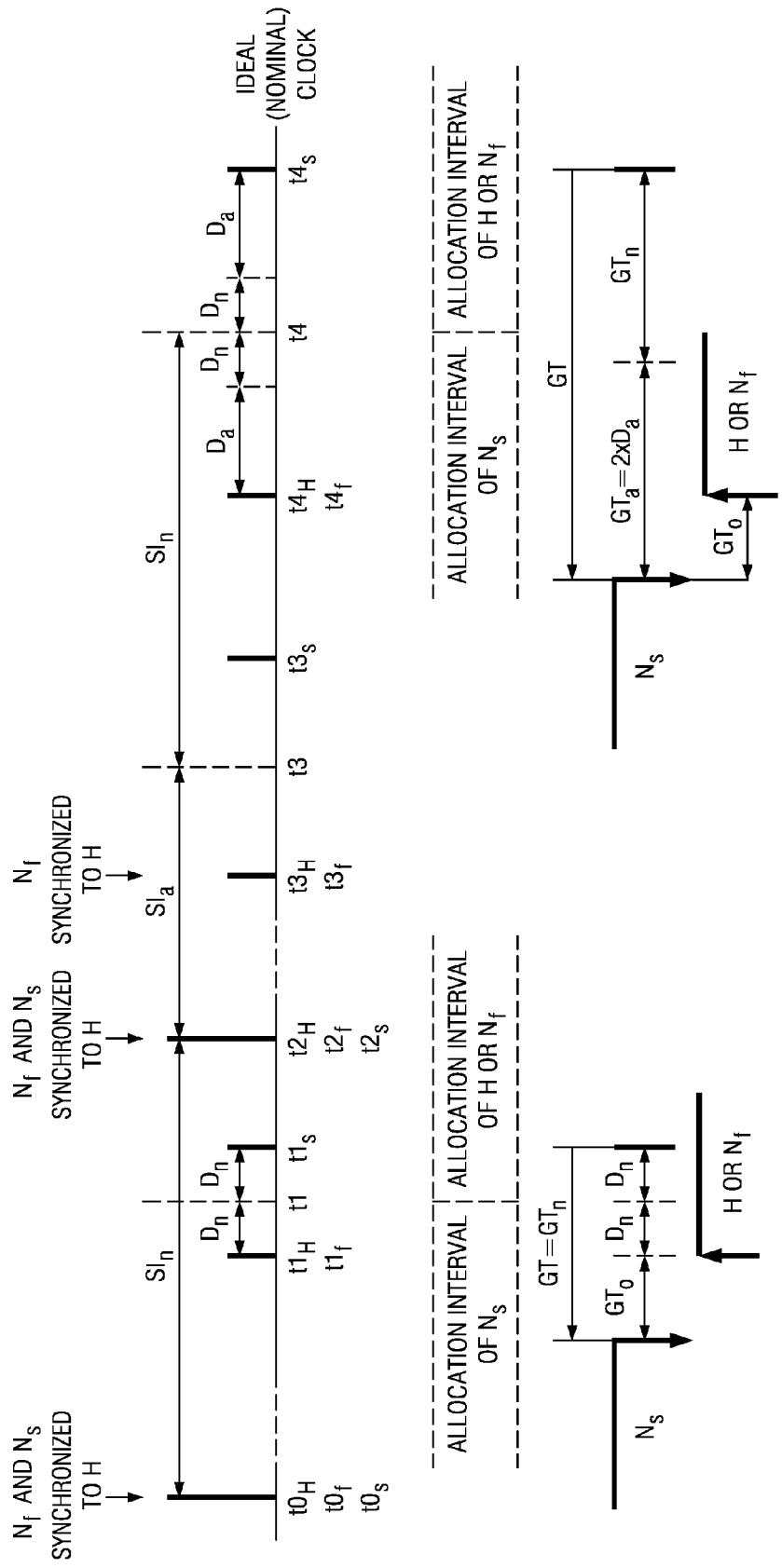
Figure 33:
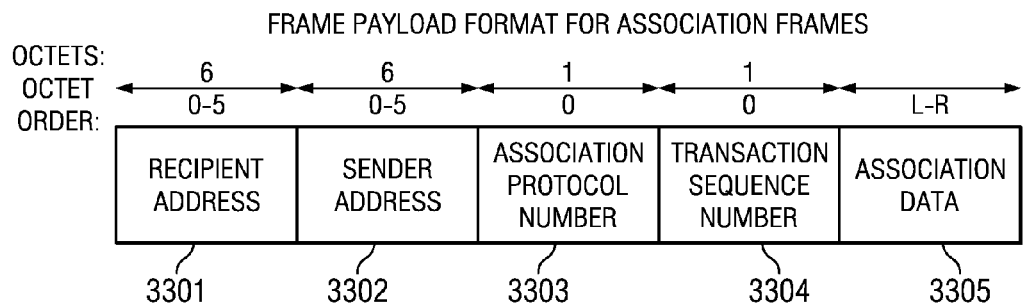
Figure 34:
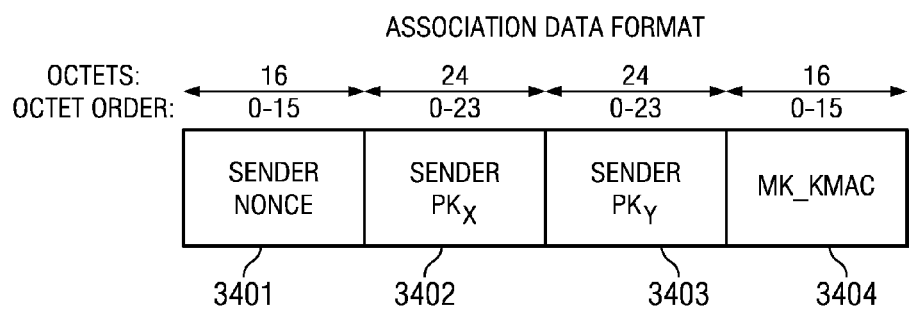
Figure 35:
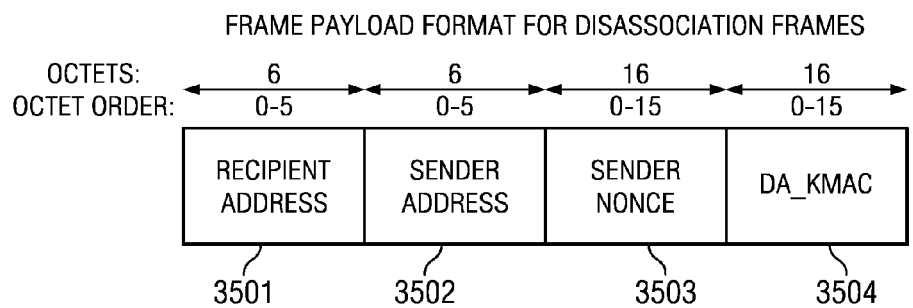
Figure 36:
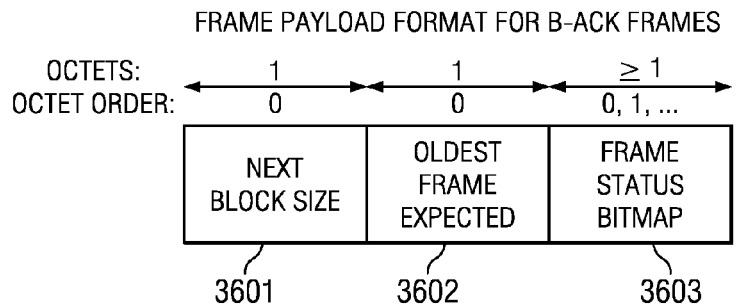
Figure 37:
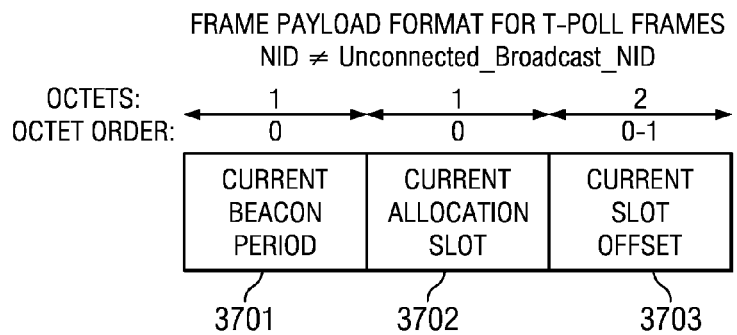
Figure 38:
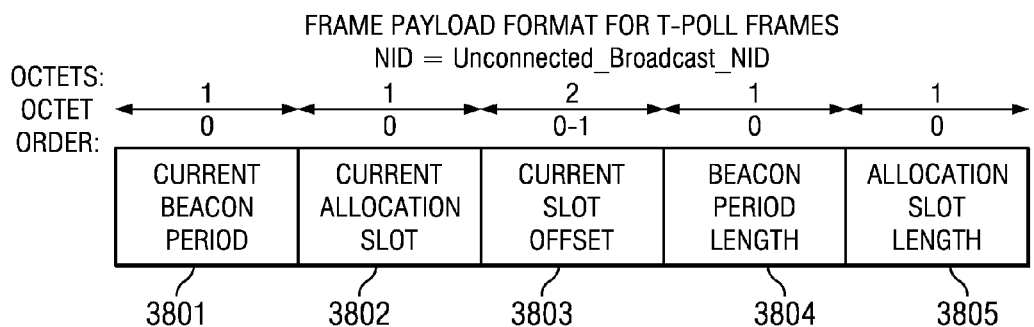
Figure 39:
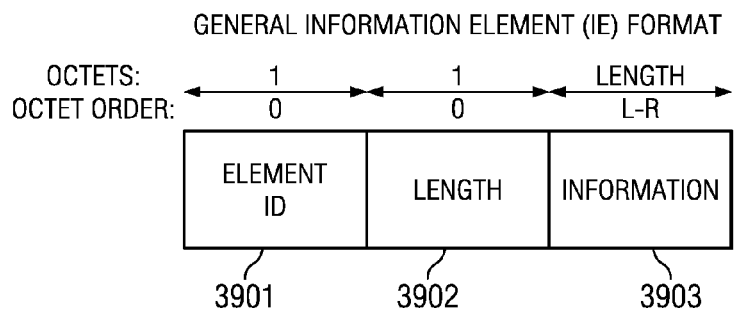
Figure 40:
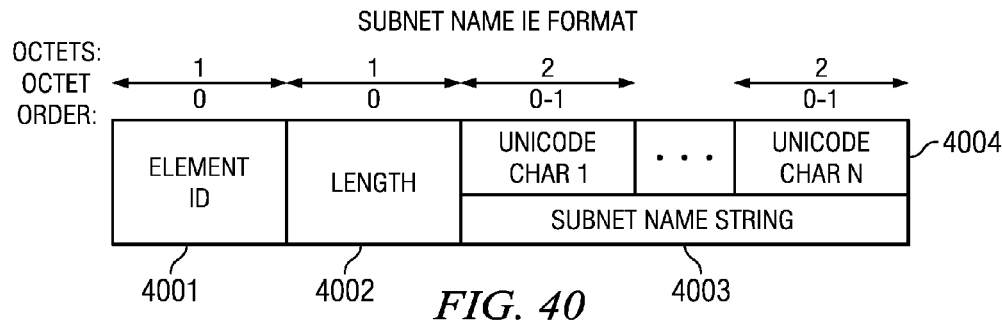
Figure 41:
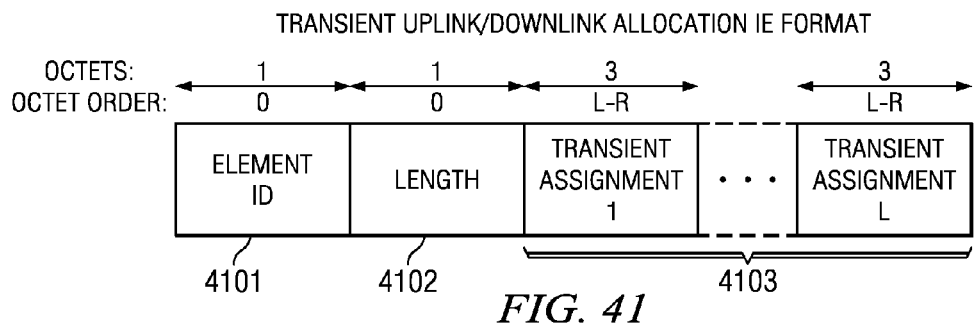
Figure 42:
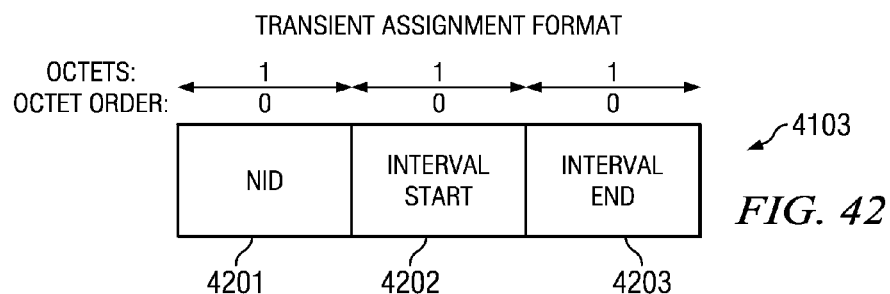
Figure 43:
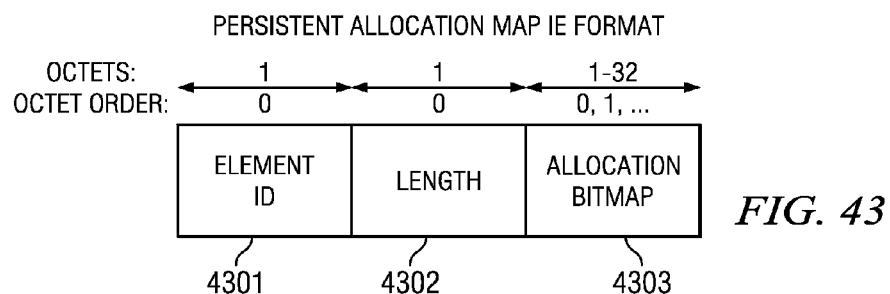
Figure 44:
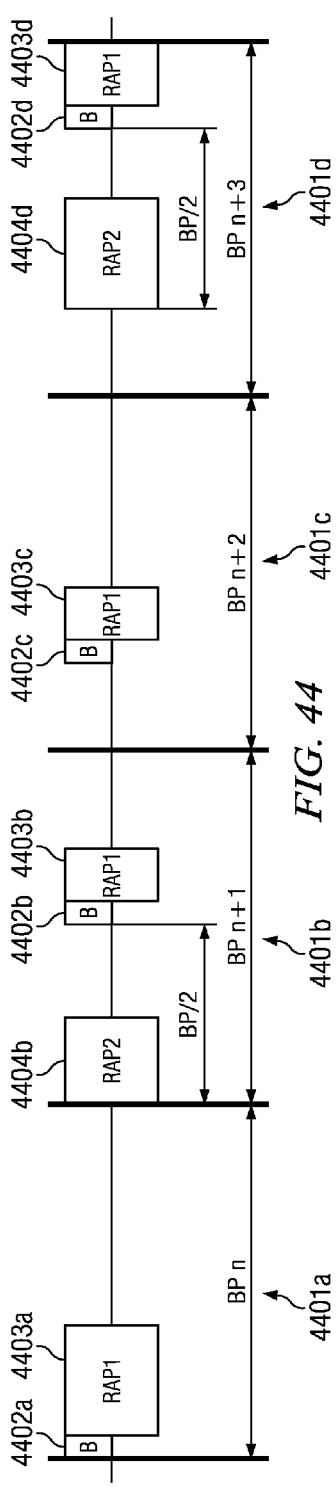
Figure 45:
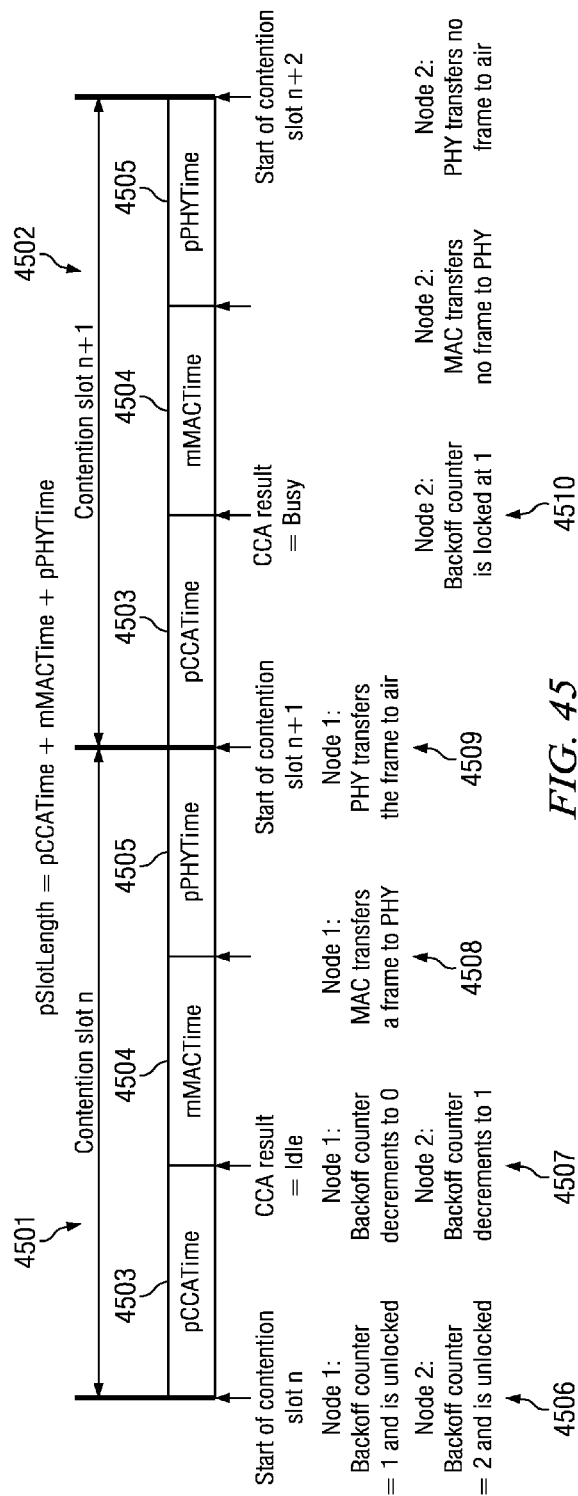
Figure 46:
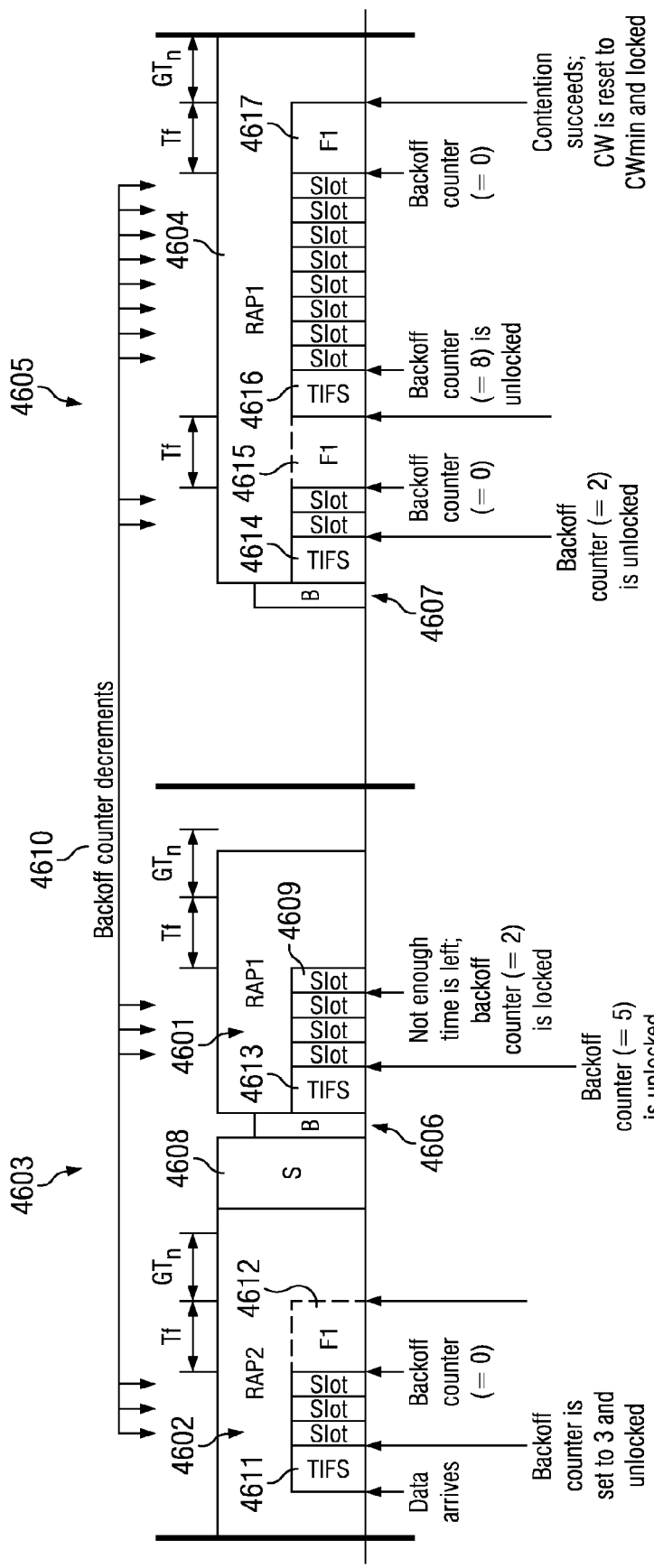
Figure 49:
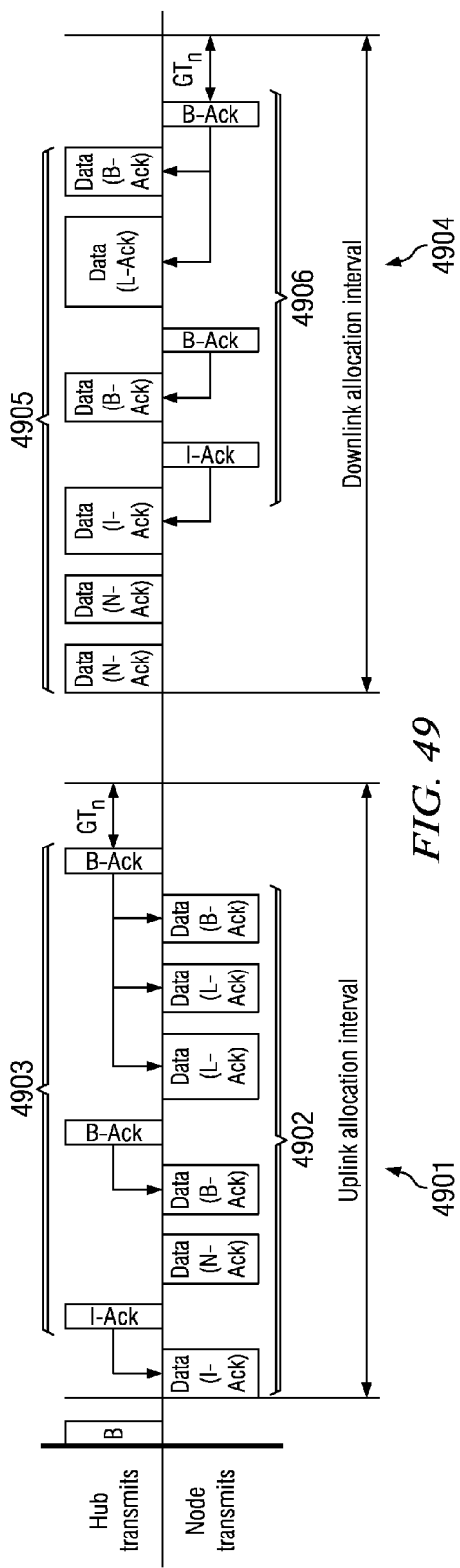
Figure 50:
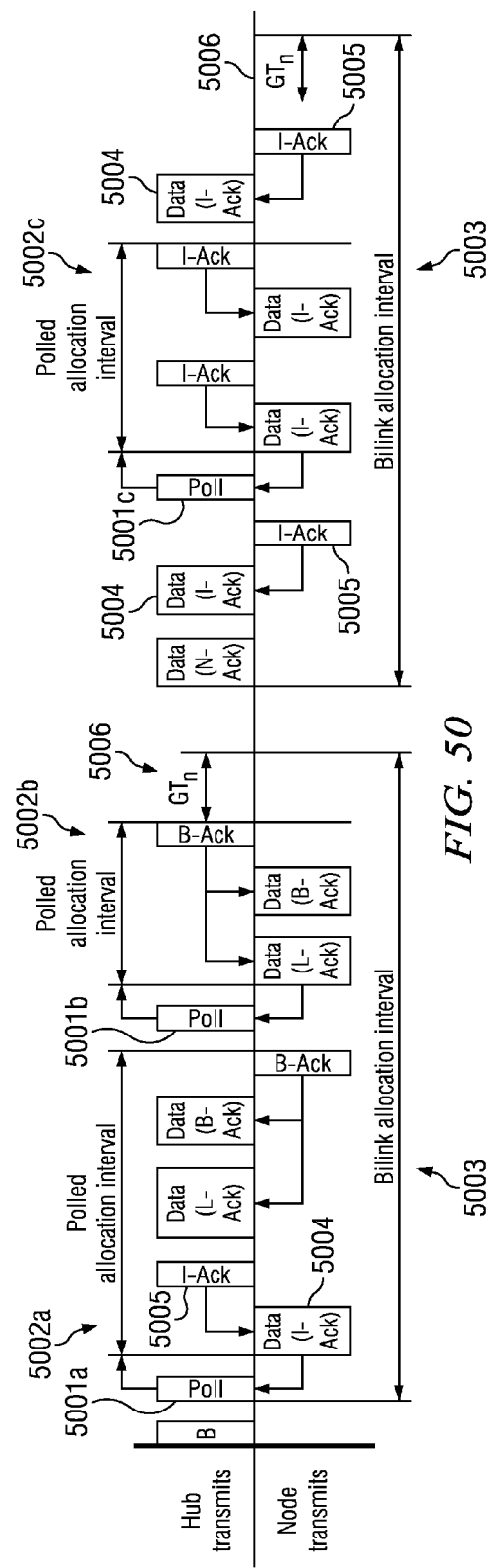
Figure 51:
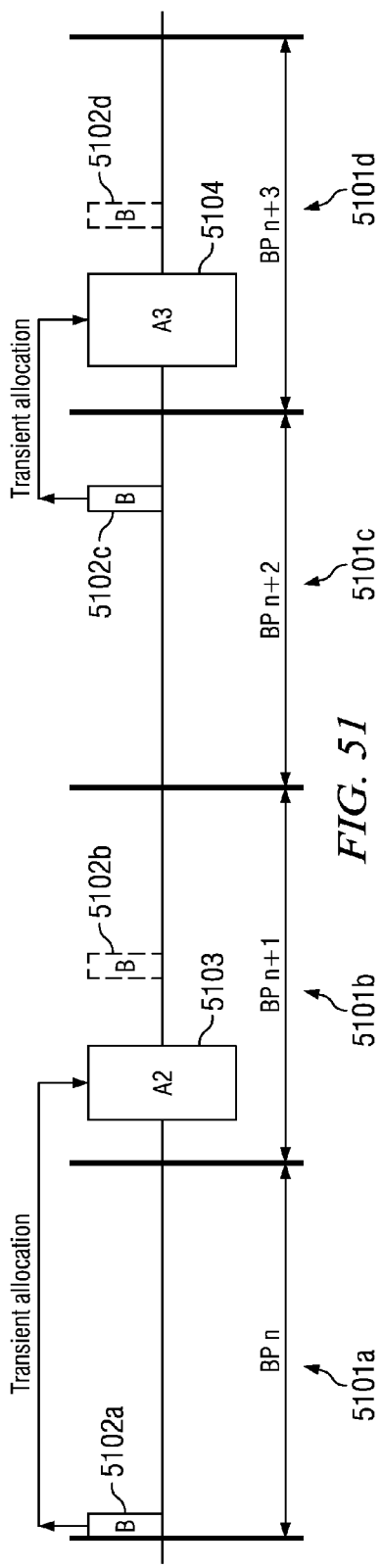
Figure 52:
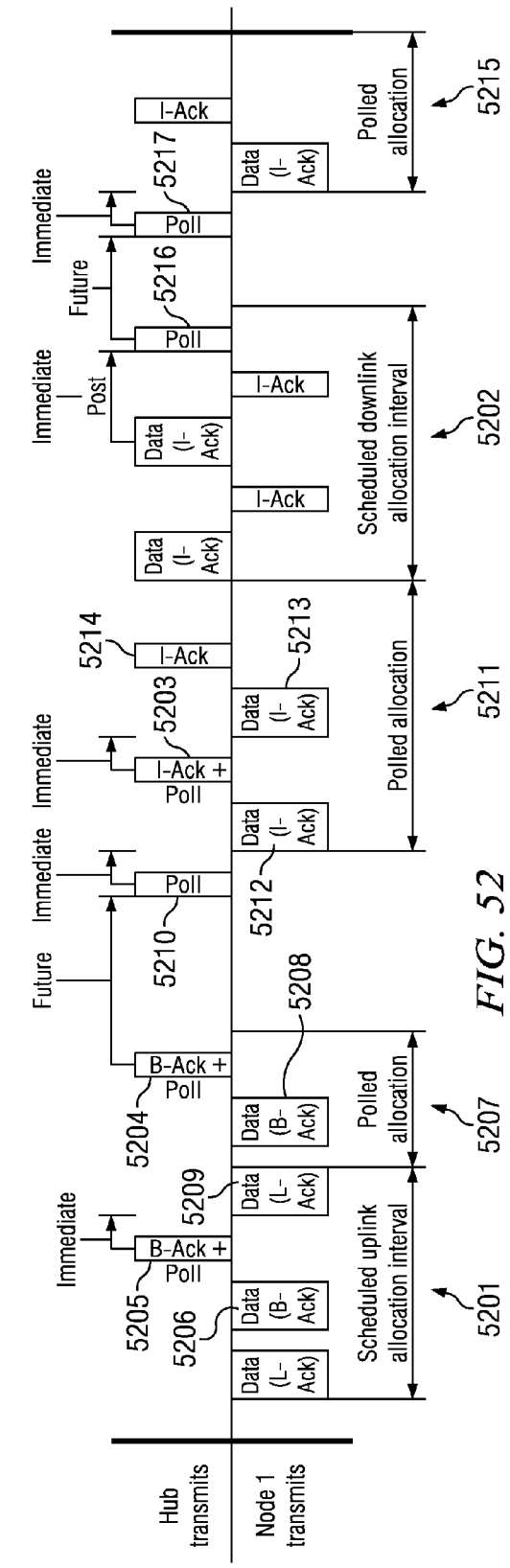
Figure 53:
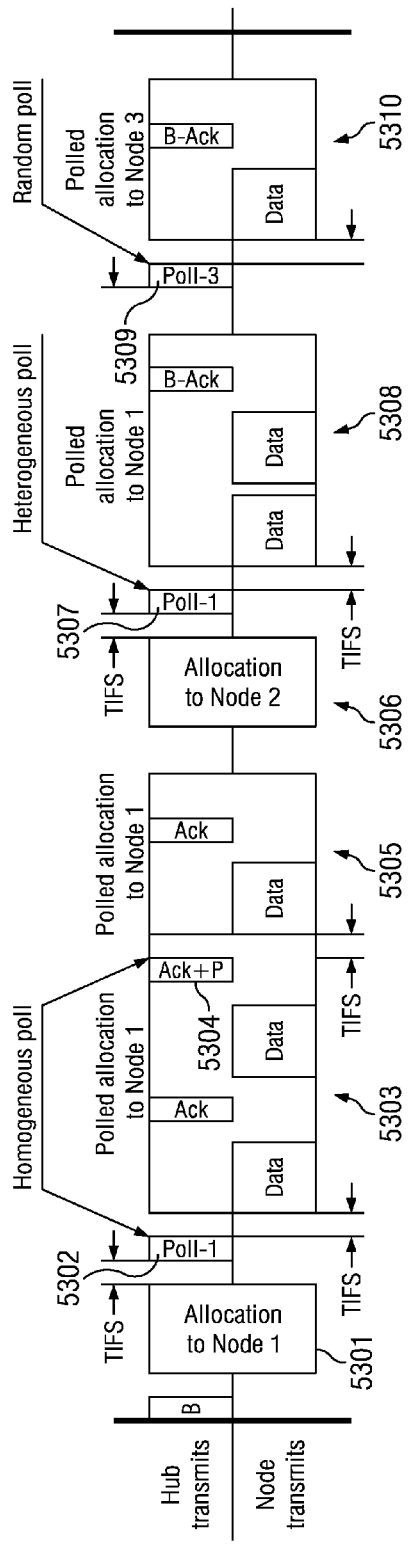
Figure 54:
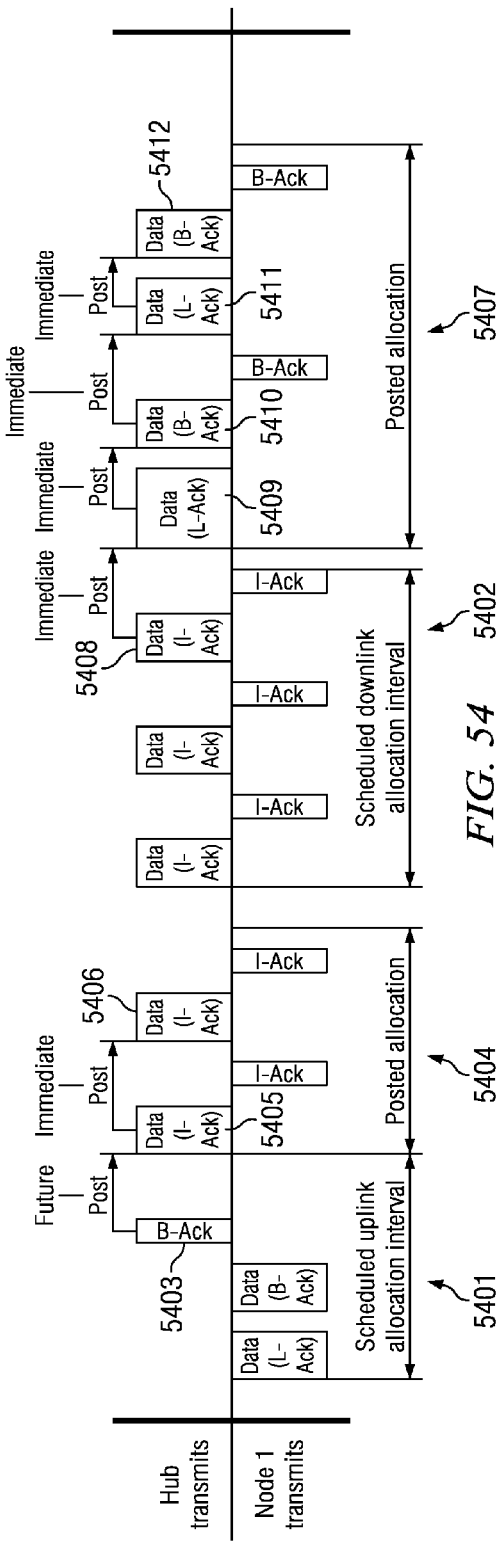
Figure 55:
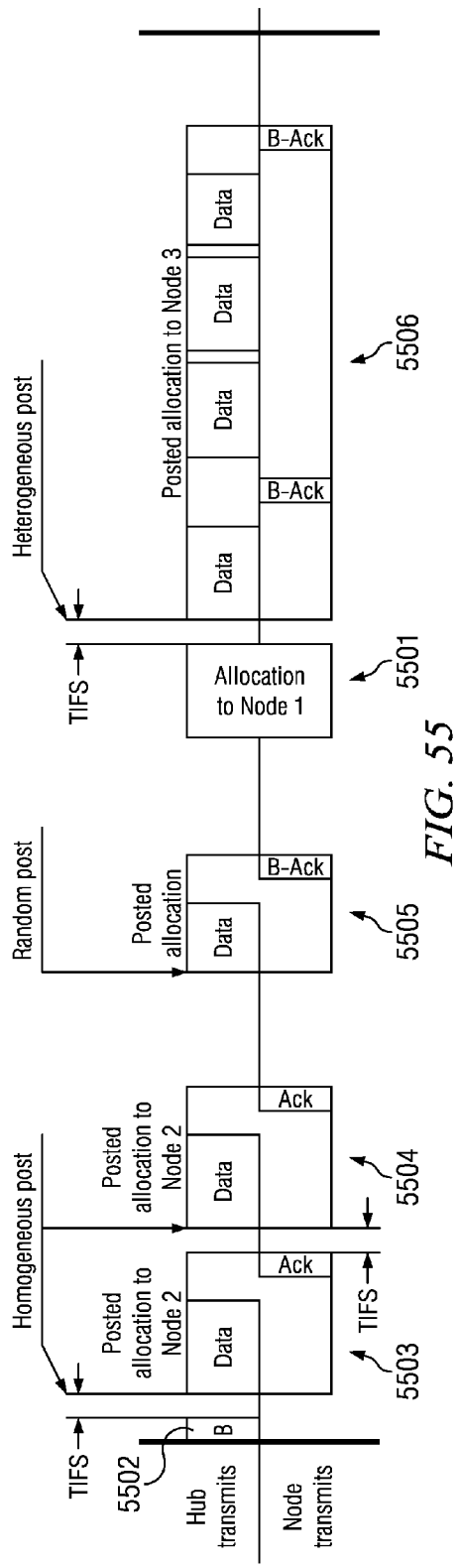
Figure 56:
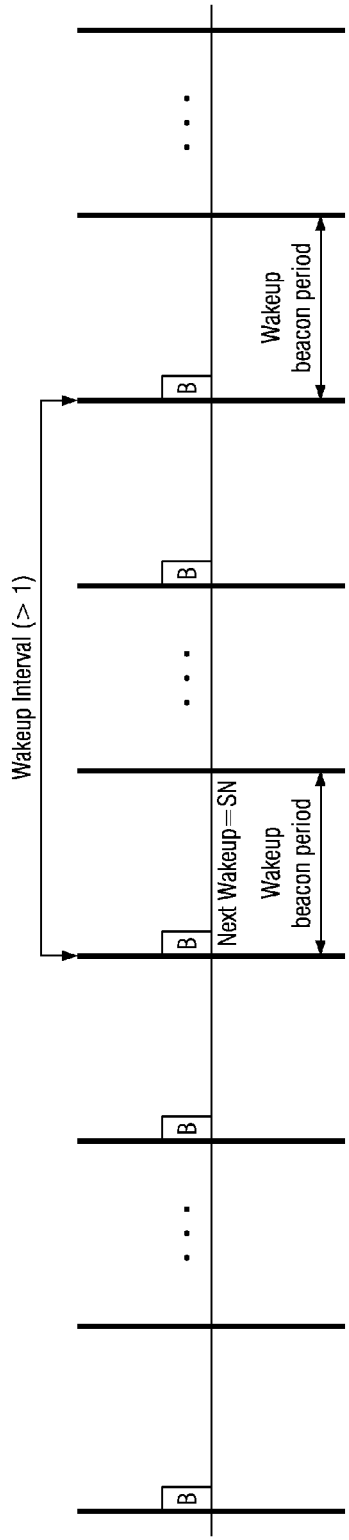
Figure 57:
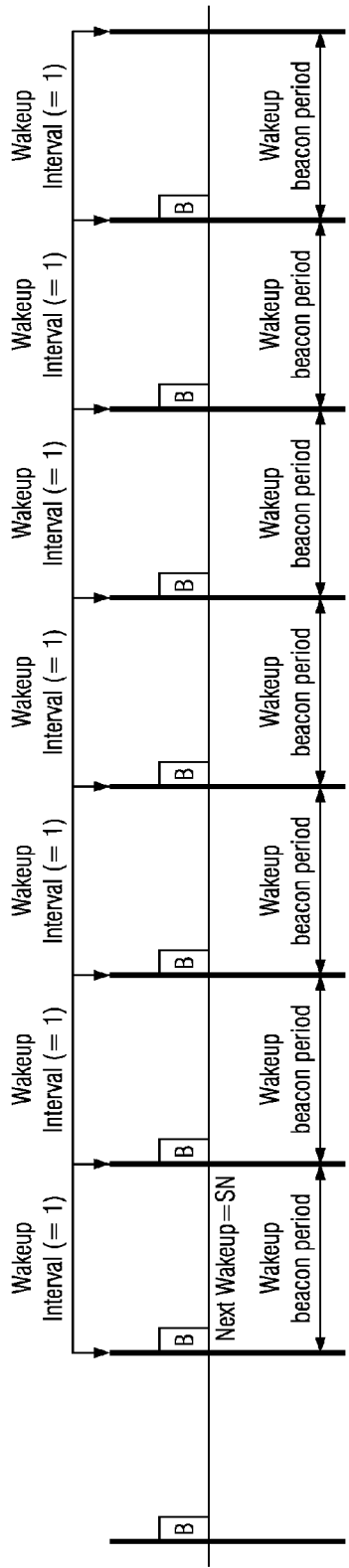
Figure 58:
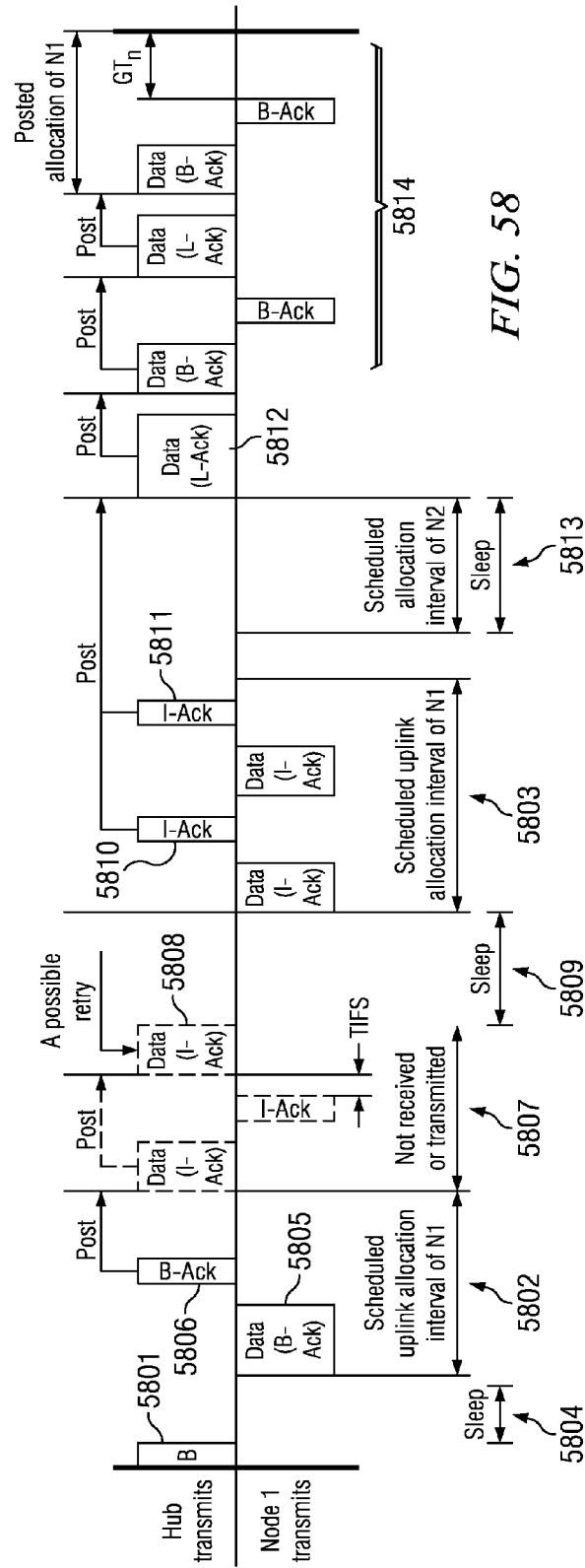
Figure 59:
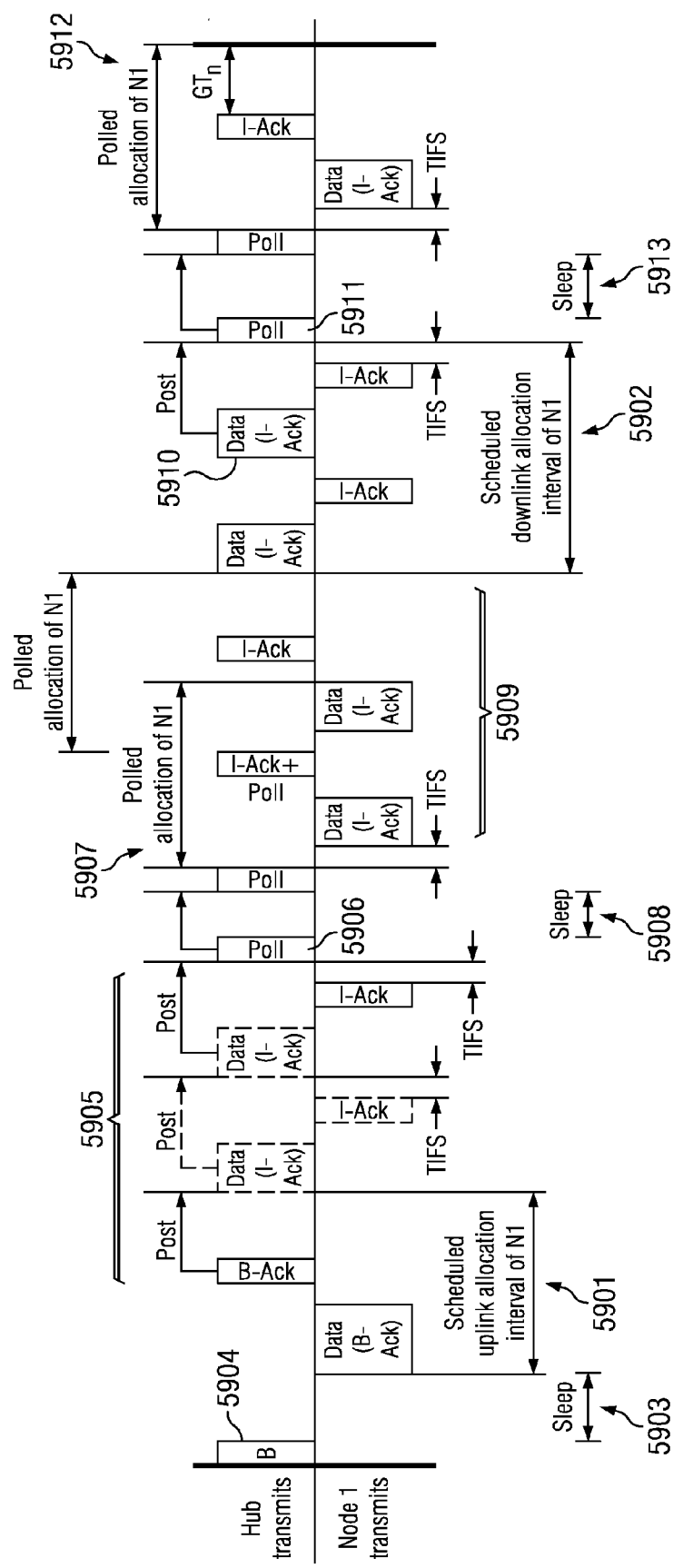

Having thus described the invention in general terms, reference will now be made to the accompanying drawings, wherein:

FIG. 1 illustrates a block diagram of hubs and nodes organized into subnets;

FIG. 2 is a block diagram of an exemplary embodiment of a device for use as a hub or node in the subnets illustrated in FIG. 1;

FIG. 3 illustrates the PHY layer and MAC sublayer used in one embodiment;

FIG. 4 illustrates a MAC state diagram followed by a node and a hub for secured frame exchanges with each other;

FIG. 5 illustrates a MAC state diagram followed by a node and a hub for unsecured communication with each other;

FIG. 6 illustrates of a MAC frame format;

FIG. 7 illustrates a MAC header format;

FIG. 8 illustrates a frame control format;

FIG. 9 illustrates a MAC frame body format;

FIG. 10 illustrates beacon signaling and interference mitigation procedures used by the hub;

FIG. 11 illustrates the frame payload format for a beacon frame;

FIG. 12 illustrates a beacon shifting sequence format;

FIG. 13 illustrates allocation slots in a beacon period;

FIG. 14 illustrates a security requirement field format;

FIG. 15 illustrates a security capability field format;

FIG. 16 illustrates a MAC capability field format;

FIG. 17 illustrates a PHY capability field format;

FIG. 18 illustrates a frame payload format for connection request frames;

FIG. 19 illustrates a change request format;

FIG. 20 illustrates an uplink, downlink, or billink request IE format;

FIG. 21 illustrates an allocation request field format;

FIG. 22 illustrates a frame payload format for connection assignment frames;

FIG. 23 illustrates an uplink, downlink, or bilink assignment IE format;

FIG. 24 illustrates an allocation assignment format;

FIG. 25 illustrates a channel order IE format;

FIG. 26 illustrates a disconnection frame payload format sent by a node;

FIG. 27 illustrates a disconnection frame payload format sent by a hub;

FIG. 28 illustrates a device HID conflict report frame format;

FIG. 29 illustrates an application-specific IE format;

FIG. 30 illustrates a channel change IE format;

FIG. 31 illustrates clock drift and guardtime provisioning with a slow hub clock;

FIG. 32 illustrates clock drift and guardtime provisioning with a fast hub clock;

FIG. 33 illustrates a frame payload format for association frames;

FIG. 34 illustrates an association data format;

FIG. 35 illustrates a frame payload format for disassociation frames;

FIG. 36 illustrates a payload format for B-Ack frames;

FIG. 37 illustrates a frame payload format for T-Poll frames;

FIG. 38 illustrates an alternative frame payload format for T-Poll frames;

FIG. 39 illustrates a general information element format;

FIG. 40 illustrates a subnet name IE format;

FIG. 41 illustrates a transient uplink/downlink allocation IE format;

FIG. 42 illustrates a transient assignment format;

FIG. 43 illustrates a persistent allocation map IE format;

FIG. 44 illustrates examples of random access phases (RAP) in different beacon periods;

FIG. 45 illustrates contention slots according to one embodiment of the invention;

FIG. 46 illustrates how contended allocations are started and used in one embodiment;

FIG. 47 illustrates a 1-periodic allocation interval occurring over a plurality of beacon periods;

FIG. 48 illustrates an m-periodic allocation interval repeating every m beacon periods;

FIG. 49 illustrates uplink and downlink frame transactions between a hub and a node;

FIG. 50 illustrates bilink frame transactions between a hub and a node;

FIG. 51 illustrates transient allocations assigned by a hub;

FIG. 52 illustrates polled allocations in relation to scheduled allocation intervals;

FIG. 53 illustrates polled allocations designated for a plurality of nodes;

FIG. 54 illustrates posts and posted allocation according to one embodiment;

FIG. 55 illustrates posted allocations designated for a plurality of nodes;

FIG. 56 illustrates macroscopic power management using node hibernation across a plurality of beacon periods;

FIG. 57 illustrates macroscopic power management using node hibernation across a single beacon periods;

FIG. 58 illustrates hub and node activity and sleep modes in a beacon period having scheduled and posted allocations; and FIG. 59 illustrates hub and node activity and sleep modes in a beacon period having scheduled, posted and polled allocations.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Embodiments of the invention provide a medium access control (MAC) sublayer in support of a physical layer for wireless body area networks (BANs). FIG. 1 illustrates a block diagram of hubs and nodes organized into logical sets, referred to as subnets in this specification. Subnets 101 and 102 may be independent BANs that operate independently. Each subnet 101, 102 includes a hub device (H1,H2) 103, 104 that communicates wirelessly with one or more nodes (N1a-d, N2a-d) 105, 106 in the same subnet. The subnets are coordinated by their respective hubs for medium access and power management. There is one and only one hub in a subnet, and the number of nodes in a subnet may range from zero to a predefined maximum number (mMaxNumberSubnet). The nodes may be low-power wireless devices operating on, in, or around a human or non-human body and providing a variety of applications such as medical connections, consumer electronics, and personal entertainment. Frame exchanges occur directly between nodes and the hub within the same subnet according to one embodiment. Subnets 101 and 102 may be in the same general physical location, but hubs 103, 104 and nodes 105, 106 operate to mitigate mutual interference between subnets 101, 102. Interference between adjacent or overlapping subnets may be mitigated, for example, through pseudo-random shifting of reference times across beacon periods or pseudo-random hopping of channels over time scales of multiple beacon periods. Communications between a hub and its respective nodes (e.g. hub 103 and nodes 105) may be secured or unsecured.

FIG. 2 is a block diagram of an exemplary embodiment of a device 200 for use as a hub 103, 104 or node 101, 102 in the subnets illustrated in FIG. 1. In one embodiment, device 200 is a hub, gateway, or controller controlling and communicating with one or more nodes. Processor 201 processes messages to be exchanged with other nodes via transceiver 202 and antenna 203 and/or via wireline interface 204 coupled to Internet or another subnet 205. Processor 201 may be a software, firmware, or hardware based device. Processor 201 may generate and transmit frames to other device or receive and process frames from other devices.

Memory 206 may be used to store data, such as frame structure, medium access control and power management information. Memory 206 may be secured from unauthorized access. Memory 206 may also be used to store computer program instructions, software and firmware used by processor 201. It will be understood that memory 206 may be any applicable storage device, such as a fixed or removable RAM, ROM, flash memory, or disc drive that is separate from or integral to processor 201.

Device 200 may be coupled to other devices, such as user interface 207, sensors 208, or other devices or equipment 209. In one embodiment, device 200 is a hub, gateway, or controller controlling and communicating with one or more nodes. In one embodiment, device 200 is a low-power wireless node operating on, in, or around a human or non-human body to serve one or more applications, such as medical connections, consumer electronics, and personal entertainment. Device 200 may be adapted to operate in a body area network either as a node or as a hub controlling a plurality of nodes. Sensors 208 may be used, for example, to monitor vital patient data, such as body temperature, heart rate, and respiration. Equipment 209 may be, for example, a monitor or other device that receives and analyzes signals, such as a patient's temperature, heart rate, and respiration, from another node. Alternatively, equipment 209 may be a device for providing a service to a patient, such as controlling an intravenous drip, respirator, or pacemaker.

When used as a node or hub in a body area network, the information transmitted or received by device 200 is likely to include sensitive or critical medical information or instructions. Accordingly, it is important to ensure that data transmitted by the nodes or hub is not disrupted or blocked by interference from other nodes within the same or other subnets. The messages transmitted or received by device 200 may also include control signals, such as signals to control distribution of medicine or operation of a respirator or pacemaker. It is important that these signals are properly transmitted and received to control equipment 209.

It will be understood that the subnets 105, 106 in FIG. 1 and device 200 in FIG. 2 are presented for illustrative purposes only and are not intended to limit the scope of the systems or devices that are capable of employing the frame encoding and power management procedures described herein. Any two devices in wireless or wireline communication with each other would be capable of using these procedures.

Nodes and hubs, such as device 200, are referenced herein in the context of a subnet. The nodes and hubs are internally partitioned into a physical (PHY) layer and a medium access control (MAC) sublayer. FIG. 3 illustrates the PHY layer and MAC sublayer used in one embodiment in accordance with the ISO/OSI-IEEE 802 reference model. Direct communications between a node and a hub transpire at the PHY layer and MAC sublayer. The PHY and MAC sublayer of a node or a hub operate in one channel at any given time. Message security services occur at the MAC sublayer, and security key generations take place inside and/or outside the MAC sublayer.

Within a node or a hub, the PHY provides its service to the MAC through the PHY service access point (SAP) 301, 302 located between them, and the MAC provides its service to the MAC client through the MAC SAP 303, 304 located immediately above the MAC sublayer. There may be a logical node management entity (NME) 305 or hub management entity (HME) 306 that exchanges network management information with the PHY and MAC as well as with other layers. The HME 306 is a superset of the NME 305 in terms of the management functionality they each support. It will be understood that the presence of the NME or HME and the partitioning between the NME or HME and the MAC or the PHY as described above is not mandated.

FIG. 4 is a state diagram illustrating states that nodes and hubs go through at the MAC level before they exchange user (MAC client) data if either of the hub or node requires secured frame exchanges with the other. FIG. 4 also indicates the frames permitted or required to be exchanged at each state. The state classifications and transitions are defined with respect to a pair of a node and a hub, but may be referenced in the name of the node only. The node begins in orphan state 401 in which the node does not have a relationship with a hub for secured communication. The node initially enters into a relationship with a hub from state 401, and the node and a hub transmit only association and control unsecured frames to each other to agree on a shared master key. The node may find a hub from received beacons and/or polls and then exchange association frames with the hub to establish an association, which allows the node to transition to the associated state 402. If the node and the hub fail to activate or establish a shared master key, they do not advance to the associated state.

In the associated state 402, the node is associated (i.e., holds a shared master key (MK)) with a hub for pairwise temporal key creation. The node and the hub may transmit only disassociation, pairwise temporal key (PTK), and control unsecured frames to each other in the associated state 402. The node may exchange PTK frames with the hub to establish a secured relationship by verifying possession of a shared MK and creating a PTK, thereby transitioning to the secured state 403. If the node and the hub fail to create a PTK, they shall not advance to the secured state 403. To repeal an association and hence the current MK, either the node or the hub may send a disassociation frame to the other, thus moving back to the orphan state 401.

In the secured state 403, the node is secured (i.e., holds a PTK) with a hub for message security, which allows for secured frame exchanges. The node and the hub may transmit only disassociation, connection request, and connection assignment secured frames and control unsecured frames in the secured state 403. The node exchanges connection request and connection assignment frames with the hub to establish a connection, thereby transitioning to the connected state 404. If the node and the hub fail to establish a connection, they shall not advance to the connected state 404.

In the connected state 404, the node is connected (i.e., holds an assigned Connected_NID, a wakeup arrangement, and optionally one or more scheduled allocations) with a hub for abbreviated node addressing, desired wakeup, and optionally scheduled access. The node and the hub may transmit any secured frames to each other except for association secured frames, but shall not transmit any unsecured frames to each other other than control unsecured frames. Frame-by-frame security protection is performed in connected state 404. To repeal the Connected_NID, the wakeup arrangement, and the scheduled allocations assigned to the node, either the node or the hub sends a disconnection frame to the other, thereby moving back to the secured state 403.

FIG. 5 illustrates the MAC state diagram that a node and a hub follow for unsecured communication if neither requires secured frame exchanges with the other. In orphan state 501, the node does not have a relationship with a hub for unsecured communication. From orphan state 501, the node initially enters into a relationship with a hub. The node and the hub may transmit only connection request, connection assignment, and control unsecured frames to each other. The node otherwise noted, fields that are set to reserved values or defined based on other fields that are set to reserved values are ignored on reception.

FIG. 7 illustrates the format and contents of MAC header 601. Hub identifier (HID) field 701 comprises an abbreviated address of the hub. HID field 701 is set to the two octets containing the 16 least-significant bits of the IEEE MAC address of the hub that is the sender or recipient of the current frame. Node identifier (NID) field 702 comprises an abbreviated address of a single node or of a logical group of nodes. NID field 702 is set according to Table 1 such that it identifies the node that is the sender or recipient of the current frame.

TABLE 1

| NID VALUE IN HEX | NID SUBTOTAL | NID NOTATION | NID USAGE |
| --- | --- | --- | --- |
| x00 | 1 | Unconnected_Broadcast_NID | For broadcast to unconnected nodes |
| x01-0F | 15 | Unconnected_NID | For unicast to unconnected nodes |
| x10-EF | 224 | Connected_NID | For unicast to/from connected nodes |
| xF0-FE | 15 | Multicast_NID | For multicast to connected nodes |
| xFF | 1 | Broadcast_NID | For broadcast to all nodes | establishes a connection with the hub by exchanging connection request and connection assignment frames and thereby transitioning to the connected state 502. If the node and the hub fail to establish a connection, they will not advance to the connected state.

In the connected state 502, the node is connected (i.e., holds an assigned Connected_NID, a wakeup arrangement, and optionally one or more scheduled allocations) with a hub for abbreviated node addressing, desired wakeup, and optionally scheduled access. The node and the hub transmit any unsecured frames to each other expect for association, disassociation, and PTK frames, and do not transmit secured frames to each other in connected state 502. No frame-by-frame security protection is provided in connected state 502. To change to secured communications, the node and the hub disconnect from each other, which moves them back to the orphan state 501, and then follow the state diagram FIG. 4 to establish secured communication. To repeal the Connected_ NID, the wakeup arrangement, and the scheduled allocations assigned to the node, either the node or the hub sends a disconnection frame, which moves the node and hub back to the orphan state 501.

Data is transferred between the node and hub in medium access control (MAC) sublayer frames. FIG. 6 illustrates the general format of a MAC frame 600, which consists of a fixed-length MAC header 601, a variable-length MAC frame body 602, and a fixed-length frame check sequence (FCS) field 603. A MAC frame is an ordered sequence of fields delivered to or from the PHY SAP. The fields contained in a MAC frame are defined in further detail below. In the figures referenced herein, the MAC frames are ordered left to right in the transmit order. The figures also indicate the number of octets contained in each field and the corresponding octet transmit order. Unless otherwise noted herein, an atomic field (i.e., a field that is not in turn comprised of other fields) denotes a numerical value encoded in unsigned binary. Reserved fields are set to zero on transmission and ignored on reception. If some values in a field are reserved, the field is not set to any of those reserved values on transmission. Unless In an alternative embodiment, HID field 701 (2 octets) and NID field 702 (1 octet) are selected as identified above and an additional bit is set that identifies whether the current frame is sent from or to a hub. This additional bit may be, for example, one of the reserved bits in the frame control field (812, FIG. 8). Setting the additional bit provides for direction identification of the current format.

In another alternative embodiment, HID field 701 and NID field 702 are replaced with a Recipient ID field (1 octet), Sender ID field (1 octet), and Subnet ID field (1 octet). This arrangement allows for direction identification and subnet selection through the subnet ID. The combination of 1-octet long Recipient ID, Sender ID, and Subnet ID fields require only three octets altogether which corresponds to the space currently allocated for the HID and NID fields. Accordingly, the same number of bits can be used in alternative embodiments to provide for combined hub/node identification and direction identification.

The format of frame control field 703 is shown in greater detail in FIG. 8. Protocol Version field 801 indicates the revision version of the controlling standard. This field is invariant in size and place across all revisions of this standard. Security Level field 802 is set according to Table 2 such that it indicates the security level of the current frame.

TABLE 2

| FIELD VALUE b2 b3 | SECURITY LEVEL OF CURRENT FRAME |
| --- | --- |
| 00 | Level 0 - frame not secured |
| 10 | Level 1 - frame authenticated but not encrypted |
| 01 | Level 2 - frame authenticated and encrypted |
| 11 | Reserved |

TK Index field 803 is set to indicate the pairwise temporal key (PTK) or group temporal key (GTK) being used to secure the current frame. In frames secured by a PTK, field 803 is set to the value of the PTK Index field in the PTK frames that were exchanged in creating the PTK. In frames secured by a GTK, field 803 is set to the value of the GTK Index field in the GTK frame that was exchanged in distributing the GTK. The TK Index field is reserved in unsecured frames.

Retry field 804 is set to 1 in any non-beacon management or data type frame that was transmitted previously and is being transmitted again. It is reserved in all other frames. Ack Policy field 805 is set according to Table 3 to indicate the acknowledgement requirement of the current frame.

TABLE 3

| FIELD VALUE b6 b7 | ACKNOWLEDGMENT REQUIREMENT |
|---|---|
| 00 | No acknowledgment (N-Ack) |
| 10 | Immediate acknowledgment (I-Ack) |
| 11 | Block acknowledgment later (L-Ack) |
| 01 | Block acknowledgment (B-Ack) |

Frame Type field 806 is set to indicate the type of the current frame according to Table 4. Frame Subtype field 807 is set to indicate the subtype of the current frame of a given type according to Table 4.

TABLE 4

| FRAME TYPE VALUE b0 b1 | FRAME TYPE NAME | FRAME SUBTYPE VALUE b2 b3 b4 b5 | FRAME SUBTYPE NAME |
|---|---|---|---|
| 00 | Management | 0000 | Beacon |
| 00 | Management | 1000 | Reserved |
| 00 | Management | 0100 | Association |
| 00 | Management | 1100 | Disassociation |
| 00 | Management | 0010 | PTK |
| 00 | Management | 1010 | GTK |
| 00 | Management | 0110-1110 | Reserved |
| 00 | Management | 0001 | Connection Request |
| 00 | Management | 1001 | Connection Assignment |
| 00 | Management | 0101 | Disconnection |
| 00 | Management | 1101-0111 | Reserved |
| 00 | Management | 1111 | Command |
| 10 | Control | 0000 | I-Ack |
| 10 | Control | 1000 | B-Ack |
| 10 | Control | 0100 | I-Ack + Poll |
| 10 | Control | 1100 | B-Ack + Poll |
| 10 | Control | 0010 | Poll |
| 10 | Control | 1010 | T-Poll |
| 10 | Control | 0110-1111 | Reserved |
| 01 | Data | 0000-1111 | User defined data subtype |
| 11 | Reserved | 0000-1111 | Reserved |

More Data field 808 is set depending upon which device sent the frame and the type of frame. In frames sent by a node to the hub: field 808 is set 0 if the node has no pending frame transactions to initiate with the hub, or set to 1 if the node has one or more pending frame transactions to initiate with the hub. In non-beacon management and data type frames sent by a hub to a node: field 808 is set to 0 if the hub is not to send a post to the node after the current frame transaction, or is set to 1 if the hub is to send a post to the node turnaround inter-frame space (TIFS) after the end of the current frame transaction. In I-Ack and B-Ack frames sent by a hub to a node: field 808 is set to 0 if the hub is not to send a post to the node after the end of the current allocation interval, or is set to 1 if the hub is to send a post to the node at or after the end of the current allocation interval. In the latter case, when the hub is to send a post to the node is indicated in a Sequence Number field and a Fragment Number field of the current frame. In I-Ack+Poll, B-Ack+Poll, Poll, and T-Poll frames sent by a hub to a node: field 808 is set to 0 if the hub grants to the node through this frame a polled allocation starting TIFS after the end of the current frame, with the end of the polled allocation indicated in the Sequence Number field of the current frame, or is set to 1 if the hub grants to the node through this frame no polled allocation but is to send another poll to the node at a future time as indicated in the Sequence Number and Fragment Number fields of the current frame. In all other frames sent by a hub to a node, it is reserved.

First Frame field 809 is set to 1 if this is the first frame sent at the start of a scheduled allocation interval. It is set to 0 otherwise.

Sequence Number field 810 is set depending upon the type of frame. In beacon frames, field 810 is incremented by one from its value in the last transmitted beacon. In non-beacon management type frames, field 810 is reserved. In I-Ack and B-Ack frames sent by a hub to a node, field 810 is set depending upon More Data field 808. If More Data field 808 of the current frame is set to 0, field 810 is reserved. If More Data field 808 of the current frame is set to 1, field is set to A such that the hub is to send a post to the node at the start of the allocation slot numbered A, in a beacon period indicated in the Fragment Number field of the current frame. In I-Ack and B-Ack frames sent by a node to a hub, field 810 is reserved. In I-Ack+Poll, B-Ack+Poll, Poll, and T-Poll frames sent by a hub to a node, field 810 is set depending upon More Data field 808. If More Data field 808 of the current frame is set to 0, indicating that the node is granted via this frame a polled allocation starting TIFS after the end of this frame, then field 810 is set to A such that the polled allocation ends at the end of the allocation slot numbered A in the current beacon period. If More Data field 808 of the current frame is set to 1, indicating that the node is granted via this frame no polled allocation but is to be sent another poll, then field 810 is set to A such that the hub is to send the next poll at the start of the allocation slot numbered A, in a beacon period indicated in the Fragment Number field of the current frame. In data type frames, field 810 is incremented by one from its value in the frame that was of the same subtype and addressed to the same recipient(s) and that contained the previous MAC service data unit (MSDU) or part thereof; and field 810 has the same value in frames containing fragments of the same MSDU.

Fragment Number field 811 is set depending upon the type of frame. In beacon frames, field 811 is set to 7 if the hub sending the current beacon frame is not to hop to another channel in the next 7 beacon periods not counting the current beacon period; and is set to H<7 if the hub sending the current beacon frame is to hop to the next channel in its channel hopping sequence at the end of the next Hth beacon period not counting the current beacon period if H>0 or at the end of the current beacon period if H=0. In non-beacon management type frames containing a frame payload not fragmented or the first fragment of a fragmented frame payload, field 811 is set to 0. In non-beacon management type frames containing a non-first fragment of a fragmented frame payload, field 811 is incremented by one from its value in the frame containing the previous fragment of the frame payload. In data type frames containing an MSDU not fragmented or the first fragment of a fragmented MSDU, field 811 is set to 0. In data type frames containing a non-first fragment of a fragmented MSDU, field 811 is incremented by one from its value in the frame containing the previous fragment of the MSDU. In I-Ack and B-Ack frames sent by a hub to a node, field 811 is reserved if the More Data field of the current frame is set to 0; and field 811 is set to B such that the allocation slot is the one located in the current beacon period if B=0 or in the next Bth beacon period not counting the current beacon period if B>0, if the More Data field of the current frame is set to 1, indicating that the hub is to send a post to the node at the start of the allocation slot indicated in the Sequence Number field of the current frame. In I-Ack and B-Ack frames sent by a node to a hub, field 811 is reserved. In I-Ack+Poll, B-Ack+Poll, Poll, and T-Poll frames sent by a hub to a node, field 811 is reserved, if the More Data field of the current frame is set to 0, indicating that the node is granted via this frame a polled allocation starting TIFS after the end of this frame and ending at the end of the allocation slot indicated in the Sequence Number field of the current frame; and field 811 is set to B such that the allocation slot is the one located in the current beacon period if B=0 or in the next Bth beacon period not counting the current beacon period if B>0, if the More Data field of the current frame is set to 1, indicating that the node is granted via this frame no polled allocation but is to be sent another poll at the start of the allocation slot indicated in the Sequence Number field of the current frame.

The bits in reserved field 812 may be designated for use in additional services, such as to indicate the direction of the frame, i.e., to identify whether the current frame is sent from a hub or to a hub.

FIG. 9 is a detailed illustration of the fields in MAC frame body 602 (FIG. 6). The Security Sequence Number 901 and Message Integrity Code (MIC) 903 fields are not present in unsecured frames. The Security Level field 802 of the frames MAC header indicates whether the frame is secured or unsecured.

Security Sequence Number field 901 is set as follows for nonce construction and replay detection. In frames secured with a new pairwise temporal key (PTK) or group temporal key (GTK), field 901 is set to 1. In frames secured with a used PTK, whether they are transmitted for the first time or they are retries, field 901 is incremented by one from its value in the last transmitted frame secured with the same PTK. In frames secured with a used GTK, whether they are transmitted for the first time or they are retries, field 901 is incremented by one from its value in the last transmitted frame secured with the same GTK. The value of the Security Sequence Number field 901 increments in frames secured with the same PTK or GTK, rather than in frames of the same frame type or frame subtype. Field 901 increments even if the current frame transmission is a retransmission of an earlier transmission.

Frame Payload field 902 is set as follows. In management type frames that are not encrypted, field 902 is set to a sequence of fields to be communicated to the recipient, such as data associated with a beacon, association, disassociation, PTK, GTK, connection request, connection assignment, or disconnection. In control type frames, field 902 is set to a sequence of fields to be communicated to the recipient. In data type frames that are not encrypted, field 902 is set to a sequence of octets passed as an MSDU through the MAC SAP to the MAC, without altering the order of the sequence. In management or data type frames that are encrypted, field 902 is set to the encrypted frame payload (i.e., the cipher text of the frame payload that would otherwise be communicated in a frame not encrypted). If a frame payload is fragmented and carried in multiple frames, the Frame Payload field is set to a fragment of the otherwise unfragmented frame payload. If the Frame Payload has a zero length (i.e., if a frame does not have a Frame Payload), then the frame does not have a MAC frame body either.

MIC field 903 is set to a message authentication code for preserving the authenticity and integrity of the MAC header and the MAC frame body of the current secured frame. It will be apparent to those of ordinary skill in the art that message integrity code (MIC) has the same meaning as message authentication code which also has the acronym "MAC".

FCS field 603 comprises the bits $a_{15}, a_{14}, \ldots, a_0$, which are the binary coefficients of a CRC polynomial of degree 15 denoted as:

$$R(x)=a_{15}x^{15}+a_{14}x^{14}+\ldots+a_1x+a_0 \tag{1}$$

The CRC polynomial is calculated over a calculation field using the following CRC-16-CCITT standard generator polynomial of degree 16:

$$G(x)=x^{16}+x^{12}+x^5+1 \tag{2}$$

The calculation field is the MAC frame except the FCS field (i.e. fields 601+602). It is mapped to a message polynomial M(x) of degree k−1, where k is the number of bits in the calculation field. The least-significant bit of the first octet presented to the PHY SAP is the coefficient of the $x^{k-1}$ term, the next least-significant bit is the coefficient of the $x^{k-2}$ term, . . . , and the most-significant bit of the last octet transmitted is the coefficient of the $x^0$ term. The CRC polynomial is the remainder resulting from $[x^{16} \times M(x)]$ divided (modulo 2) by G(x):

$$R(x)=x^{16} \times M(x) \bmod G(x). \tag{3}$$

The MAC frame may be used, for example, by the hub to transmit beacon data to connected and unconnected nodes. FIG. 10 illustrates one embodiment of the beacon signaling and interference mitigation procedures used by the hub. The hub transmits a beacon frame 1001 in each beacon period 1002. The beacon periods repeat at regular intervals defined by a beacon period reoccurring time (BPRT) 1003. The beacon frame 1001 contains timing, access, and capability information. If the beacon frames 1001 for neighboring hubs repeat at the same or similar intervals, then inter-subnet interference would likely occur. In order to mitigate inter-subnet interference, the beacon transmission time, relative to the beacon period recurring time (BPRT) 1003, changes from one beacon period 1002 to next according to a pseudo-random (PN) beacon shifting sequence. Different PN sequences are used by neighboring hubs, which mitigate against repeated inter-subnet beacon collisions.

Each pseudo-random PN sequence is identified by an index number m as illustrated in FIG. 10. The PN sequences define a beacon frame position within each of four phases n. The beacon frame position is defined as an offset (i.e. beacon transmission time offset (BTTO)) with respect to the BPRT. The BTTO repeats according to the designated PN sequence every four phases. The BTTO is defined as an offset from the BPRT in units of one-quarter of the beacon period (i.e. BTTO=BP/4×$PN_m(n)$). Accordingly, the potential PN sequence values (0, 1, 2, 3) define potential offsets at each quarter of the beacon period (BP×0, ¼ PB, ½ BP, ¾ BP). The sequence number m and the current phase n of the PN sequence are encoded and transmitted by the hub in each beacon frame 1001, which allows each node in the subnet to readily determine next beacon frame time. The beacon frames may be transmitted by the hubs in secured (authenticated but not encrypted) or unsecured (neither authenticated nor encrypted) frames.

The values of the beacon shifting sequence for the index m=0 are all set to 0 (i.e., $PN_0(n)=0$, n=0, 1, . . . ). With this sequence, the beacon transmission time always occurs at the start of each beacon period. For other index m values, the beacon shifting sequence $PN_m(n)$ adjusts the beacon transmission time among two or more values selected from the values: 0, 1, 2, and 3. Examples of beacon shifting sequences $PN_m(n)$ for different values of index m are shown below in Table 5. The hub should choose a beacon shifting sequence $PN_m(n)$ that is not being used by neighboring hubs in order to mitigate potential repeated beacon collisions. The use of different beacon shifting sequences $PN_m(n)$ between overlapping or adjacent networks will also reduce conflicts between nodes by the nodes' transmissions at scheduled or allocated times. Beacon shift sequence index m=5 from Table 5 is illustrated in the example of FIG. 10.

TABLE 5

| BEACON SHIFTING SEQUENCE INDEX (m) | BEACON SHIFTING SEQUENCE PATTERN (PNm(n)) ("..." INDICATES PATTERN REPEAT) |
|---|---|
| 0 | $PN_0(n) = 0, 0, 0, 0, \ldots$ |
| 1 | $PN_1(n) = 0, 1, 0, 1, \ldots$ |
| 2 | $PN_2(n) = 0, 2, 0, 2, \ldots$ |
| 3 | $PN_3(n) = 0, 1, 2, 3, \ldots$ |

TABLE 6

| BEACON SHIFTING SEQUENCE INDEX DECIMAL VALUE | BEACON SHIFTING SEQUENCE VALUES | BEACON SHIFTING SEQUENCE PATTERN ("..." denotes repeating pattern) |
|---|---|---|
| 0 | $PN_0(n) = 0, n = 0, 1, \ldots$ | $PN_0(n) = 0, 0, 0, 0, \ldots$ |
| 1 | $PN_1(n) = n \bmod 2, n = 0, 1, \ldots$ | $PN_1(n) = 0, 1, 0, 1, \ldots$ |
| 2 | $PN_2(n) = 2 \times PN_1(n), n = 0, 1, \ldots$ | $PN_2(n) = 0, 2, 0, 2, \ldots$ |
| 3 | $PN_3(n) = n \bmod 4, n = 0, 1, \ldots$ | $PN_3(n) = 0, 1, 2, 3, \ldots$ |
| 4 | $PN_4(n) = [PN_1(n) + PN_3(n)]/2 \bmod 2 + [PN_1(n) + PN_2(n) + PN_3(n)] \bmod 4, n = 0, 1, \ldots$ | $PN_4(n) = 0, 1, 3, 2, \ldots$ |
| 5 | $PN_5(n) = [PN_1(n) + PN_2(n) + PN_3(n)]/2, n = 0, 1, \ldots$ | $PN_5(n) = 0, 2, 1, 3, \ldots$ |
| 6 | $PN_6(n) = \{PN_3(n) + [PN_1(n) + PN_3(n)]/2\} \bmod 4, n = 0, 1, \ldots$ | $PN_6(n) = 0, 2, 3, 1, \ldots$ |
| 7 | $PN_7(n) = PN_2(n) + \{[PN_1(n) + PN_3(n)]/2 \bmod 2\}, n = 0, 1, \ldots$ | $PN_7(n) = 0, 3, 1, 2, \ldots$ |
| 8 | $PN_8(n) = [PN_2(n) + PN_3(n)] \bmod 4, n = 0, 1, \ldots$ | $PN_8(n) = 0, 3, 2, 1, \ldots$ |
| 9-15 | Reserved | Reserved |

TABLE 5-continued

| BEACON SHIFTING SEQUENCE INDEX (m) | BEACON SHIFTING SEQUENCE PATTERN (PNm(n)) ("..." INDICATES PATTERN REPEAT) |
|---|---|
| 4 | $PN_4(n) = 0, 1, 3, 2, \ldots$ |
| 5 | $PN_5(n) = 0, 2, 1, 3, \ldots$ |
| 6 | $PN_6(n) = 0, 2, 3, 1, \ldots$ |
| 7 | $PN_7(n) = 0, 3, 1, 2, \ldots$ |
| 8 | $PN_8(n) = 0, 3, 2, 1, \ldots$ |
| 9-15 | Reserved |

A beacon frame is transmitted by the hub in each beacon period. Each beacon frame contains timing, access, and capability information. For example, the sequence index m and the phase n of the PN sequence being used by the hub are encoded in the beacon frame, which allows each device in the network to readily determine the next beacon time. The beacon transmission time, relative to the beacon period recurring time (BPRT), changes from one beacon period to next according to the selected PN sequence. Repeated inter-network beacon and other transmission collisions are circumvented by neighboring hubs using different PN sequences or the same PN sequence offset in phase.

FIG. 11 illustrates the frame payload 1100 for a beacon frame according to one embodiment. Beacon frame payload 1100 may be carried in a MAC frame payload field 902 (FIG. 9) of a MAC frame 600 (FIG. 6) as described above. Beacon frame 1100 is broadcast by a hub in every beacon period, but may shift positions in each beacon period as described above in reference to FIG. 10.

Sender Address field 1101 is set to the MAC address of the hub sending the beacon. Beacon Shifting Sequence field 1102 is formatted as shown in FIG. 12 to indicate the beacon transmission time in the current beacon period. The beacon shifting sequence field 1102 comprises Beacon Shifting Sequence Index field 1201 and Beacon Shifting Sequence Phase field 1202, which are both set according to Table 6. Beacon Shifting Sequence Index field 1201 is set to the index m of the PN sequence $P_m(n)$ governing the beacon transmission time pattern. Beacon Shifting Sequence Phase field is set to the phase n of the chosen PN sequence $P_m(n)$ in the current beacon period.

Beacon Period Length field 1103 is set to the length of the current beacon period in units of allocation slots. To encode a value of 256 allocation slots, field 1103 is set to 0. A beacon period must have 4N allocation slots in length, where N is an integer. As illustrated in FIG. 13, the allocation slots in a beacon period 1301 are numbered 0, 1, ..., 4N−1, beginning with the allocation slot (A_0) that starts at the beacon transmission start time in the beacon period 1301 and ending with the allocation slot (A_4N−1) at the end of the beacon period. If the beacon transmission start time does not correspond to the start of the beacon period (e.g. in beacon periods 1301b-d), then the allocation slots are numbered beginning with the allocation slot (A_0) that starts at the beacon transmission start time and wraps around at the end of the beacon period to end with the allocation slot (A_4N−1) that ends at the beacon transmission time. The beacon periods have four quarters, which are comprised of allocation slots 0 to N−1, N to 2N−1, 2N to 3N−1, and 3N to 4N−1, respectively. An allocation interval that does not cross a quarter boundary will not be fragmented regardless of which beacon shifting sequence is being used.

Allocation Slot Length field 1104 is set to the length of an allocation slot in units of milliseconds. Field 1104 is set to 0 to encode a value of 256 milliseconds. B+RAP1 Length field 1105 is set to the length of the random access phase (RAP), in units of allocation slots, that starts at the end of the beacon frame in the next beacon period, plus the beacon transmission time that precedes. Field 1105 is set to 0 if no such a RAP is provided. The value of field 1105 must not be smaller than the value of the Minimum B+RAP1 Length field in a Connection Assignment frame sent by the hub transmitting this beacon. RAP2 Length field 1106 is set to the length of the random access phase (RAP), in units of allocation slots, that starts half a beacon period from the start of the beacon frame in the next beacon period. Field 1106 is set to 0 to if no such a RAP is provided. SAP Length field 1107 is set to the length of the special access phase (SAP), in units of allocation slots, that starts immediately after the random access phase (RAP) that follows the beacon frame in the next beacon period. Field 1107 is set to 0 to if no such a SAP is provided.

Security Requirement field 1108 is formatted as shown in FIG. 14. Lowest Security Level Required field 1401 is set to the lowest security level required by the sender according to Table 7.

TABLE 7

| FIELD VALUE DECIMAL | LOWEST SECURITY LEVEL REQUIRED |
| --- | --- |
| 0 | Level 0 - unsecured communication |
| 1 | Level 1 - authentication but not encryption |
| 2 | Level 2 - authentication and encryption |
| 3-15 | Reserved |

Control Frame Authentication field 1402 is set to 1 if control type frames sent to this sender must be authenticated but not encrypted when they are required to have security level 1 or 2. Field 1402 is set to 0 if control type frames sent to this sender must be neither authenticated nor encrypted even when they are otherwise required to have security level 1 or 2. The bits in reserved field 1403 may be used to indicated other security requirements as desired by the user.

Security Capability field 1109 is formatted as shown in FIG. 15. Security Support field 1501 is set to the highest security level supported by the sender according to Table 8.

TABLE 8

| FIELD VALUE b0 b1 | HIGHEST SECURITY LEVEL SUPPORTED |
| --- | --- |
| 00 | Level 0 - unsecured communication |
| 10 | Level 1 - authentication but not encryption |
| 01 | Level 2 - authentication and encryption |
| 11 | Reserved |

MK Pre-shared Association field 1501 is set to 1 if the sender supports master key (MK) pre-shared association, or is set to 0 otherwise. Unauthenticated Association field 1503 is set to 1 if the sender supports unauthenticated association, or is set to 0 otherwise. Public Key Hidden Association field 1504 is set to 1 if the sender supports public key hidden association, or is set to 0 otherwise. Password Authenticated Association field 1505 is set to 1 if the sender supports password authenticated association, or is set to 0 otherwise. Display Authenticated Association field 1506 is set to 1 if the sender supports display authenticated association, or is set to 0 otherwise. The bit in reserved field 1507 may be used to indicated other security capabilities as desired by the user.

MAC Capability 1110 is formatted as shown in FIG. 16. B-Ack Support field 1601 is set to 1 if the sender supports later acknowledgment (L-Ack) and block acknowledgment (B-Ack) acknowledgment policies, or is set to 0 otherwise. Poll Support field 1602 is set to 1 if the sender supports polls, or is set to 0 otherwise. A hub supports polls if it can send polls to nodes and participate in the frame transactions sent in its polled allocations. A node supports polls if it can receive polls and initiate frame transactions with the hub in its polled allocations. Random Access Support field 1603 is set to 1 if the sender supports carrier sense multiple access with collision avoidance (CSMA/CA) or slotted Aloha based random access, or is set to 0 otherwise. In a beacon sent by a hub, field 1603 with a value of 1 indicates that the hub will provide a RAP1 with a guaranteed minimum length in each beacon period, and field 1603 with a value of 0 indicates that the hub will provide neither RAP1 nor RAP2 in any beacon period. A hub communicates its guaranteed minimum length for RAP1 to nodes through the Minimum B+RAP1 Length field in its Connection Assignment frames sent to those nodes. Battery Level Indication Support field 1604 is set to 1 if the sender supports battery level indication, or is set to 0 otherwise.

Reserved bits in field 1605 may be used to indicate other MAC capabilities designated by the user.

PHY Capability field 1111 is formatted as shown in FIG. 17. Lower Power Wakeup Radio field 1701 is set to 0 if the sender does not support a lower power wakeup radio, or is set to 0 if the sender supports and turns on a lower power wakeup radio until the recipient is informed of a different value for this field. Data Rate fields 1702 are set to the value denoting a data rate supported by the sender. For example, data rate fields 1-7 may indicate known data rates and each field set to 1, if the hub supports that data rate.

Channel Hopping State field 1112 is set to the current state of a 16-bit maximum-length linear feedback shift register (LFSR) used to generate the channel hopping sequence by the hub sending the beacon. Channel Hopping State field 1112 is set to 0 if the hop is to dwell on the current channel for an indefinite period of time (i.e., without channel hopping).

In another embodiment, the beacon frame payload 1100 may be modified to include additional or alternative fields or to designate the bits in reserve fields 1403, 1507, 1605 to provide some or all of the following information. A Timestamp field that indicates the start time of the current beacon transmission in units of microseconds. A subnet or cluster name information element (IE) field that is set to the name of the subnet. A Transient Uplink Allocation IE set to the list of devices and the times for transient uplink allocation. Transient Downlink Allocation IE Set to the list of devices and the times for scheduled transient downlink allocation. A Persistent Allocation Map IE set to identify allocation slots included in scheduled persistent allocations. A Channel Change IE set to indicate a change to a new channel.

A node begins establishing a connection with a hub by sending a Connection Request frame. FIG. 18 illustrates an exemplary payload 1800 for a connection request frame. Connection request payload 1800 may be carried in a MAC frame payload field 902 (FIG. 9) of a MAC frame 600 (FIG. 6) as described above. The Connection Request frame containing frame payload 1800 is transmitted by a node to request creation or modification of a connection with a hub.

Recipient Address field 1801 is set to the IEEE MAC address of the hub receiving the connection request frame. Sender Address field 1802 is set to the IEEE MAC address of the node sending the current frame. Former Hub Address field 1803 is set depending upon the node's previous connections. If the sending node was not connected to another hub previously, field 1803 is set to 0. Otherwise, field 1803 is set to the IEEE MAC address of the hub with which the node was last connected.

Security Requirement field 1804 is formatted as defined above with respect to security requirement field 1108 in beacon frame 1100 (FIGS. 11, 14). Security Capability field 1805 is formatted as defined above for security capability field 1109 with respect to the sender (FIGS. 11, 15). MAC Capability field 1806 is formatted as defined above for MAC capability field 1110 with respect to the sender (FIGS. 11, 16). PHY Capability field 1807 is formatted as defined above for PHY capability field 1111 with respect to the sender (FIGS. 11, 17).

Change Indication field 1808 is formatted as shown in FIG. 19. The bit fields (1901-1905) in Change Indication field 1808 are set to 1 to indicate that the information the corresponding fields (1809-1813) in Connection Request payload 1800 have changed since a last connection request. Otherwise, the bits (1901-1905) in field 1808 are set to 0 indicating that the related information has not changed. Channel order IE bit-field 1906 corresponds to the channel order IE field in the connection assignment frame discussed below. Reserved bits 1907 may be used to indicate changes in other parameters designated by the user.

Next Wakeup field 1809 is set to the sequence number of the beacon transmitted in the beacon period in which the node will wake up for frame reception and transmission. This beacon period is referred to as the node's wakeup beacon period. Wakeup Interval field 1810 is set to the length, in units of beacon periods, between the start of successive wakeups of the node. The wakeup interval is effective from the next wakeup indicated in field 1809. Field 1810 is set to 0 to encode a value of 256 beacon periods. The value of field 1810 determines whether the IEs in the current connection request frame (1811-1813) and the responding connection assignment frame denote 1-periodic or m-periodic (multi-periodic) allocations. If Wakeup Interval 1810=1, the IEs denote 1-periodic allocations. If Wakeup Interval 1810≠1, the IEs denote m-periodic allocations.

Uplink Request IE field 1811 is optionally contained in connection request frames to indicate the request for creation or modification of some scheduled uplink allocations for the node. The term "uplink" as used herein refers to a communications link for transfer of management and data traffic from a node to a hub. Downlink Request IE field 1812 is optionally contained in connect request frames to indicate the request for the creation or modification of some scheduled downlink allocations of the node. The term "downlink" as used herein refers to a communications link for transfer of management and data traffic from a hub to a node. Bilink Request IE field 1813 is optionally contained in connect request frames to indicate a request for the creation or modification of some scheduled bilink allocations of the node. The term "bilink" as used herein refers to a communications link for transfer of management and data traffic from a hub to a node or/and vice versa.

The information elements (IEs) 1811-1813 are formatted as shown in FIG. 20. Element ID field 2001 is set to a value that identifies the information element according to Table 9. Length field 2002 is set to the length, in octets, of the IE-specific information field 2003. For Uplink Request IE 1811, Downlink Request IE 1812, and Bilink Request IE 1813, the information field 2003 comprises a number (N) of allocation requests.

Each Allocation Request 2003 is formatted as shown in FIG. 21 to describe the requirements of an allocation for the data belonging to a given user priority. Allocation ID 2101 identifies an allocation requested by the node. Frame Subtype field 2102 is set to the frame subtype of the data type frames to be transferred in this requested allocation. User Priority field 2104 is set to the user priority of the frame payloads to be transferred in this requested allocation. Maximum Gap field 2105 is set to the largest length, in units of allocation slots, of the gap between any two adjacent allocation intervals of this requested allocation in the same beacon period or across beacon periods, if the Wakeup Interval field in the same frame has a value of 1. It is reserved otherwise. Minimum Gap field 2105 is set to the smallest length, in units of allocation slots, of the gap between any two adjacent allocation intervals of this requested allocation in the same beacon period or across beacon periods. Minimum Length field 2106 is set to the smallest length, in units of allocation slots, of any of the allocation intervals of this requested allocation. Allocation Length field 2107 is set to the overall length, in units of allocation slots, of the allocation intervals of this requested allocation in a wakeup beacon period.

TABLE 9

| ELEMENT ID DECIMAL VALUE | IE NAME | DESCRIPTION |
| --- | --- | --- |
| 0 | Reserved | Reserved |
| 1 | Uplink Request IE | Specifies scheduled uplink allocation requirements by a node |
| 2 | Downlink Request IE | Specifies scheduled downlink allocation requirements by a node |
| 3 | Bilink Request IE | Specifies scheduled bilink allocation requirements by a node |
| 4 | Uplink Assignment IE | Specifies scheduled uplink allocation assignments to a node |
| 5 | Downlink Assignment IE | Specifies scheduled downlink allocation assignments to a node |
| 6 | Bilink Assignment IE | Specifies scheduled bilink allocation assignments to a node |
| 7 | Channel Order IE | Specifies a list of channels in the order of their selection by a hub |
| 8-244 | Reserved | Reserved |
| 255 | Application Specific IE | Provides user-defined application-specific information |

After receiving a Connection Request frame as described above, the hub responds to the node with a Connection Assignment frame. A Connection Assignment frame contains a Frame Payload 2200 as illustrated in FIG. 22. The Connection Assignment frame may also be used to change an earlier connection assignment. Connection Assignment payload 2200 may be carried in a MAC frame payload field 902 (FIG. 9) of a MAC frame 600 (FIG. 6) as described above.

Recipient Address field 2201 is set to the IEEE MAC address of the node receiving the connection assignment frame. Sender Address field 2202 is set to the IEEE MAC address of the hub sending the current frame. Channel Dwell Length field 2203 is set to the length of the time, in units of beacon periods, over which the hub sending the connection assignment frame is to operate at a chosen channel before hopping to another one. Field 2203 is set to 0 to encode a value of 256 beacon periods. Channel Dwell Phase field 2204 is set to H if the hub sending the current beacon frame is to hop to the next channel in its channel hopping sequence at the end of the next Hth beacon period not counting the current beacon period if H>0 or at the end of the current beacon period if H=0. Minimum B+RAP1 Length field 2205 is set to the smallest value guaranteed for the B+RAP1 Length field (1105, FIG. 11) in the beacon frames sent by the hub, if the Random Access Support field (1603, FIG. 16) of the MAC Capability (1110, FIGS. 11, 16) of the beacons is set to 1. Otherwise, field 2205 is set to 0.

Status Code field 2206 is set to the status of the connection assignment encoded according to Table 10.

TABLE 10

| FIELD VALUE DECIMAL | STATUS |
|---|---|
| 0 | Connection request accepted |
| 1 | Connection request rejected - no more channel bandwidth for a new connection |
| 2 | Connection request rejected - no more Connected_NID for a new connection |
| 3 | Connection request rejected - no more internal resources for a new connection |
| 4 | Connection rejected - the highest security level supported by the requester not high enough |
| 5 | Connection rejected - the lowest security level required by the requester is higher than the highest security level supported by the responder |
| 6 | Connection request rejected - no reason |
| 7 | Connection assignment modified |
| 8-255 | Reserved |

Security Requirement field 2207 is formatted as defined above for security requirement field 1108 in beacon frame 1100 (FIGS. 11, 14). Security Capability field 2208 is formatted as defined above for security capability field 1109 in beacon frame payload 1100. (FIGS. 11, 15). MAC Capability field 2209 is formatted as defined above with respect to MAC capability field 1110 in beacon frame payload 1100. (FIGS. 11, 16). PHY Capability field 2210 is formatted as defined above for PHY capability field 1111 in beacon frame payload 1100. (FIGS. 11, 17).

NID field 2211 is set to a NID that is uniquely assigned or reassigned to the addressed node within the subnet according to Table 1.

Change Indication field 2212 is formatted as shown in FIG. 19. A bit field (1901-1907) is set to 1 if the referenced field (2213-2218) denotes has been changed in this connection assignment since a last connection request or connection assignment. Otherwise, the bit field (1901-1907) is set to 0.

Next Wakeup field 2213 is set as described above for Next Wakeup field 1809 in the connection request frame (FIG. 18), except that field 2213 is set by the hub sending the connection assignment frame for the addressed node. The field in this frame supersedes the Next Wakeup field in the last Connection Request or Connection Assignment frame.

Wakeup Interval field 2214 is set as described above for Wakeup Interval field 1810 in the connection request frame (FIG. 18), except that field 2214 is set by the hub sending the connection assignment frame for the addressed node. The field in this frame supersedes the field in the last Connection Request or Connection Assignment frame.

Uplink Assignment IE 2215, Downlink Assignment IE 2216, and Bilink Assignment IE 2217 are formatted as shown in FIG. 23. Element ID field 2301 is set to a value that identifies the information element according to Table 9. Length field 2302 is set to the length, in octets, of the IE-specific fields 2303. For Uplink Assignment IE 2215, Downlink Assignment IE 2216, and Bilink Assignment IE 2217, the information field 2303 comprises a number (J) of allocation assignments.

Each Allocation Assignment 2303 is formatted as shown in FIG. 24 to specify an allocation interval of an assigned allocation for the data belonging to a given user priority. Allocation ID 2401 identifies an allocation assigned to the node. Field 2401 is set to the Allocation ID used to identify the same allocation requested earlier by the node. Frame Subtype field 2402 is set to the frame subtype of the data type frames to be transferred in this assigned allocation. User Priority field 2403 is set to the user priority of the frame payloads to be transferred in this assigned allocation. Interval Start field 2404 is set to the number of the allocation slot that starts an allocation interval of this assigned allocation. Interval End field 2405 is set to the number of the allocation slot that ends the allocation interval whose start time is specified in the field 2404.

Channel Order IE 2218 is formatted as shown in FIG. 25. Channel Order IE 2218 is optionally contained in the Connection Assignment frame to indicate some or all channels in the assigned band and to provide the order in which those channels are to be selected as operating channels. In one embodiment, the assigned band is a medical implant communications service (MICS) frequency band.

Element ID field 2501 is set to a value that identifies the information element according to Table 9. Length field 2502 is set to the length, in octets, of the channel ordered list in field 2503. Channel Ordered List field 2503 is set as follows: The four least-significant bits are set to the channel number of the channel which will be the first candidate to each instance of channel selection. Each successive four bits are set to the channel number of the channel which will be the next candidate to the instance of channel selection. If the list conveys an odd number of channels, four bits with a binary value of 1111 are padded as the most-significant bits to the field.

A Disconnection frame is transmitted by a hub to repeal the connection with a node or by a node to repeal the connection with a hub. The payload 2600 for a Disconnection frame send by a node is illustrated in FIG. 26. Recipient Address field 2601 is set to the IEEE MAC address of the hub that receives disconnection frame payload 2600. Sender Address field 2602 is set to the IEEE MAC address of the node that is sending the disconnection frame payload 2600. New Hub Address field 2603 is set as follows. If the node is not newly connected with another hub, field 2603 is null (i.e., not present). Otherwise, field 2603 is set to the MAC address of the hub with which the node is newly connected.

The payload 2700 for a Disconnection frame send by a hub is illustrated in FIG. 27. Recipient Address field 2701 is set to the IEEE MAC address of the node that is receiving the disconnection frame payload 2700. Sender Address field 2702 is set to the IEEE MAC address of the hub that is sending the disconnection frame payload 2700. The hub may suggest one or more new hubs for the node to connect with. New Hub Address field 2703 is set as follows to indicate the preferred new hubs. If the disconnecting hub does not have a suggested preferred new hub for the addressed node, field 2703 is null (i.e., not present). Otherwise, field 2703 is set to the MAC address of one or more suggested new hubs for the addressed node.

FIG. 28 illustrates a HID Conflict Report frame 2800 sent by the node to a hub when a conflicting HID is detected in received frames. Recipient address field 2801 is set to the MAC address of the hub that is receiving the current frame. Sender Address field 2802 is set to the MAC address of the node sending the report. Conflict HID fields 2803 identify one or more HID values from frames received by the node that had an HID that was different from the HID for the hub with which the node is connected.

FIG. 29 illustrates the format for an Application Specific IE, which may be optionally contained in some management type frames to convey application-specific information. Element ID field 2901 is set to a value that identifies the information element according to Table 9. Length field 2902 is set to the length, in octets, of the application specific data in field 2904. OUI-241 field 2903 is set to the 24-bit Organizationally Unique Identifier (OUI) assigned by the IEEE Registration Authority to the vendor or manufacturer that defines this IE. Application Specific Data field 2904 is set by the owner ("assignee" in IEEE terms) of the OUI.

A hub may include one or more Application Specific IEs at the end of its beacon. A node may include one or more Application Specific IEs at the end of its Connection Request frame. A hub may also include one or more Application Specific IEs at the end of its Connection Assignment frame. The recipient ignores unrecognized Application Specific IEs.

FIG. 30 illustrates the format for a Channel Change IE, which may be used to identify a new channel for the hub. Element ID field 3001 is set to a value that identifies the information element according to Table 9. Length field 3002 is set to the length, in octets, of the data in fields 3003 and 3004. New Channel field 3003 is set to the number of the new channel to which the hub will change. Next Change field 3004 is set to the sequence number of the beacon in the beacon period in which the hub will change to the new channel. Field 3004 is set to 0 to indicate a value of 256.

As discussed in further detail below, the hubs and nodes exchange frames in designated allocation intervals within beacon periods. The hub and nodes support both contended (e.g. random) and non-contented (e.g scheduled, polled, and posted) access methods. Each device determines the start and end times of the allocation intervals. The nodes or hub maintain a clock with a minimum resolution (mClockResolution) and with a minimum accuracy (mClockAccuracy) to time the frame transmission and reception. In one embodiment, mClockResolution=10 μs, and mClockAccuracy=20 ppm. Embodiments of the invention compensate for clock drift, synchronization error, and transmit-receive turnaround. All nodes synchronize to their hub through received beacons or some other frames. The nodes and hub time their respective transmission and reception in any of its allocation intervals according to their own local clock. They also set aside appropriate guardtimes (GT) as specified below and illustrated in FIGS. 31 and 32.

The hub commences its beacon frame transmission at the nominal start of the beacon transmission time offset. For a downlink allocation interval, the hub commences its transmission at the nominal start of the interval and ends its transmission early enough such that the last transmission in the interval completes at least a guardtime of $GT_n$ prior to the nominal end of the interval. In an uplink allocation interval, the hub commences its reception at least $GT_n$ prior to the nominal start of the interval.

At the nominal start of a node's uplink allocation interval, if the node's last synchronization to the hub was less than time $SI_n$ ago (where $SI_n$ is a nominal synchronization interval), the node commences its transmission at that nominal start time of the interval. The node ends its transmission early enough such that the last transmission in the interval completes at least a guardtime of $GT_n$ prior to the nominal end of the interval.

If a node's last synchronization to the hub was less than time $SI_n$ ago at the nominal start of the next beacon transmission, the node commences its reception of the beacon at least guardtime $GT_n$ prior to the beacon nominal start time.

At the nominal start of a node's next downlink or bilink allocation interval, if the node's last synchronization to the hub was less than $SI_n$ ago, the node commences its reception in the interval at least guardtime GTn prior to that nominal start time.

If a node's last synchronization to the hub was time $SI_n + SI_a$ ago at the nominal start of its next scheduled uplink allocation interval (where $SI_a$ is an additional synchronization interval), the node commences its transmission in the interval an additional guardtime of $GT_a$ later than that nominal start time, and the node ends its transmission in the interval early enough such that the last transmission in the interval completes at least a guardtime of $GT_n + GT_a$ prior to the nominal end of the interval.

If a node's last synchronization to the hub was $SI_n + SI_a$ ago at the nominal start of its next scheduled downlink or bilink allocation interval, the node commences its reception in the interval at least $GT_n + GT_a$ earlier than that nominal start time.

A node synchronizes to its hub through the beacons, T-Poll frames, or the first frames in scheduled allocation intervals received from the hub. In particular, the node advances or delays its clock by a total amount of $$D = T_S - T_L, \text{ if } T_S > T_L, \quad (4)$$

or $$D = T_L - T_S, \text{ if } T_S < T_L \quad (5)$$

Here $T_S$ is the time when a beacon frame, a T-Poll frame, or a frame with the "First Frame" bit in its MAC header set to 1 was scheduled to start on the transport medium (i.e., air interface), and $T_L$ is the time when the frame was received according to the local clock.

The various guardtime components are determined as follows:

$$mGT\_Nominal = GT_n = GT_0 + 2 \times D_n, \quad (6)$$

$$D_n = SI_n \times m\text{ClockAccuracy}, \quad (7)$$

$$GT_0 = p\text{TIFS} + p\text{SynchResolution} + m\text{TxResolution}, \quad (8)$$

$$m\text{TxResolution} = m\text{ClockResolution}, \quad (9)$$

$$GT_a = 2 \times D_a, \quad (10)$$

and $$D_a = SI_a \times m\text{ClockAccuracy}. \quad (11)$$

The parameter $GT_n = mGT\_Nominal =$ Allocation Slot Length/10, and designates the guardtime nominally observed by a node or a hub. The parameter $GT_0$ comprises the receive-transmit or transmit-receive turnaround time pTIFS, the synchronization error pSynchResolution, and the transmission timing error mTxResolution, which are all fixed values that are independent of clock drifts. The leading "m" or "p" for these values indicate that values are for MAC sublayer parameters (m) or PHY-dependent parameters (p) used by the MAC sublayer. Nominal values for these parameters in one embodiment are pTIFS=20 µs, pSynchResolution=5 µs, and mTxResolution=mClockResolution=10 µs. Thus, the value of $GT_0$ is also predefined as 35 µs. Given the values of $GT_n$ and $GT_0$, the parameter $D_n$ represents the nominally allowed clock drift of a node or hub relative to an ideal (nominal) clock. With the minimum clock accuracy of mClockAccuracy, such as 20 ppm in one embodiment, $D_n$ is also predetermined. $D_n$ is a nominal synchronization interval $SI_n$ over which the clock drift of any node is accounted for in the nominal guardtime $GT_n$.

The parameter $SI_a$ denotes the synchronization interval additional to $SI_n$ that is required for synchronization. The corresponding additional clock drift $D_a$ is a function of $SI_a$ and accounts for the required additional guardtime $GT_a$. The values of these two parameters are specific to the node and time of concern.

FIG. 31 illustrates clock drift and guardtime provisioning for a fast node $N_f$, slow node $N_s$, and slow hub H. The position of the devices' respective local clocks ($t_f$, $t_s$, $t_h$) are shown relative to an ideal clock.

FIG. 32 illustrates clock drift and guardtime provisioning for a fast node $N_f$, slow node $N_s$, and fast hub H. The position of the devices' respective local clocks ($t_f$, $t_s$, $t_h$) are shown relative to an ideal clock.

A node exchanges Association frames having a payload as illustrated in FIG. 33 with a hub to activate a pre-shared master key (MK) or generate a new shared MK. Recipient Address field 3301 is set to the IEEE MAC address of the hub that is the recipient of the Association frame. Sender Address field 3302 is set to the IEEE MAC address of the node that is sending the frame. Association Protocol Number field 3303 is set according to Table 11 to indicate an association protocol being used for the association.

TABLE 11

| FIELD VALUE DECIMAL | ASSOCIATION PROTOCOL |
| --- | --- |
| 0 | Master key pre-shared association |
| 1 | Unauthenticated association |
| 2 | Public key hidden association |
| 3 | Password authenticated association |
| 4 | Display authenticated association |
| 5-255 | Reserved |

Transaction Sequence Number field 3304 is set to the number (i.e., position) of the current Association frame in the run of the chosen association protocol. In particular, field 3304 is set to 1 in the first Association frame of the protocol, 2 in the second Association frame, 3 in the third, etc. The first Association frame is the Association frame transmitted or retransmitted by the node initializing the association, the second Association frame is the Association frame transmitted or retransmitted by the responding hub, and the like.

Association Data field 3305 is specific to the association protocol being used. For master key pre-shared association, the Association Data field is not present. For unauthenticated association, public key hidden association, password authenticated association, and display authenticated association, the Association Data field is formatted as shown in FIG. 34. Sender Nonce field 3401 is set to a statistically unique number per sender and per association procedure as follows. For unauthenticated association, public key hidden association, and password authenticated association, in the first and second Association frames of the current association procedure, field 3401 is set afresh and independently to an integer randomly drawn with a uniform distribution over the interval (0, $2^{128}$); and in the third Association frame, field 3401 is set to its value contained in the first Association frame of the procedure. For display authenticated association, in the first Association frame of the current association procedure, field 3401 is set to 0; and in the second and third Association frames, field 3401 is set afresh and independently to an integer randomly drawn with a uniform distribution over the interval (0, $2^{128}$).

Sender $PK_X$ field 3402 is set to the X-coordinate of the sender's elliptic curve public key as follows. For unauthenticated association, in the first and second Association frames of the current association procedure, field 3402 is set to the X-coordinate of the sender's elliptic curve public key PK= $(PK_X, PK_Y)$; and in the third Association frame, field 3402 is set to its value contained in the first Association frame of the procedure. For public key hidden association, in the first and third Association frames of the current association procedure, field 3402 is set to 0; and in the second Association frame, field 3402 is set to the X-coordinate of the sender's elliptic curve public key PK=$(PK_X, PK_Y)$. For password authenticated association, in the first and third Association frames of the current association procedure, field 3402 is set to the X-coordinate of the sender's password-scrambled elliptic curve public key PK'=$(PK'_X, PK'_Y)$; and in the second Association frame, field 3402 is set to the X-coordinate of the sender's elliptic curve public key PK=$(PK_X, PK_Y)$. For display authenticated association, in the first Association frame of the current association procedure, field 3402 is set to 0; and in the second and third Association frames, field 3402 is set to the X-coordinate of the sender's elliptic curve public key PK=$(PK_X, PK_Y)$.

Sender $PK_Y$ field 3403 is set to the Y-coordinate of the sender's elliptic curve public key as follows. For unauthenticated association, in the first and second Association frames of the current association procedure, field 3403 is set to the Y-coordinate of the sender's elliptic curve public key PK= $(PK_X, PK_Y)$; and in the third Association frame, field 3403 is set to its value contained in the first Association frame of the procedure. For public key hidden association, in the first and third Association frames of the current association procedure, field 3403 is set to 0; and in the second Association frame, field 3403 is set to the Y-coordinate of the sender's elliptic curve public key PK=$(PK_X, PK_Y)$. For password authenticated association, in the first and third Association frames of the current association procedure, field 3403 is set to the Y-coordinate of the sender's password-scrambled elliptic curve public key PK'=$(PK'_X, PK'_Y)$; and in the second Association frame, field 3403 is set to the Y-coordinate of the sender's elliptic curve public key PK=$(PK_X, PK_Y)$. For display authenticated association, in the first Association frame of the current association procedure, field 3403 is set to 0; and in the second and third Association frames, field 3403 is set to the Y-coordinate of the sender's elliptic curve public key PK=$(PK_X, PK_Y)$.

MK_KMAC field 3404 is set to a key message authentication code (KMAC) for certain fields of the frame payloads of the Association frames of the current association procedure as follows. For unauthenticated association, in the first Association frame of the current association procedure, field 3404 is set to 0; in the second Association frame, field 3404 is set to a KMAC for certain fields of the frame payloads of the first and second Association frames of the procedure; and in the third Association frame, field 3404 is set to a KMAC for certain fields of the frame payloads of the second and third Association frames. For public key hidden association, in the first Association frame of the current association procedure, field 3404 is set to 0; in the second Association frame, field 3404 is set to a KMAC for certain fields of the frame payloads of the first and second Association frames of the procedure if the sender of this frame has the public key of the sender of the first Association frame, or it is set to 0 otherwise; and in the third Association frame, field 3404 is set to a KMAC for certain fields of the frame payloads of the second and third Association frames. For password authenticated association, in the first Association frame of the current association procedure, field 3404 is set to 0; in the second Association frame, field 3404 is set to a KMAC for certain fields of the frame payloads of the first and second Association frames of the procedure if the sender of this frame has a shared password with the sender of the first Association frame, or it is set to 0 otherwise; and in the third Association frame, field 3404 is set to a KMAC for certain fields of the frame payloads of the second and third Association frames. For display authenticated association, in the first Association frame of the current association procedure, field 3404 is set to an initial commitment equal to a KMAC for certain fields of the frame payload of the third Association frame of the procedure; and in the second and third Association frames, field 3404 is set to 0.

FIG. 35 illustrates payload data for a Disassociation frame that is transmitted by either an associated node or a hub to repeal an existing association (i.e., repeal the shared master key (MK)). Recipient Address field 3501 is set to the IEEE MAC address of the hub or node receiving the current frame. Sender Address field 3502 is set to the IEEE MAC address of the sender of the current frame. Sender Nonce field 3503 is set to a statistically unique number per sender and per disassociation procedure. Field 3503 is set afresh and independently to an integer randomly drawn with a uniform distribution over the interval $(0, 2^{128})$. DA_KMAC field 3504 is set to a key message authentication code (KMAC) for certain fields of the frame payload of this Disassociation frame.

The node and hub may exchange Control frames in addition to or in response to the other frames described herein. A control type frame may contain no frame payload or contains a frame payload of variable length.

An Immediate Acknowledgement (I-Ack) frame contains no frame payload. The I-Ack frame is transmitted by a node or a hub to acknowledge receipt of the preceding frame.

A Block Acknowledgement (B-Ack) frame contains a frame payload that is formatted as shown in FIG. 36. The B-Ack frame is transmitted by a node or a hub to acknowledge the reception status of certain preceding data type frames containing a whole MSDU. Next Block Size field 3601 is set to the maximum number of data type frames permitted in the next block transmission from the acknowledged node or hub to the acknowledging hub or node. The next block transmission is a transmission of data type frames whose reception status will be provided in the next B-Ack frame and whose frame subtype is the same as that of the data type frame preceding this B-Ack frame. Oldest Frame Expected field 3602 is set to the sequence number of the oldest frame that is of the same frame subtype as the frame preceding this B-Ack frame and that is still expected to be, but not yet, received. Frame Status Bitmap field 3603 is set as follows to indicate the reception status of the frames that are of the same frame subtype as the frame preceding this B-Ack frame and that are newer than the frame indicated in the Oldest Frame Expected field. Frame status bitmap field comprises $\lceil N/8 \rceil$ octets, where N is the number of these frames and function $\lceil f \rceil$ is the least integer that is not smaller than f. The least-significant bit of these octets denotes the oldest of these frames. Each successive bit denotes a successive frame, i.e., a frame with a successive sequence number, of the same frame subtype. A bit is set to 1 if the corresponding frame is received.

An Immediate Acknowledgement+Poll (I-Ack+Poll) frame contains no frame payload. The I-Ack+Poll frame is transmitted by a hub to acknowledge receipt of the preceding frame and to send a poll to the addressed node. The I-Ack+Poll frame is equivalent in function to an I-Ack frame followed by a separate Poll frame.

A Block Acknowledgement+Poll (B-Ack+Poll) frame contains a frame payload that is formatted as defined for the Block Acknowledgement frame (B-Ack) above in reference to FIG. 36. B-Ack+Poll is transmitted by a hub to acknowledge the reception status of certain preceding data type frames and to send a poll to the addressed node. The B-Ack+Poll frame is equivalent in function to a B-Ack frame followed by a separate Poll frame.

A Poll frame contains no frame payload. The Poll frame is transmitted by a hub to grant to the addressed node an immediate polled allocation that starts pTIFS after the end of the frame or to inform the node of a future poll.

A T-Poll frame contains a frame payload having a format as illustrated in FIGS. 37 and 38. The T-Poll frame is transmitted by a hub to grant an immediate polled allocation to the addressed node that starts pTIFS after the end of the frame or to inform the node of a future poll, while providing the hub's current time for the node's clock synchronization. FIG. 37 illustrates a T-Poll frame payload format for T-Poll frames sent to devices with an NID≠Unconnected_Broadcast_NID, and FIG. 38 illustrates a T-Poll frame payload format for T-Poll frames sent to nodes with an NID=Unconnected_Broadcast_NID.

Current Beacon Period field 3701, 3801 is set as follows for superframe numbering. If the beacon period in which this frame is transmitted contains a beacon, then field 3701, 3801 is set to the value of the Sequence Number field in the MAC header of that beacon. If the beacon period in which this frame is transmitted contains no beacon, field 3701, 3801 is incremented by one from its value for the last beacon period.

Current Allocation Slot field 3702, 3802 is set to S such that the hub starts sending this frame during the allocation slot numbered S. Current Slot Offset field 3703, 3803 is set to O in units of four microseconds such that the hub starts sending this frame at O after the start of the allocation slot indicated in the previous field.

Beacon Period Length field 3804 is set to the length of a beacon period in units of allocation slots. Field 3804 is set to 0 to encode a value of 256 allocation slots. Field 3804 must have the same value as the same field in the beacons to be transmitted by this hub.

Allocation Slot Length field 3805 is set to the length of an allocation slot in units of milliseconds. Field 3805 is set to 0 to encode a value of 256 milliseconds. Field 3805 must have the same value as the same field in the beacons to be transmitted by this hub.

FIG. 39 illustrates the general information element (IE) format. Various specific IEs have been described above. The IE is optionally contained in certain management type frames. Element ID field 3901 is set to the value that identifies the information element according to Table 9. Length field 3902 is set to the length, in octets, of IE-specific Information field 3903. Information field 3903 is set based on the Element ID as defined in Table 9.

FIG. 40 illustrates a Subnet Name IE. Element ID field 4001 is set to the value that identifies the information element according to Table 9, which may include a reserved Element ID value. Length field 4002 is set to the length, in octets, of subnet name string 4003. The Subnet Name String 4003 is set to a string of Unicode characters forming the name of the subnet. In one embodiment, each Unicode character 4004 is encoded in UTF-16LE format.

FIG. 41 illustrates a Transient Uplink/Downlink Allocation IE payload format. Element ID field 4101 is set to the value that identifies the information element according to Table 9, which may include a reserved Element ID value. Length field 4102 is set to the length, in octets, of Transient Assignment fields 4103. FIG. 42 illustrates the format of Transient Assignment fields 4103, which define the assignment of a time interval to a scheduled transient uplink or downlink allocation of a device. NID field 4201 is set to the node identifier of the device assigned the scheduled transient uplink or downlink allocation in the next beacon period. Interval Start field 4202 is set to the number of the allocation slot that starts a time interval assigned to a transient uplink allocation of the device identified in field 4201. Interval End field 4203 is set to the number of the allocation slot that ends the time interval which begins as defined in field 4202.

FIG. 43 illustrates a Persistent Allocation Map IE payload format. Element ID field 4301 is set to the value that identifies the information element according to Table 9, which may include a reserved Element ID value. Length field 4302 is set to the length, in octets, of Allocation Bitmap field 4303. The Allocation Bitmap field 4303 identifies the allocation slots in the next beacon period that comprise the scheduled persistent allocations to all the nodes connected with the hub sending this IE. Allocation Bitmap field 4303 comprises ⌈N/8⌉×8 bits, where N is such that allocation slot N is the last allocation slot included in the scheduled persistent allocations listed in this IE. Bit m set to 1 if allocation slot m is part of these allocations.

In an exemplary embodiment of the invention, a hub communicates with one or more nodes in a subnet. Different access methods are provided for nodes and a hub to communicate, such as in scheduled allocations, polled and posted allocations, and contended allocations. In particular, a node may also employ random access based on carrier sense multiple access with collision avoidance (CSMA/CA) for initiating contention-based frame transactions. The node uses a backoff counter, as described below, to obtain contended allocations in random access phases (RAP). A contended allocation is a time interval that does not reoccur in subsequent beacon periods without the node invoking another instance of random access.

FIG. 44 illustrates examples of RAPs in different beacon periods (BP) 4401a-d. Each beacon period comprises a beacon frame (B). The hub may broadcast the beacon frame at the same position within each beacon period, such as at the start of every beacon period. Alternatively, as illustrated in FIG. 44, the beacon frame 4402a-d may shift to a different position in each beacon period 4401a-d. In one embodiment, the hub announces up to two RAPs for the next beacon period 4401a-d in each beacon frame 4402a-d. A first RAP 4403a-d starts immediately after the end of the beacon frame 4402a-d in each beacon period 4401a-d. The first RAP 4403a-d has a length RAP1. The second RAP 4404 has a length RAP2 and does not appear in every beacon frame 4401a-d. When it does appear, the second RAP 4404b,d starts half a beacon period away from the start of the beacon frame 4402a-d in the same beacon period 4401a-d. The hub ensures that the first and second RAPs 4403a-d, 4404b,d do not overlap with any scheduled allocations.

The node uses a backoff counter to identify when it can attempt to obtain a new contended allocation. When the node has at least one frame of user priority (UP) to transmit or retransmit, the node sets the backoff counter to an integer selected at random from the interval [1, CW], where CW is a contention window value. As described in more detail below, the node decrements its backoff counter by one for each idle contention slot, if the backoff counter is unlocked.

FIG. 45 illustrates contention slots according to one embodiment of the invention. The node decrements its backoff counter in each contention slot, unless the node has locked the backoff counter. The first contention slot 4501 occurs after the channel has been idle for a turnaround inter-frame space (TIFS) and outside scheduled allocations or beacon frame transmissions. Successive contention slots 4502 start when the current contention slot ends. Each contention slot has a fixed duration of pSlotLength, which equals the sum of pCCATime (4503), mMACTime (4504) and pPHYTime (4505), where pCCATime is the time required by the PHY to detect a transmission (or an idle period) and indicate the detection to the MAC, mMACTime is MAC processing time that is required by the MAC to prepare a frame and transfer it to the PHY, and pPHYTime is PHY processing time that is required by the PHY to process a frame and transfer it to air (i.e., transmit the frame).

The node treats a contention slot as idle if the node determines that the channel has been idle between the start of the contention slot and the end of time pCCATime (4503). When the backoff counter is unlocked, the node decrements the backoff counter at time pCCATime after the start of the contention slot. This allows the node to transmit a data frame to the transport medium (i.e., air) by the end of the current contention slot when the backoff counter reaches 0 at the end of the current pCCATime. When the backoff counter reaches 0 in the current contention slot, the node obtains a contended allocation starting at the end of the current slot and lasting for a duration having a predefined maximum length (mCADurationLimit). The maximum length of the contend allocation may be a multiple of the allocation slot length (e.g. mCADurationLimit=2×allocation slot length).

The values for CW that is used to set the backoff counter value are selected based on the user priority of the traffic to be transmitted in the contended allocation. Table 12 illustrates examples of values for CWmin and CWmax that may be used in obtaining a contended allocation. Table 12 lists eight levels of user priority (UP) where 0 (e.g., background traffic) is the lowest user priority and 7 (e.g., emergency or medical event report) is the highest user priority. Each user priority level is assigned a minimum and maximum CW value.

TABLE 12

| USER PRIORITY | TRAFFIC DESIGNATION | $CW_{MIN}$ | $CW_{MAX}$ |
|---|---|---|---|
| 0 | Background (BK) | 16 | 64 |
| 1 | Best effort (BE) | 16 | 32 |
| 2 | Excellent effort (EE) | 8 | 32 |
| 3 | Controlled load (CL) | 8 | 16 |
| 4 | Video (VI) | 4 | 16 |
| 5 | Voice (VO) | 4 | 8 |
| 6 | Network control | 2 | 8 |
| 7 | Emergency or medical event report | 1 | 4 |

The contention window (CW) is chosen by the node as follows:
  if the node has not previously obtained a contended allocation, CW is set to CWmin[UP];
  if the node has successfully obtained a slot in the current contended allocation (i.e., the node has received an expected acknowledgment to the last frame that it transmitted in the current contended allocation), CW is set to CWmin[UP];

if the node is transmitting a frame requiring no acknowledgment in the current contended allocation, CW is unchanged; or if the node has failed, (i.e., the node has not received an expected acknowledgment at the expected time):

the node keeps CW unchanged, if this is the $m^{th}$ time the node failed since it last succeeded, where m is an odd number; or the node doubles CW, if this is the $n^{th}$ time the node failed since it last succeeded, where n is an even number, but if doubling the CW would exceed CWmax[UP], the node shall set the CW to CWmax [UP].

The node shall lock the backoff counter when any of the following events occurs:

the backoff counter is reset upon decrementing to 0;

the channel is busy (if the channel is busy because the node detected a frame transmission, the channel remains busy until at least the end of the frame transmission without the node having to re-sense the channel);

the current time is outside any RAP; or the current time is at the start of a contention slot inside a RAP, but the time between the end of the slot and the end of the RAP is not long enough for completing a frame transaction and setting aside a nominal guard time.

The node shall unlock the backoff counter when both of the following conditions are met:

the channel has been idle for TIFS; and the current time is at the start of a contention slot inside a RAP, and the time between the end of the slot and the end of the RAP is long enough for completing a frame transaction plus a nominal guard time.

Referring again to FIG. 45, the operation of the backoff counters for two nodes are also illustrated. At the start of contention slot 4501, Node 1's backoff counter is set to 1 and is unlocked, and Node 2's backoff counter is set to 2 and is unlocked (4506). At the end of pCCATime 4503, both Node 1 and Node 2 treat contention slot 4501 as idle. Both Node 1 and Node 2 decrement their respective backoff counters so that Node 1's backoff counter is 0, and Node 2's backoff counter is 1 (4507). Having reached 0 on the backoff counter, Node 1's MAC prepares a frame and transfers it to the PHY (4508). Node 1's PHY then processes the frame and transfers it to the air interface at the end of the contention slot (4509).

Node 2 detects the transmission by Node 1 at the end of pCCATime 4503 in contention slot 4502 and locks its backoff counter at 1 because the channel is now busy (4510). As a result, Node 2 does not decrement its backoff counter in contention slot 4502 and, therefore, does not obtain a contended allocation or transmit a frame at the end of contention slot 4502.

FIG. 46 illustrates how to start and use contended allocations in one embodiment. When a node obtains a contended allocation for a frame, the node transmits the frame at the start of the allocation. The recipient transmits an acknowledgment frame, if required, after TIFS following the end of the previous frame. To resume transmission following a received acknowledgment frame, the node transmits a new frame (or retransmits an old frame) after the TIFS duration following the end of the acknowledgment frame.

In FIG. 46, two RAPs 4601, 4602 are defined in a first beacon period 4603, and one RAP 4604 defined in second beacon period 4605. RAP1's 4601 and 4604 start immediately after the end of the beacon frames 4606, 4607, and RAP2 4602 starts half a beacon period away from the start of the beacon frame 4606 in the beacon period 4603. Scheduled allocation interval 4608 is assigned to a node and is not available to random access. Blocks F1 represent frame transactions initiated by a node in a contended allocation, which require time Tf to complete. The node must end its transmission in the current contended allocation so that the last transmission in the allocation is complete at least a designated nominal guard time ($GT_n$) before the end of the allocation or the current RAP, whichever occurs first. For example, there is not enough time following contention slot 4609 to allow both the frame transaction time Tf and nominal guard time $GT_n$. Therefore, the backoff counter would be locked for a node attempting to obtain a contention allocation in contention slot 4609.

Backoff counter decrements 4610 indicate the contention slots in which a node would decrement its backoff counter in the example illustrated in FIG. 46. After detecting a data or beacon frame transmission, the node waits a TIFS period and then begins identifying idle contention slots. The backoff counter is decremented for each idle contention slot as long as the backoff counter is unlocked.

In FIG. 46, a node sets its backoff counter to 3 and unlocks the counter after TIFS period 4611 in RAP 4602. The backoff counter value (i.e., 3) is set by randomly selecting an integer value between 1 and CW, where the value of CW is selected in accordance with Table 13 and the procedure described above. The node then decrements the backoff counter for each detected idle contention slot until the backoff counter reaches 0. The node then transmits data frames in block F1 4612 which failed. Because there is insufficient time remaining after F1 block 4612 (i.e. less than Tf+$GT_n$) before scheduled allocation 4608, the node does not attempt to obtain another contended allocation in RAP 4602.

TABLE 13

| User Priority | Traffic designation | CWmin | CWmax |
|---|---|---|---|
| 0 | Background (BK) | 16 | 64 |
| 1 | Best effort (BE) | 16 | 32 |
| 2 | Excellent effort (EE) | 8 | 32 |
| 3 | Controlled load (CL) | 8 | 16 |
| 4 | Video (VI) | 4 | 16 |
| 5 | Voice (VO) | 4 | 8 |
| 6 | Network control | 2 | 8 |
| 7 | Emergency or medical event report | 1 | 4 |

After scheduled allocation period 4608 and beacon frame 4606, the node waits for TIFS 4613 in RAP 4601 before attempting to obtain another contention allocation. The node sets its backoff counter to 5 using the same CW as used previously based on the procedure described above and begins decrementing the backoff counter for each idle contention slot. As noted above, the node locks the backoff counter at slot 4609 and does not decrement the backoff counter for this slot because insufficient time remains in RAP 4601.

After detecting beacon frame 4607 and the start of RAP1 4604, the node unlocks the backoff counter following TIFS 4614 and resumes decrementing the backoff counter over each idle contention slot. When the backoff counter reaches 0, the node again transmits data in block F1 4615 which failed a second consecutive time. The node waits for TIFS 4616 following its own random access 4615 and then resets its backoff counter by setting it to randomly selected value 8 from a doubled CW. After decrementing the backoff counter following detection of eight idle contention slots, the node then transmits data in block F1 4617 and succeeded at the transmission.

A hub communicates with one or more nodes in a subnet. The hub provides different access methods for the nodes to initiate transactions with the hub, such as scheduled allocations assigned to individual nodes. A scheduled access may include a persistent allocation, such as a 1-periodic that assigns one or more time intervals that reoccur in each beacon period for access by a single node or an m-periodic allocation that assigns one or more time intervals that reoccur in m beacon periods (i.e., skipping m−1 beacon periods between occurrences). A persistent allocation is usable by the node for up to a specified number p of beacon periods without receiving a beacon.

The node requests a persistent allocation by sending a Connection Request to the hub. The hub accepts, modifies, or rejects the request by sending a Connection Response back to the node. The hub modifies a persistent allocation unilaterally, if required, by sending a Connection Reassignment to the device. Either the node or the hub may delete a persistent allocation by sending a Disconnection frame. A node should not have both 1-periodic and m-periodic allocations at the same time.

FIG. 47 illustrates a 1-periodic allocation interval occurring over a plurality of beacon periods 4701*a-m*. Beacon frame B 4702*a-m* is broadcast in each beacon period 4701*a-m*. The beacon frame 4702*a-m* may change position from one beacon period 4701*a-m* to the next according to a beacon shifting sequence. The beacon shifting sequence minimizes mutual interference between two or more neighboring subnets by shifting each hub's beacon frame 4702 within each beacon period 4701 according to a pseudo-random sequence. A scheduled, 1-periodic allocation interval A1 4703*a-m* is assigned to a first node. The allocation interval A1 4703 is defined as starting at time T1 relative to the beacon transmission time within each beacon period. The 1-periodic allocation has one or more allocation intervals spanning the same allocation slots in every beacon period.

The location of each allocation slot, and the corresponding allocation interval A1, shifts with the beacon start time. This temporal shift is based on the beacon transmission time pattern or beacon shift sequence selected by the hub. When the time remaining in a beacon period following the start of the beacon frame is less than time T1, the 1-periodic allocation interval 4703 "wraps around" the beacon period. For example, in beacon period 4701*a*, allocation interval 4703*a* occurs at time T1 after the start of beacon frame 4702*a*. However, in beacon frames 4701*b* and 4701*m*, the time T1-1 that is remaining after the start of the beacon frame (4702*b,m*) is less than T1. Therefore, the allocation intervals (4703*b,m*) start before the beacon frame at time T1-2 after the start of the beacon period, where T1-1+T1-2=T1. The first node wakes up in every beacon period during allocation intervals 4703.

FIG. 48 illustrates an m-periodic allocation interval repeating every m beacon periods. An m-periodic allocation has one or more allocation intervals spanning the same allocation slots in every m beacon periods, where m>1. In FIG. 48, m-periodic allocation intervals 4803 are assigned to a second node. M-periodic allocation intervals 4803*a,m* appear in every m beacon periods 4801*a,m*. The m-periodic allocation intervals 4803*a,m* start time T2 after the start of beacon frame 4802*a,m*. If the time remaining in a beacon period following the start of the beacon frame is less than time T2, the m-periodic allocation interval 4803 "wraps around" the beacon period. For example, in beacon period 4801*m*, m-periodic allocation interval 4803*m* begins time T2-2 after the start of the beacon period because only time T2-1 is remaining after beacon frame 4802*m*, wherein T2-1+T2-2=T2. The second node wakes up in the beacon periods containing allocation intervals A2 4803, or one beacon period out of every m>1 beacon periods.

To obtain one or more new scheduled allocations, a node sends a connection request frame to the hub, such as the connection request described above with respect to FIG. 18. Scheduled allocations may be for either an uplink or for a downlink. An uplink allocation is for transmissions initiated by a node and any corresponding acknowledgments returned by the hub. A downlink allocation is for transmissions initiated by the hub and any acknowledgments returned by the node.

FIG. 49 illustrates uplink and downlink frame transactions between a hub and a node. Upon receiving Connection Assignment frame 400, the node may start initiating frame transactions with the hub in a scheduled uplink allocation. Likewise, upon successfully sending Connection Assignment frame 400, the hub may start initiating frame transactions with the node in a scheduled downlink allocation. The node initiates transactions in the uplink allocation intervals 4901 that were granted by the hub. The hub receives the frames 4902 transmitted by the node and acknowledges 4903 the frames during the allocation intervals as appropriate. The hub initiates transactions in the downlink allocation intervals 4904 granted to the node. The node shall be ready to receive the frames 4905 transmitted by the hub and acknowledge 4906 them during the allocation intervals as appropriate.

Scheduled allocations may also be bilink, which provides transfer of management and data traffic from a hub to a node and/or vice versa. A bilink allocation is an allocation of intervals in which a hub or a node initiates one or more frame transactions to transmit management and data traffic to a node or a hub, respectively, and the recipient returns acknowledgment, if required. However, the node initiates bilink frame transactions only after receiving a poll from the hub.

FIG. 50 illustrates bilink frame transactions between a hub and a node. Upon successfully sending Connection Assignment frame 400, the hub may start initiating frame transactions with the node, or the hub may start sending a poll 5001 to the node for the node to initiate one or more frame transactions. The poll 5001*a-c* specifies a corresponding polled allocation interval 5002*a-c*. The polled allocation intervals 5002*a-c* are within one of the bilink allocation intervals 5003 that were granted to the node by the hub. The node does not initiate a frame transaction until it receives a poll or a timed-poll (T-Poll) frame 5001 during a bilink allocation interval 5003. A poll frame 5001 is transmitted by a hub to grant the addressed node an immediate polled allocation 5003 that starts turnaround inter-frame space (TIFS) after the end of the frame. Alternatively, the poll frame 5001 may inform the node of a future poll. Whichever device is the recipient, the node or the hub, must be ready to receive the frames 5004 transmitted by the sender and return appropriate acknowledgement frames 5005 during the allocation intervals 5003.

Turnaround inter-frame space (TIFS) separates frames that are transmitted by the node or hub. The node or the hub may initiate another frame transaction in a scheduled uplink or downlink allocation interval, respectively, time TIFS after the end of the expected acknowledgment frame regardless of whether it received the acknowledgment frame. The node and the hub ensure that the frame transactions, including acknowledgment frames, stay within their scheduled uplink or downlink allocation intervals, respectively, by taking the appropriate guardtime (GTn) 5006 into account. The hub and node ensure that the frame transactions, including acknowledgment frames if required, stay within the scheduled bilink allocation intervals 5003 and take the appropriate guardtime 5006 into account.

A node modifies existing scheduled allocations by sending a Connection Request frame specifying the new requirements. The hub sets the Change Indication field in the responding Connection Assignment frame with reference to the last Connection Assignment frame sent to the node. In particular, if the hub rejects the modifications but maintains the existing allocations, the hub responds with a Connection Assignment frame with the Change Indication field set to 0, indicating no change, and the other fields kept to the respective values contained in the last Connection Assignment frame sent to the node.

A hub may, but preferably does not, modify scheduled allocations of a node on its own by sending the node an unsolicited Connection Assignment frame specifying the new assignments to those allocations. The Change Indication field in the unsolicited Connection Assignment frame is set with reference to the last Connection Assignment frame sent by the hub to the same node.

In addition to the scheduled and polled access described above, the hub may provide a transient allocation. The transient allocation is one or more time intervals that apply only for the current or next beacon period. The hub may provide the transient allocation for a single connected node or for any unconnected nodes. The transient allocation is useful for aperiodic traffic, such as low duty cycle wakeup traffic. The nodes do not request for transient allocation. Instead, the hub provides a transient allocation through its beacon frame. Because the transient allocation is designated in the beacon frame itself, wrap around within the current beacon period cannot be used for transient allocations. Instead, after receiving a beacon specifying the allocation, the transient allocation is usable by the node in the next beacon period. The hub stops the transient allocation by removing the allocation from its beacon frame.

FIG. 51 illustrates transient allocations assigned by the hub. The hub transmits beacon frames 5102 within beacon periods 5101. When the hub needs to provide a transient allocation, the hub designates the transient allocation interval in a beacon frame. For example, if the hub designates a transient allocation in beacon frame 5102a of beacon period 5101a, the transient allocation interval 5103 occurs in the next beacon period 5101b. If the transient allocation is removed from the beacon frame after beacon 5102a is sent (i.e., no transient allocation in beacon frame 5102b), then the transient allocation interval is not available in the subsequent beacon periods 5101c,d. The hub may provide a second transient allocation by designating the allocation in a later beacon frame. For example, in beacon frame 5102c of beacon period 5101c, the hub designates transient allocation interval 5104, which occurs in beacon period 5101d. The transient allocations 5103, 5104 may be assigned to separate connected nodes, to the same connected node, or to any unconnected nodes.

A node and a hub may provide on-demand contention-free frame exchanges within their subnet using polls and posts. A polled allocation is a time interval of specified length that starts TIFS after a Poll sent by the hub for access by a single connected node or by unconnected nodes. A polled allocation is suitable for "unexpected" or "extra" uplink traffic (for example, due to data rate variations and/or channel impairments). The polled allocations are always for uplink transmissions that are initiated by a node and acknowledgments, if any, returned by the hub. A poll may be classified as homogeneous, heterogeneous, or random. A homogeneous poll occurs not later than TIFS after the beacon frame or an allocation interval given to the polled node. A heterogeneous poll occurs TIFS after a scheduled allocation given to any node other than the polled node. A random poll occurs anywhere between allocations.

A node does not explicitly request a polled allocation, but instead indicates a need for a polled allocation by indicating it has more data when sending a frame. The node indicates its ability and willingness to support certain polls. The hub sends a Poll to the node that has indicated a need of a polled allocation. A polled allocation contains a time interval that does not reoccur in subsequent beacon periods without the hub invoking another instance of polled access. A hub sends polls and grants polled allocations to a node only if both of the devices support polls. A hub may send polls granting polled allocations to unconnected nodes any time outside beacon frames and scheduled allocations without regard to the poll support indicated by the connected nodes in its subnet.

In one embodiment, a node obtains a polled allocation for initiating another frame transaction using a More Data field in the frame it is transmitting. The node sets an Acknowledgement (Ack) Policy field to indicate immediate acknowledgment (I-Ack) or block acknowledgment (B-Ack) for some management or data type frames. An I-Ack frame has no payload, but is transmitted by a hub or node to acknowledge receipt of the proceeding frame. A B-Ack frame contains a frame payload and is transmitted by the hub or node to acknowledge the reception status of certain preceding data type frames. A Poll frame contains no frame payload and is transmitted by a hub either (1) to grant to the addressed node an immediate polled allocation that starts TIFS after the end of the frame or (2) to inform the node of a future poll. A T-Poll frame contains a frame payload that includes a current transmission time, which provides the hub's current time for synchronization of the node's clock to the hub's clock. The T-Poll frame is transmitted by a hub either (1) to grant to the node an immediate polled allocation that starts TIFS after the end of the frame or (2) to inform the node of a future poll.

An I-Ack+Poll frame contains no frame payload and is transmitted by a hub to acknowledge receipt of the preceding frame and to send a poll to the addressed node. The I-Ack+Poll frame is equivalent in function to an I-Ack frame followed by a Poll frame. A B-Ack+Poll frame contains a frame payload and is transmitted by a hub to acknowledge the reception status of certain preceding data type frames and to send a poll to the addressed node. The B-Ack+Poll frame is equivalent in function to a B-Ack frame followed by a Poll frame. This enables the hub to send the node a poll at an announced time through an I-Ack+Poll or B-Ack+Poll frame. The hub grants an immediate polled allocation to a node by sending a Poll or T-Poll frame to the node, when appropriate, or by sending an I-Ack+Poll or B-Ack+Poll frame when required to return an acknowledgment. Instead of granting an immediate polled allocation, the hub may inform the node of an intended future poll by sending a Poll, T-Poll, I-Ack+Poll or B-Ack+Poll frame that indicates a time for the future poll. The hub then sends a Poll or T-Poll frame at the time indicated in a frame previously sent to the node.

FIG. 52 illustrates polled allocations in relation to scheduled allocation intervals. A node is assigned scheduled allocation intervals 5201 and 5202 in which it transmits frames to the hub (5201) or receives and acknowledges frames from the hub (5202). The node receives I-Ack+Poll (5203) and B-Ack+Poll (5204, 5205) frames from the hub at times expected for acknowledgment arrivals. The node initiates a frame transaction at the start of a polled allocation granted to it through a preceding Poll, T-Poll, I-Ack+Poll, or B-Ack+Poll frame.

For example, in response to data frame 5206 from the node, the hub responds with B-Ack+Poll frame 5205, which designates immediate polled allocation interval 5207 that begins at the end of the current scheduled allocation interval 5201. The node sends data frame 5208 at TIFS after the last data frame 5209 before the start of polled allocation interval 5207. The hub transmits an acknowledgment frame I-Ack or B-Ack when required, or I-Ack+Poll or B-Ack+Poll for another polled allocation at time TIFS after the end of the previous frame in a polled allocation. For example, the hub sends B-Ack+Poll 5204 that acknowledges data frame 5208 and notifies the node of a future poll. The hub then sends Poll frame 5210 to convey an immediate polled allocation 5211. The node transmits data frames 5212 and 5213 in polled allocation 5211 and in turn receives acknowledgement frames 5203 and 5214, respectively. The hub may designate an additional polled allocation 5215 using future (5216) and immediate (5217) poll frames.

When transmitting new frames or retransmitting old frames, the node may start another frame transaction in the polled allocation at time TIFS after the end of any expected acknowledgment frame regardless of whether the acknowledgment frame is received or not. The node ensures that the frame transactions in a polled allocation, including acknowledgment frames if required, stay within the polled allocation interval and take the appropriate guardtime into account. The hub may modify a polled allocation for a node by sending the node another poll through an I-Ack+Poll or B-Ack+Poll frame within the polled allocation that expands the allocation interval, effectively granting a new polled allocation in place of the existing one.

FIG. 53 illustrates polled allocations designated for a plurality of nodes. Scheduled allocation 5301 is designated for node 1. Homogenous poll 5302 is sent to node 1 TIFS after allocation 5301. Poll 5302 designates polled allocation 5303 for node 1, which sends data frames and receives acknowledgement frames during polled allocation 5303. Homogenous poll 5304, which may be an I-Ack+Poll or B-Ack+Poll frame, designates another polled allocation 5305 for node 1. Scheduled allocation 5306 is designated for node 2. Heterogeneous poll frame 5307 at TIFS following node 2's allocation 5306 designates another polled allocation 5308 for node 1. Node 1 sends data frames and receives acknowledgement frames during polled allocation 5308. Random poll frame 5309 that occurs some time after the polled allocation 5308 designates polled allocation 5310 for node 3, which then sends data frames and receives acknowledgement frames during polled allocation 5310.

When a node does not have a scheduled allocation, the hub may allocate a time interval to provide access to the node. The hub may send posts to the node granting posted allocations outside the node's scheduled allocations. The hub must have informed the node of the pending posts through previously transmitted frames. The post is a self-allocation that is useable for unexpected or extra downlink traffic caused, for example, by network management issues, data rate variations or channel impairments. The posted allocation is always for a downlink and serves transmissions initiated by the hub and any corresponding acknowledgements by the node. The post may be classified as homogeneous, heterogeneous, or random. A homogeneous post occurs not later than TIFS after a beacon or an allocation given to the posted node. A heterogeneous post occurs TIFS after a scheduled allocation given to any node other than the posted node. A random post occurs anywhere between allocations.

A node does not explicitly request for a posted allocation, but indicates its readiness for a posted allocation through its exchanged wakeup information. A node may indicates its ability and willingness to support certain posts. The hub initiates transmissions to a node in a posted allocation interval in a time not yet allocated to any node.

To obtain a posted allocation, a node that does not have a scheduled downlink allocation sends a management or data type frame with an acknowledgement policy field set to I-Ack or B-Ack in each of its wakeup beacon periods. This enables the hub to send the node a long-distance post containing essential network management information or a critical user message at a specific time through an I-Ack or B-Ack frame. To send a short-distance post to a node, the hub indicates that it has more data for the node in a non-beacon management or data type frame. To send a long-distance post to a node, a hub sends the node an I-Ack or B-Ack frame when required to return an acknowledgment.

The hub initiates frame transactions at the start of its posted allocations that have been announced in earlier frames. The node receives posts and participates in the frame transactions in its posted allocations that have been indicated through earlier frames. The node transmits an acknowledgment frame I-Ack or B-Ack when required at time TIFS after the end of the previous frame in a posted allocation. If the hub has announced in the current frame that it has another short-distance post, the hub may initiate another frame transaction, for retransmitting old frames or/and transmitting new frames, at time TIFS after the end of the expected acknowledgment frame regardless of whether it received the acknowledgment frame. The hub ensures that the frame transaction, including the acknowledgment frame if required, stays within the intended posted allocation interval, taking the appropriate guardtime into account. The posted allocation is just long enough for a frame transaction, so the hub does not modify a posted allocation once it initializes a frame transaction. The hub may grant itself another posted allocation for initializing another frame transaction by informing the target node of the time of the new allocation through the current frame.

FIG. 54 illustrates posts and posted allocation according to one embodiment. Scheduled uplink (5401) and downlink (5402) allocation intervals are designated for a node. In B-Ack 5403 during scheduled allocation interval 5401, the hub designates posted allocation 5404 for the node. During posted allocation 5404, the hub transmits frame 5405 to the node. Data frame 5405 includes data notifying the node that additional frame 5406 will be transmitted in the posted allocation. During scheduled allocation interval 5402, the hub designates a posted allocation 5407 in data frame 5408 that is used to send data frames 5409-5412 to the node. Data frames 5409-5411 also notify the node that subsequent frames 5410-5412 will also be sent during the posted allocation 5407.

FIG. 55 illustrates posted allocations designated for a plurality of nodes. Initially, only scheduled allocation 5501 is designated for node 1 within a beacon period. TIFS after beacon frame 5502, the hub transmits data in homogeneous posted allocation 5503 that is designated for node 2. A second posted allocation 5504 for node 2 follows TIFS after the acknowledgement in posted allocation 5503. The hub also designates a random posted allocation 5505 during the beacon period. Finally, TIFS after scheduled allocation 5501, the hub designates posted allocation 5506 for node 3 and transmits data to node 3 during the posted allocation interval.

The present invention takes advantage of the variety of selectable access methods describes above to control power consumption. The invention provides two power management states: hibernation for long-run or macroscopic power management, and sleep for short-run or microscopic power management.

A node may hibernate across a number of beacon periods, and may sleep over some time intervals even in its wakeup beacon periods. The wakeup interval field in the connection request message sent by the node is used to select sleep or hibernation states. The wakeup interval field identifies the length, in units of beacon periods, between the start of successive wakeups of the node. The information in the wakeup interval field is effective from the next wakeup indicated in the connection request. When the node hibernates, it does not receive or transmit any traffic. To hibernate in some beacon periods, the node sets the wakeup interval field in the connection request frame to an integer larger than 1. Also, the node sets the next wakeup field in the same frame to a value specifying its intended next wakeup beacon period. To wake up in every beacon period, the node sets the wakeup interval field in the connection request frame to 1, and sets the next wakeup field in the frame to a value identifying the next beacon period.

The hub receiving the connection request frame should honor the values of the received wakeup interval and next wakeup fields whenever possible, but may set them to different values, if needed, in the responding connection assignment frame. The hub may later modify these values by sending to node another connection assignment frame if warranted by new conditions. If the hub sets the Wakeup Interval field in its responding frame to an integer larger than 1, then the hub may grant only m-periodic allocations to the node. Whenever possible, these allocation intervals will be in the node's wakeup beacon periods as designated in the node's last connection request. If the hub sets the wakeup interval field in its responding frame to 1, then the hub may grant only 1-periodic allocations to the node. The allocation intervals will be in every beacon period, in accordance with the node's last connection request whenever possible.

If the wakeup interval value in the connection assignment frame last received from the hub is larger than 1, then the node shall wake up in each of its wakeup beacon periods based on the wakeup interval and next wakeup values provided in that frame by the hub. The node transmits and/or receives frames and receives the beacon frame, if needed, in the granted m-periodic allocation intervals. If the wakeup interval value in the connection assignment frame last received from the hub is 1, the node wakes up in every beacon period and transmits and/or receives frames, including the beacon frame, in the granted 1-periodic allocation intervals.

FIG. 56 illustrates macroscopic power management using node hibernation across a plurality of beacon periods. The node's connection request message designates a value greater than one in the wakeup interval field, which indicates that the node will wake up in every third beacon period. The node also sets the next wakeup field to the sequence number (SN) of the beacon frame in the next wakeup period.

FIG. 57 illustrates macroscopic power management using node hibernation across a single beacon periods. The node's connection request message designates the value one, which indicates that the node will wake up in every beacon period. The node also sets the next wakeup field to the sequence number of the next beacon frame.

A node wakes up to receive a beacon frame from a hub when it needs beacon reception to synchronize with the hub or to obtain certain information contained in a beacon. A node wakes up to receive and transmit frames in its scheduled allocations in its wakeup beacon periods. In addition, the node stays active participating in frame transactions in its expected posted allocations. The hub transmits in the posted allocations for a node in the node's wakeup beacon periods, if possible. If the node did not receive a frame at the announced time for a pending post, then the node stays in receive mode until the hub could have finished a frame transaction for the post and retransmitted a frame TIFS later.

If the node has indicated its support for polls in its last connection request frame, the node also stays active in such times as to receive announced polls and initiate frame transactions in its polled allocations. The hub should have the polled allocations of a node to occur in the node's wakeup beacon periods, if possible. Outside the time intervals noted above, the node may enter a sleep mode without receiving or transmitting any traffic. The node may operate in an active or wakeup mode in which it is configured to send and receive frames or in a low-power sleep mode in which it is not configured to send or receive frames.

FIG. 58 illustrates hub and node activity and sleep modes in a wakeup beacon period having scheduled and posted allocations. The hub broadcasts beacon frame 5801 at the start of the beacon frame. Node 1 has been assigned allocation intervals 5802 and 5803. Node 1 may sleep (5804) following beacon frame 5801, but must wake up for the start of scheduled allocation interval 5802 to transmit data frame 5805 and receive acknowledgement B-Ack 5806. Node 1 stays in the wake up state during its posted allocation interval 5807 to receive data from the hub including time for a possible retry transmission (5808) by the hub in the event that the first frame in the posted allocation interval is not received or acknowledged.

Following the posted allocation interval 5807, node 1 may sleep (5809) until the start of scheduled allocation interval 5803. During scheduled allocation interval 5803, node 1 must wake up to transmit data frames and receive acknowledgement frames, including I-Ack frames 5810, 5811 that designate a time for a future post frame 5812. Node 1 may sleep (5813) during the interval between scheduled allocation interval 5803 and posted allocation 5812, which period is allocated for a different node. Node 1 remains in the wake up state to receive data frames from the hub in additional posted allocation intervals (5814) designated in the current beacon period.

FIG. 59 illustrates hub and node activity and sleep modes in a wakeup beacon period having scheduled, posted and polled allocations. Node 1 is assigned scheduled allocation intervals 5901 and 5902, which allows node 1 to sleep (5903) between the beacon frame 5904 and the beginning of the first scheduled allocation interval. Following scheduled allocation interval 5901, node 1 remains awake for a series of posted allocation intervals 5905.

The hub transmits poll 5906 to node 1, which designates a future poll conveying a polled allocation 5907. Node 1 sleeps (5908) during the interval between receiving the last poll 5906 and the next poll starts polled allocation 5907. Node 1 remains in the wake up state during subsequent polled allocations 5909 and during scheduled allocation interval 5902. During scheduled allocation interval 5902, the hub transmits immediate post data in frame 5910, while indicating a poll frame 5911 that follows scheduled allocation interval 5902. Poll frame 5911 designates another future poll that conveys polled allocation 5912. Node 1 sleeps (5913) during the period between poll frame 5911 and the poll frame immediately before polled allocation 5912. Node 1 then wakes up again to receive the next poll for polled allocation 5912, which lasts through the end of the beacon period.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for communicating data with neighboring hubs, comprising:
    inserting payload data in one or more frames to be transmitted to a recipient;
    determining a security level to be used in the frame;
    identifying a pairwise temporal key (PTK) used to secure the frame;
    identifying a frame type based upon said payload data;
    selecting a sequence number for the frame and inserting into a sequence number field the sequence number selected based on the frame type;
    generating a frame header using the security level, PTK, frame type, and sequence number;
    generating a frame control block;
    generating a frame body comprising the payload data;
    creating the frame using the frame header and the frame body; and
    transmitting the frame to the recipient,
    wherein the frame control block further includes a frame subtype block, the frame subtype block indicating that the frame is a beacon frame; and
    wherein the sequence number field is set to a value incremented by one more than a sequence number included in a last beacon frame,
    wherein a beacon transmission time, relative to a beacon period recurring time (BPRT), changes from one beacon period to next according to a pseudo-random (PN) beacon shifting sequence by a means for shifting, wherein different PN sequences are used by neighboring hubs,
    wherein generating the frame control block further comprises:
    identifying a transmit direction in the frame control block, the transmit direction indicating whether the frame is sent to the hub or from the hub,
    wherein the transmit direction is indicated by setting a bit in the frame control block,
    wherein the fragment number field is set to indicate a beacon period in which a hub will change to a next channel in a channel hopping sequence.

2. The method of claim 1, further comprising:
    configuring the frame header to indicate an authentication status for the frame.

3. The method of claim 1, further comprising:
    configuring the frame header to indicate an encryption status for the frame.

4. The method of claim 1, further comprising:
    identifying a frame subtype; and
    selecting the sequence number based upon the frame subtype.

5. The method of claim 1, further comprising:
    generating the frame header to indicate a network identifier.

6. The method of claim 1, further comprising:
    generating the frame header to indicate a hub identifier, a node identifier, and a transmit direction.

7. A method for creating a frame to be exchanged between a hub and a node and neighboring hubs, the method comprising:
    retrieving hub address information from a memory;
    retrieving node address information from the memory;
    generating a frame control block having a plurality of fields, the fields including a security level field, a pairwise temporal key (PTK) index field, a frame type field, a sequence number field, and a fragment number field, wherein
        the security level field indicates an authentication status and an encryption status for the frame,
        the PTK index field contains a PTK index used by the hub and the node to create a PTK, and
        the frame type field indicates whether the frame is a management, control or data frame;
    generating a header block for the frame, the header block comprising the hub address information, node address information, and frame control block; and
    transmitting the frame including the header block to a recipient,
    wherein the frame control block further includes a frame subtype block, the frame subtype block indicating that the frame is a beacon frame; and
    wherein the sequence number field is set to a value incremented by one more than a sequence number included in a last beacon frame,
    wherein a beacon transmission time, relative to a beacon period recurring time (BPRT), changes from one beacon period to next according to a pseudo-random (PN) beacon shifting sequence by a means for shifting, wherein different PN sequences are used by neighboring hubs, and
    wherein the fragment number field is set to indicate a beacon period in which a hub will change to a next channel in a channel hopping sequence,
    wherein generating the frame control block further comprises:
    identifying a transmit direction in the frame control block, the transmit direction indicating whether the frame is sent to the hub or from the hub,
    wherein the transmit direction is indicated by setting a bit in the frame control block.

8. The method of claim 7, wherein the frame control block further includes a frame subtype block, the frame subtype block indicating that the frame includes an immediate-acknowledgement or block-acknowledgement frame, and the sequence number field set to a value indicating an allocation slot in which a hub is to send a post to a node.

9. The method of claim 8, wherein the fragment number field is set to a value indicating a beacon period in which the hub is to send the post to the node.

10. The method of claim 7, wherein the frame control block further includes a frame subtype block, the frame subtype block indicating that the frame includes a poll frame; and
    wherein the sequence number field is set to a value indicating an allocation slot in which the hub is to send a next poll to the node.

11. The method of claim 10, wherein the fragment number field is set to a value indicating a beacon period in which the hub is to send the next poll to the node.

12. A device operating as either a hub or node in a network and having neighboring hubs, comprising:
    a circuit for transmitting and receiving frames;
    a memory for storing frame data; and a processor adapted to create frames for transmission, the
processor operating to:
retrieve hub address information from a memory;
retrieve node address information from the memory;
generate a frame control block having a plurality of
fields, the fields including a security level field, a
pairwise temporal key (PTK) index field, a frame type
field, a sequence number field, and a fragment number
field, wherein
the security level field indicates an authentication status
and an encryption status for the frame,
the PTK index field contains a PTK index used to create a
current PTK,
the frame type field indicates whether the frame is a management, control or data frame; and
generate a header block for the frame, the header block comprising the hub address information, node address information, and frame control block, and
wherein the frame control block further includes a frame
subtype block, the frame subtype block indicating that
the frame is a beacon frame; and
wherein the sequence number field is set to a value incremented by one more than a sequence number included in
a last beacon frame,
wherein a beacon transmission time, relative to a beacon
period recurring time (BPRT), changes from one beacon
period to next according to a pseudo-random (PN) beacon shifting sequence by a means for shifting, wherein
different PN sequences are used by neighboring hubs,
and
wherein the fragment number field is set to indicate a
beacon period in which a hub will change to a next
channel in a channel hopping sequence,
wherein the processor further operates to:
identify a transmit direction in the frame control block,
the transmit direction indicating whether the frame is
sent to the hub or from the hub,
wherein the transmit direction is indicated by setting a bit
in the frame control block,
wherein the processor further operates to:
retrieve a network identifier from the memory; and
wherein the generating the header block for the frame
comprises including the network identifier in the header
block,
wherein generating the frame control block further comprises:
identifying a transmit direction in the frame control block,
the transmit direction indicating whether the frame is
sent to the hub or from the hub, and
wherein the transmit direction is indicated by setting a bit
in the frame control block.

13. The device of claim 12, wherein the frame control block further includes a frame subtype block, the frame subtype block indicating that the frame includes a poll frame; and
wherein the sequence number field is set to a value indicating an allocation slot in which the hub is to send a next poll to a node.

14. The device of claim 12, wherein the frame control block further includes a frame subtype block, the frame subtype block indicating that the frame is a beacon frame; and
wherein the sequence number field is set to a value incremented by one more than a sequence number included in a last beacon frame.

15. The device of claim 12, wherein the fragment number field is set to indicate a beacon period in which a hub will change to a next channel in a channel hopping sequence.

16. The device of claim 12, wherein the frame control block further includes a frame subtype block, the frame subtype block indicating that the frame includes an immediate-acknowledgement or block-acknowledgement frame, and the sequence number field set to a value indicating an allocation slot in which the hub is to send a post to a node.

17. The device of claim 16, wherein the fragment number field is set to a value indicating a beacon period in which the hub is to send the post to the node.

18. The device of claim 17, wherein the fragment number field is set to a value indicating a beacon period in which the hub is to send the next poll to the node.

* * * * *